US012111384B2

(12) United States Patent
Vollbracht et al.

(10) Patent No.: US 12,111,384 B2
(45) Date of Patent: *Oct. 8, 2024

(54) RADAR DEVICE

(71) Applicant: Aptiv Technologies AG, Schaffhausen (CH)

(72) Inventors: Dennis Vollbracht, Hilden (DE); Alexander Ioffe, Bonn (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,133

(22) Filed: Aug. 15, 2023

(65) Prior Publication Data

US 2023/0384439 A1    Nov. 30, 2023

Related U.S. Application Data

(63) Continuation of application No. 17/153,806, filed on Jan. 20, 2021, now Pat. No. 11,774,570.

(30) Foreign Application Priority Data

Feb. 4, 2020   (EP) ..................................... 20155499

(51) Int. Cl.
  *G01S 13/42*    (2006.01)
  *G01S 7/35*     (2006.01)
  *G01S 13/931*   (2020.01)

(52) U.S. Cl.
  CPC ............ *G01S 13/426* (2013.01); *G01S 7/352* (2013.01); *G01S 13/931* (2013.01)

(58) Field of Classification Search
  CPC ....... G01S 13/426; G01S 7/352; G01S 13/931

(Continued)

(56) References Cited

U.S. PATENT DOCUMENTS 5,657,027 A * 8/1997 Guymon .................. G01S 3/48
                                                    342/442
7,474,262 B2 * 1/2009 Alland ............... H01Q 21/0006
                                                    342/101

(Continued)

FOREIGN PATENT DOCUMENTS

CN    106772224 A    5/2017
CN    111239678 A    6/2020

(Continued)

OTHER PUBLICATIONS

"Extended European Search Report", EP Application No. 23158330.3, Aug. 25, 2023, 17 pages.

(Continued)

*Primary Examiner* — Nuzhat Pervin
(74) *Attorney, Agent, or Firm* — Harness, Dickey & Pierce, P.L.C.

(57) ABSTRACT

A method for operating an angle resolving radar device for automotive applications comprises: routing at least a first and second antenna signal between a radar circuit and an antenna device, wherein the first and second antenna signals are routed via a common signal port of the radar circuit; transducing between the first antenna signal and a first radiation field, the first radiation field having a first phase center, and between the second antenna signal and a second radiation field, the second radiation field having a second phase center, wherein a location of the second phase center is shifted with respect to a location of the first phase center; constructing at least one angle resolving virtual antenna array using the location of the first phase center as a first antenna position and the location of the second phase center of the second radiation field as a second antenna position.

20 Claims, 27 Drawing Sheets

(58) Field of Classification Search
USPC .......................................................... 342/157
See application file for complete search history.

(56) References Cited

U.S. PATENT DOCUMENTS

| | | | | |
|---|---|---|---|---|
| 7,639,171 | B2 * | 12/2009 | Alland ..................... | H01Q 3/24 342/25 R |
| 8,085,183 | B2 * | 12/2011 | Hildebrandt ............ | G01S 7/032 340/436 |
| 8,310,402 | B2 * | 11/2012 | Yang ....................... | H01Q 5/321 343/702 |
| 9,070,972 | B2 * | 6/2015 | Wang ....................... | H01Q 3/22 |
| 9,395,727 | B1 * | 7/2016 | Smith ....................... | G01S 7/03 |
| 9,869,762 | B1 * | 1/2018 | Alland .................... | H01Q 21/08 |
| 9,958,527 | B2 * | 5/2018 | Tuxen ................. | G01S 13/4454 |
| 10,042,050 | B2 * | 8/2018 | De Mersseman ..... | G01S 7/2813 |
| 10,416,680 | B2 * | 9/2019 | Li .......................... | G01S 13/878 |
| 10,446,923 | B2 * | 10/2019 | Watson ................ | H01Q 21/065 |
| 10,620,305 | B2 * | 4/2020 | Cornic ................ | H01Q 1/3233 |
| 10,627,507 | B1 * | 4/2020 | Parker ..................... | H01Q 25/00 |
| 10,768,291 | B2 * | 9/2020 | Hammes ............... | G01S 13/343 |
| 10,809,737 | B2 | 10/2020 | Li et al. | |
| 10,866,304 | B1 * | 12/2020 | Hassibi ................ | G01S 13/42 |
| 10,996,330 | B2 * | 5/2021 | Meyer ............... | H01Q 21/0075 |
| 11,415,664 | B2 * | 8/2022 | Hammes ............... | G01S 13/931 |
| 11,619,705 | B2 | 4/2023 | Zhang et al. | |
| 11,635,506 | B2 * | 4/2023 | Iwasa ................... | H01Q 1/3233 342/70 |
| 2008/0291087 | A1 * | 11/2008 | Tietjen ...................... | G01S 7/03 342/372 |
| 2011/0163909 | A1 * | 7/2011 | Jeong ................... | H01Q 25/002 342/374 |
| 2011/0267217 | A1 * | 11/2011 | Hildebrandt ........... | H01Q 21/24 342/188 |
| 2012/0086604 | A1 * | 4/2012 | Yang .................... | H01Q 21/205 342/368 |
| 2013/0063306 | A1 * | 3/2013 | Yang ........................ | H01Q 1/38 342/374 |
| 2014/0218259 | A1 * | 8/2014 | Lee ....................... | H01Q 1/3233 343/852 |
| 2014/0266868 | A1 * | 9/2014 | Schuman ............ | G01S 13/9029 342/25 R |
| 2015/0048970 | A1 * | 2/2015 | Schoor ................... | G01S 13/32 342/149 |
| 2016/0033640 | A1 * | 2/2016 | De Mersseman ..... | G01S 13/931 342/70 |
| 2017/0149147 | A1 * | 5/2017 | Minami ................... | G01S 7/03 |
| 2017/0363713 | A1 * | 12/2017 | Kim ..................... | G01S 13/931 |
| 2017/0365924 | A1 * | 12/2017 | Topak .................. | H01Q 21/061 |
| 2018/0149736 | A1 | 5/2018 | Alland et al. | |
| 2018/0321373 | A1 * | 11/2018 | Qi ............................. | G01S 7/03 |
| 2019/0285738 | A1 * | 9/2019 | Iwasa ..................... | G01S 7/282 |
| 2019/0324133 | A1 * | 10/2019 | Hong .................... | G01S 13/42 |
| 2019/0369207 | A1 * | 12/2019 | Sanada .................. | G01S 7/006 |
| 2019/0386712 | A1 * | 12/2019 | Fang .................... | H04B 7/0478 |
| 2020/0004262 | A1 | 1/2020 | Li et al. | |
| 2020/0112086 | A1 * | 4/2020 | Kim ..................... | H01Q 1/3233 |
| 2020/0150221 | A1 * | 5/2020 | Prados ................... | G01S 13/86 |
| 2020/0256947 | A1 * | 8/2020 | Motoda .................. | G01S 7/352 |
| 2020/0309899 | A1 * | 10/2020 | Jonas ..................... | G01S 13/931 |
| 2021/0111479 | A1 * | 4/2021 | Spalink ................... | G01S 13/89 |
| 2021/0156992 | A1 * | 5/2021 | Nishikido ............. | G01S 7/4008 |
| 2021/0239791 | A1 | 8/2021 | Vollbracht et al. | |
| 2021/0239821 | A1 | 8/2021 | Vollbracht et al. | |
| 2021/0286066 | A1 * | 9/2021 | Bharadwaj ............ | G01S 13/931 |
| 2021/0373144 | A1 | 12/2021 | Amani et al. | |
| 2022/0065984 | A1 * | 3/2022 | Prados .................. | G01S 13/90 |
| 2022/0163623 | A1 * | 5/2022 | Kishigami ........... | H01Q 21/065 |
| 2022/0221554 | A1 * | 7/2022 | Kawaji ................. | H01Q 21/24 |
| 2022/0236370 | A1 | 7/2022 | Li et al. | |
| 2023/0147256 | A1 * | 5/2023 | Koch ................... | H01Q 25/007 342/188 |

FOREIGN PATENT DOCUMENTS

| | | | | |
|---|---|---|---|---|
| DE | 102004046634 | A1 | 3/2006 | |
| DE | 102017221049 | A1 | 5/2018 | |
| DE | 102017223429 | A1 | 7/2018 | |
| EP | 2662699 | A1 | 11/2013 | |
| EP | 3605135 | A1 | 2/2020 | |
| EP | 3757607 | A1 | 12/2020 | |
| EP | 3204788 | B1 * | 3/2022 | .......... G01S 13/345 |
| EP | 4036600 | A1 | 8/2022 | |
| EP | 4043919 | A1 | 8/2022 | |
| JP | 6523350 | B2 | 5/2019 | |
| JP | 2020186972 | A | 11/2020 | |
| WO | WO-2014150908 | A1 * | 9/2014 | .......... G01S 13/931 |
| WO | WO-2017148561 | A1 * | 9/2017 | ............ G01S 13/42 |
| WO | 2020007573 | A1 | 1/2020 | |
| WO | 2021096889 | A1 | 5/2021 | |

OTHER PUBLICATIONS

"Extended European Search Report", EP Application No. 23165460.9, Sep. 15, 2023, 16 pages.
"Extended European Search Report", EP Application No. 20155495.3, Aug. 7, 2020, 11 pages.
"Extended European Search Report", EP Application No. 20155499.5, Aug. 7, 2020, 11 pages.
"Extended European Search Report", EP Application No. 20155503.4, Jul. 24, 2020, 9 pages.
"Extended European Search Report", EP Application No. 20213050.6, May 25, 2021, 11 pages.
"Extended European Search Report", EP Application No. 21196393.9, Feb. 28, 2022, 11 pages.
"Extended European Search Report", EP Application No. 21196394.7, Mar. 4, 2022, 11 pages.
"Extended European Search Report", EP Application No. 21215410.8, Jul. 12, 2022, 9 pages.
"Extended European Search Report", EP Application No. 21216322.4, Jun. 3, 2022, 9 pages.
"Extended European Search Report", EP Application No. 22197753.1, Mar. 7, 2023, 17 pages.
"Extended European Search Report", EP Application No. 22200994.6, Aug. 11, 2023, 15 pages.
"FR5CPEC Radar sensor for vehicular use Teardown Internal Photos Robert Bosch GmbH", Retrieved at: https://fccid.io/NF3FR5CPEC/Internal-Photos/internal-Photos-4041421, Oct. 10, 2018, 6 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 4 pages.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Gu, et al., "Adaptive Beamforming via Sparsity-Based Reconstruction of Covariance Matrix", Compressed Sensing in Radar Signal Processing, 2019, 33 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Haardt, et al., "Unitary ESPRIT: How to Obtain Increased Estimation Accuracy with a Reduced Computational Burden", May 1995, 1232-1242.

(56) References Cited

OTHER PUBLICATIONS

Jiang, et al., "Joint DOD and DOA Estimation for Bistatic MIMO Radar in Unknown Correlated Noise", Nov. 2015, pp. 5113-5125.
Jin, et al. "Joint DOD and DOA estimation for bistatic MIMO radar", Feb. 2009, pp. 244-251.
Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.
Moffet, "Minimum-Redundancy Linear Arrays", IEEE Transactions on Antennas and Propagation, vol. AP-16, No. 2., Mar. 1968, pp. 172-175.
Pursuant to MPEP § 2001.6(b) the applicant brings the following co-pending application to the Examiner's attention: U.S. Appl. No. 17/075,632.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.
Roy, et al., "ESPRIT-Estimation of Signal Parameters via Rotational Invariance Techniques", Jul. 1989, pp. 984-995.
Steinwandt, et al., "Performance Analysis of ESPRIT-Type Algorithms for Co-Array Structures", Dec. 10, 2017, 5 pages.
Sun, et al., "MIMO Radar for Advanced Driver-Assistance Systems and Autonomous Driving: Advantages and challenges", Jul. 2020, pp. 98-117.
Tropp, et al., "Signal Recovery From Random Measurements via Orthogonal Matching Pursuit", IEEE Transactions on Information Theory, vol. 53, No. 12, Dec. 2007, pp. 4655-4666, Dec. 2007, 12 pages.
Trummer, "A Polarimetric 76-79 GHz Radar-Frontend for Target Classification in Automotive Use", Oct. 2016, 4 pages.
Vaidyanathan, et al., "Sparse Sensing with Co-Prime Samplers and Arrays", IEEE Trans. Signal Process., vol. 59, No. 2, Feb. 2011, pp. 573-586.
Van Trees, "Planar Arrays and Apertures", Essay in "Detection, Estimation, and Modulation Theory, Optimum Array Processing", pp. 231-274. Wiley-Interscience, May 2002, 44 pages.
Visentin, et al., "Analysis of Multipath and DOA Detection Using a Fully Polarimetric Automotive Radar", Apr. 3, 2018, pp. 570-577.
Wang, et al., "Two-Dimensional Beamforming Automotive Radar with Orthogonal Linear Arrays", 2019 IEEE Radar Conference, Boston, MA, Apr. 22-26, 2019., 6 pages.
Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.
Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.
Zhang, et al., "Flexible Array Response Control via Oblique Projection", IEEE Transactions on Signal Processing, vol. 67, No. 12, Jun. 15, 2019, pp. 3126-3139.
Zhou, et al., "A Robust and Efficient Algorithm for Coprime Array Adaptive Beamforming", IEEE Transactions on Vehicular Technology, vol. 67, No. 2, Feb. 2018, pp. 1099-1112.
Zoltowski, et al., "Closed-Form 2-D Angle Estimation with Rectangular Arrays in Element Space or Beamspace via Unitary ESPRIT", Feb. 1996, pp. 316-328.
Zoltowski, et al., "ESPRIT-Based 2-D Direction Finding with a Sparse Uniform Array of Electromagnetic Vector Sensors", Aug. 1, 2000, pp. 2195-2204.

\* cited by examiner

RADAR DEVICE

CROSS-REFERENCE TO RELATED APPLICATION(S)

This application is a continuation of U.S. patent application Ser. No. 17/153,806, filed Jan. 20, 2021, which claims priority to European Patent Application Number 20155499.5, filed Feb. 4, 2020, the disclosures of which are hereby incorporated by reference in their entireties herein.

TECHNICAL FIELD

The present disclosure relates to a method for operating an angle resolving radar device for automotive applications, an angle resolving radar device for automotive applications, and a vehicle with a radar device.

BACKGROUND

Radar devices are used in automotive applications to detect and locate target objects such as other vehicles, obstacles or lane boundaries. They may be placed at the front, at the rear or at the sides of a vehicle. Such radar devices usually comprise a signal generator to generate a radar signal, an antenna device for illuminating the target objects with the radar signal and for capturing the radar signal reflected back from the target objects and a signal receiver to analyze the radar signal reflected back from the target objects. The information extracted from the reflected radar signal may then be used for advanced driver's assist system (ADAS) functions, such as emergency brake assist, adaptive cruise control, lane change assist or the like.

Antenna devices for automotive applications usually comprise several transmit antennas and several receive antennas. Usually, the radar circuit is able to vary the individual signal components of the radar signal that are fed to individual transmit antennas independently from each other, for example in frequency, amplitude or phase. Likewise, it is able to analyze the individual signal components captured by the individual receive antennas independently from each other. Typically, each pair of transmit antenna and receive antenna defines a propagation channel for the radar signal from the respective transmit antenna to the target object and back to the respective receive antenna. When feeding the individual transmit antennas with orthogonal signals that are separable at the receiver and ensuring that each antenna is able to receive all signals transmitted, the number of propagation channels that are accessible for signal evaluation amounts to the product of the number of transmit antennas and the number of receive antennas.

For determining an angular position of a target object irradiated with the radar device, the transmit antennas and receive antennas are usually placed at different locations on the antenna device and the angular position of the target object is deduced from phase shifts acquired by the radar signals propagating along the individual propagation channels. For resolving the angular position of the target objects along a specific direction, the individual antennas of the radar device have to be displaced with respect to each other along said direction. Furthermore, the accuracy with which the angular position of the target object may be determined increases with the number of propagation channels and thus individual antennas available.

Increasing the number of individual addressable antennas and therefore the number of available propagation channels usually leads to an increased constructive complexity of the radar device as it is necessary to provide separate and individually configurable antenna signals for each individual antenna. To keep production costs low, typical radar devices for automotive applications only comprise a limited amount of individually addressable antennas, for example three transmit antennas and four receive antennas, resulting in a total of twelve available propagation channels. This ultimately limits angular resolution in angle resolving radar devices.

Accordingly, there is a need to improve the angular resolution of radar devices without unduly increasing their constructive complexity.

SUMMARY

The present disclosure provides a method for operating an angle resolving radar device for automotive applications, an angle resolving radar device for automotive applications, and a vehicle with a radar device. Embodiments are given in the subclaims, the description and the drawings.

In one aspect, the present disclosure is directed at a method for operating an angle resolving radar device for automotive applications with a radar circuit for transceiving antenna signals and an antenna device. The method includes routing at least a first antenna signal and a second antenna signal between the radar circuit and the antenna device, wherein the first and second antenna signals are routed between the radar circuit and the antenna device via a common signal port of the radar circuit, transducing, with the antenna device, between the first antenna signal and a first radiation field, the first radiation field having a first phase center, and transducing, with the antenna device, between the second antenna signal and a second radiation field, the second radiation field having a second phase center, wherein a location of the second phase center is shifted with respect to a location of the first phase center. The method further includes constructing, with a signal processing device of the radar device, at least one angle resolving virtual antenna array using the location of the first phase center of the first radiation field as a first antenna position and the location of the second phase center of the second radiation pattern as a second antenna position.

The present disclosure is based on the idea that the number of individual phase centers and thus the number of antenna positions that are available for determining the angular position of a target object may be increased by transducing separate radiation field having separate phase centers via a common signal port and by using the positions of the individual phase centers as antenna positions for constructing a virtual antenna array. Such a virtual antenna array may be, for example, a multiple input multiple output (MIMO) antenna array and the individual antenna signals, as well as the individual radiation fields may have mutually independent and separated parameters, such as phase codes, that allow to separate the individual antenna signals received from separate transmit antennas.

Typical radar devices, which usually employ radar circuits that are configured as monolithic microwave integrated circuits (MMICs), only have a limited number of transmit and receive ports that are each connected to only a single individually addressable antenna and thus only generate a single phase center for angle resolving applications. Increasing the number of individually addressable antennas and phase centers has to date only been possible by providing additional signal ports, each of which is connected to a single additional antenna. Therefore, for increasing angular resolution, it has been necessary to either increase the number of ports of the radar circuit or to combine several radar circuits in a phase coherent manner. Both solutions increase the complexity of the hardware of the radar device and thus cause considerable additional costs.

With the radar device of the present disclosure, it is possible to increase the number of antenna positions available for angle determination with only minimum additional hardware and thus with only minimal additional costs. The additional channels may, for example, be used to increase angular resolution in azimuthal and/or elevation direction.

For transducing between the first antenna signal and the first radiation field, antenna device comprises a first antenna, and for transducing between the second antenna signal and the second radiation field, the antenna device comprises a second antenna. The first and second antenna each comprise a set of antenna elements that constitute individual radiators of the antenna device.

According to the present disclosure, an antenna of the antenna device is generally formed by all antenna elements that collectively transduce between a radiation field of the antenna in the far-field region and its associated antenna signal handled by the radar circuit. Such an antenna may comprise a single antenna element or it may be configured as an array antenna that comprises a set of antenna elements that form individual radiating elements of the antenna and coherently transduce between the radiation field and the antenna signal. If the antenna is a receive antenna, the radiation field is an incoming radiation field that is captured by the antenna elements. If the antenna is a transmit antenna, the radiation field is an outgoing radiation field generated by the antenna elements.

The radiation field of an antenna has well-defined instantaneous field parameters in the far-field of the antenna like phase center, frequency, amplitude and the like. Likewise, each antenna has antenna parameters that define the characteristics of the antenna and its radiation field. These antenna parameters may be a radiation pattern, polarization, gain, directivity, location of phase center or antenna position, and the like.

An antenna signal associated with a radiation field of an antenna comprises all signal components that are routed between the radar circuit and the radar device that are transduced by the antenna and thereby represent the radiation field of the antenna. The signal processing device is configured to deduce from the antenna signal field parameters of the radiation field.

The common signal port rooting the first and second antenna signal may be a transmit port of the radar device and the first and second antenna may be transmit antennas of the antenna device. Alternatively, the common signal port may be a receive port of the radar device and the first and second antenna may be receive antennas of the antenna device.

The first and second antenna may generally comprise individual sets of antenna elements, whereby the antenna elements of the different sets are at least partly located at different positions on the antenna device. The first and second antenna may alternatively comprise the same set of antenna elements, which transduce the first and second antenna signal with different relative radiation parameters like amplitude, phases, or the like, and thus exhibit the first phase center when transducing the first antenna signal and the second phase center when transducing the second antenna signal. When comprising the same set of antenna elements, the first and second antenna have the same physical position on the antenna device but differ by the position of their respective phase center. For example, the phase center of the radiation field transduced by the common antenna elements may be shifted to one side of an arrangement of the common antenna elements by causing the antenna elements on this side to transduce with larger amplitudes than the antenna elements on the opposite side.

The first and second antenna of the antenna device differ in at least the position of their phase centers and the first and second antenna signal are transduced at different and well defined physical locations on the antenna device that are given by the respective phase centers of the first and second antenna. Additionally, the first and second antenna may differ in further antenna parameters. Such antenna parameters may be, for example, radiation pattern and/or gain and/or directivity and/or polarization, or the like. When comprising common antenna elements, different further antenna parameters, for example different polarizations, of the first and second antenna may be caused by different excitation patterns of the individual common antenna elements, for example due to feeding the common antenna elements with the first and second antenna signal from different sides.

The first set of first antenna elements of the first antenna and the second set of antenna elements of the second antenna may be disjunct so that the first antenna and the second antenna do not comprise any common antenna elements and are spatially completely separate. The first and second sets of antenna elements may also contain one or more common antenna elements, for example, the second antenna may comprise all antenna elements of the first antenna. Finally, the first and second set may be equal so that the first and second antenna are entirely built from the same common antenna elements.

The individual antenna elements may be conductively or proximity coupled to each other. They may be configured as, for example, several individual slots and/or several individual patches. The individual antenna elements may be coupled in series and/or in parallel. For example, the individual antennas may be configured as series fed antenna arrays or as corporate fed antenna arrays.

The angle resolving virtual antenna array may be constructed from both the first antenna signal and the second antenna signal. Alternatively, the virtual antenna array may be constructed from one of the first and second antenna signal and another antenna array may be constructed from the other antenna signal. For constructing the antenna array, the signal processing device uses further antenna signals that are transduced by the antenna device, each antenna signal being transduced with separate phase center.

The first and second antenna signal may be used to construct a single virtual antenna array. In alternative embodiment, the first antenna signal is used to construct a first virtual antenna array and the second antenna signal is used to construct a second virtual antenna array. In this case, the first antenna transducing the first antenna signal is part of a first set of first antennas that are used to construct the first virtual array and the second antenna transducing the second antenna signal is part of a second set of second antennas that are used to construct the second virtual array. The individual first antenna signals transduced by the transmit antennas of the first set of antennas are generated with mutually independent first separability parameters and the individual second antenna signals transduced by the transmit antennas of the second set of antennas are generated with mutually independent second separability parameters. The separability parameters may, for example, employ phase shift keying, for example binary phase shift keying, or phase modulation, for example binary phase modulation, or the like.

Each pair of transmit and receive antenna within the individual sets of antennas then realizes a separate propagation channel. The signal processing device may resolve the individual propagation channels within the different sets of antennas using the separability parameters of the individual antenna signals transduced via the antennas of the corresponding set. The signal processing device may determine the propagation and/or reflection properties of the individual propagation channels by comparing the antenna signals that are transmitted and received via the antennas associated with the individual propagation path.

The radar circuit of the radar device comprises all parts of the radar device that process the antenna signals at the radar frequency used for illuminating the target objects. The radar circuit thus constitutes a radar front end of the radar device. The radar circuit may comprise a signal generator for generating the antenna signals and a signal receiver for receiving and measuring the antenna signals. The radar circuit may be configured as a transceiver comprising a transmitter, for example the signal generator, and the receiver.

The radar circuit is configured to handle or transceive the antenna signals. It may handle the antenna signals by generating them at the signal generator based on at least one control signal and/or it may transceive the antenna signals by evaluating or measuring them at the signal receiver to generate at least one data signal. Likewise, the antenna signals may be routed between the radar circuit and the antenna device by sending them from the radar circuit to the antenna device and/or by sending them from the antenna device to the radar circuit.

The signal generator may be configured to generate the antenna signals based on at least one control signal, for example based on at least one digital control signal, that the signal generator receives from the signal processing device of the radar device. For generating the antenna signals from the at least one control signal, the signal generator comprises one or more transmit chains. Each transmit chain is configured to convert one control signal into one transmit radar signal and to output this transmit radar signal to one signal port of the radar circuit that is connected to an antenna port of the antenna device. The transmit radar signals generated by the transmit chains then provide the first and second antenna signal. Thereby, a single radar signal generated by a single transmit chain comprises or constitutes the first and second antenna signal, for example it may comprise the first antenna signal as a first signal portion and the second antenna signal as a second signal portion. The radar signal may consist of the first and second signal portion only or it may comprise further signal portions, for example a third signal portion.

Each transmit chain may comprise, for example, a digital to analog converter (DAC) that is controlled by the control signal controlling the transmit chain and/or one or several signal control devices that are likewise controlled by the control signal and shape the transmit radar signal generated by the transmit chain. Such signal control devices may be configured as, for example, variable attenuators or amplifiers, variable phase shifters, and/or the like. The signal generator may receive the control signals from the signal processing device of the radar device. The control signals may, for example, be digital control signals.

For generating the at least one data signal from the antenna signals, the signal receiver comprises one or more receive chains. Each receive chain is configured to receive one receive radar signal via a signal port of the radar circuit that is connected to an antenna port of the antenna device, to convert the receive radar signal into one data signal and to output the data signal to the signal processing device. The receive radar signals received by the receive chains then comprise or constitute the first and second antenna signal. Thereby, a single radar signal received by a single receive chain comprises or constitutes the first and second antenna signal, for example, it may comprise the first antenna signal as a first signal portion and the second antenna signal as a second signal portion. The radar signal may consist of the first and second antenna signal only or it may comprise a further antenna signal as a further signal portion, for example a third antenna signal as a third signal portion, Each receive chain may comprise, for example, an analog to digital converter (ADC) that samples the radar signal and generates the data signal outputted by the receive chain and/or one or more signal conditioning devices such as low noise amplifiers, programmable filters, mixers, and/or the like that shape the radar signal prior to sampling. The data signal representing the received radar signal may be a digital data signal.

The radar circuit may be configured to handle several independent radar signals, for example to generate several independent transmit radar signals from several independent control signals and/or to measure several independent receive radar signals to generate several independent data signals. The signal generator may then comprise several transmit chains, one transmit chain for each transmit radar signal and/or the signal receiver may then comprise several receive chains, one receive chain for each receive radar signal. Each transmit chain is configured to generate an individual transmit radar signal from an individual control signal, the individual control signals and transmit radar signals being mutually independent from each other. Likewise each receive chain is configured to measure an individual receive radar signal received from the antenna device and to generate an individual data signal from the respective receive radar signal, the individual receive radar signals and individual data signals being mutually independent from each other.

In general, each radar signal may comprise a multitude of signal portions, in particular more than two signal portions. The individual signal portions may each span a different frequency band and constituting a separate antenna signal. For example, the radar circuit may comprise three transmit chains and four receive chains, each chain being connected to at least one antenna of the antenna device.

The individual transmit chains are coupled to the antenna device via individual transmit ports of the radar circuit and the individual receive chains are coupled to the antenna device via individual receive ports of the radar circuit. Each transmit port is coupled to one of the transmit chains of the radar circuit and is schematically located between the transmit chain and the antenna device and each receive port is coupled to one of the receive chains of the radar circuit and is schematically located between the receive chain and the antenna device. Each individual transmit port of the radar circuit may therefore be schematically located between the last signal control device of its associated transmit chain and the antenna device. Likewise, each receive port of the radar circuit may be schematically located between the antenna device and the first signal conditioning device of its associated receive chain. The transmit ports and the receive ports constitute signal ports of the radar circuit.

According to the present disclosure, an antenna signal is defined as the signal that is transduced by an individual antenna of the antenna device. Likewise, a radar signal is defined as the signal that is routed via an individual signal port of the radar circuit and that is processed by a single transmit chain or a single receive chain of the radar circuit. One radar signal may comprise a single antenna signal, for example if only one antenna is connected to the signal port routing the radar signal, or it may comprise several antenna signals, such as the first and second antenna signal, for example if more than one antenna, such as the first and second antenna, is connected to a common signal port routing the radar signal. In the latter case, each antenna signal constitutes a separate signal portion of the radar signal.

The individual radar signals and/or individual antenna signals may exhibit individual and mutually independent signal parameters, such as phases, amplitudes, chirps, phase shifts, code sequences, for example binary phase shift codes, and/or the like. The mutually independent signal parameters may constitute an orthogonal and linearly independent set of parameters. The individual and mutually independent signal parameters may amount to separability parameters that ensure separability among the individual radar signals after reception, for example for constructing the virtual antenna array.

The radar circuit may be configured in an integrated circuit. The radar circuit may be configured in this single integrated circuit only or it may be distributed over one or more additional integrated circuits. The integrated circuits may be phase coherently coupled to each other. The integrated circuits may be configured, for example, as monolithic microwave integrated circuits (MMICs). The individual ports of the radar circuit may be physical connection points of one or several integrated circuits of the radar circuit, for example of a MMIC comprising the radar circuit. They also may be logical or conceptual ports that are located at signal lines between the transmit chains and the antenna device and/or at signal lines between the receive chains and the antenna device, respectively, for example in radar devices, in which individual components of the radar circuit and the antenna device are integrated on a common carrier, like a common substrate.

If the radar circuit comprises an integrated circuit, the common signal port may be configured as an external connection point of the integrated circuit. Routing the first and second antenna signal via the common signal port then effectively doubles the individual antenna positions and propagation channels that are addressable via the connection point forming the common signal port.

The antenna device may transduce the antenna signals by converting them into electromagnetic radiation that is emitted towards the target object irradiated by the antenna device and/or it may transduce the antenna signals by receiving electromagnetic radiation scattered back by the target object and by converting the received electromagnetic radiation into the antenna signals. The individual antenna elements of an antenna may be conductively coupled to their respective signal port of the radar circuit. They also may be proximity coupled, for example via conductive or inductive coupling. The individual antennas may be configured as substrate integrated antennas such as microstrip patch antennas or slotted substrate integrated waveguide (SIW) antennas. They also may be configured as end-fire antennas, 3D antennas or metallized plastic antennas.

The radar device may be configured to adaptively activate the first antenna by transceiving the first antenna signal and to adaptively activate the second antenna by transceiving the second antenna signal. Analogously, the radar device may be configured to adaptively activate individual sets of antennas, for example a first set comprising the first antenna and a second set comprising the second antenna. For example, the radar device may adaptively activate the first or second antenna or the individual sets of antennas, such as the first and second set, depending on a traffic scenario in which the radar device is being used. One such traffic scenario may be, for example, normal driving along a street and another traffic scenario may be, for example, parking. The first antenna or first set of antennas may provide a short-range radar for monitoring traffic within a first distance in front of the car, for example during parking, and the second antenna or second sets of antennas may provide a long-range radar for monitoring traffic within a second distance, for example during normal driving. The second distance may be longer than the first distance, for example by a factor of 2, 5, 10, or 100.

The radar device may be configured to cyclically activate the individual sets of antennas. Alternatively, it may be configured to simultaneously activate the individual sets of antennas.

The radar device may be configured as a continuous wave (CW) radar device and the antenna signals may exhibit a signal modulation that is used for determining the target distance. Such a signal modulation may be a frequency modulation, a phase modulation, or the like. The radar device may therefore be configured as a frequency modulated continuous wave (FMCW) or as a phase modulated continuous wave (PMCW) radar device.

The FMCW radar device may employ simultaneous transmit and receive pulse Doppler (STAR PD) signals. With these STAR PD signals, the first and second signal portion may each comprise a multitude of pulsed frequency sweeps over the first and second frequency band, respectively. The individual frequency sweeps may each exhibit constant slope, for example constant falling linear slope. The signal processing device of the radar device may then be configured to transform each individual sweep into a set of range bins by performing a first Fourier transform, for example a fast Fourier transform, on the individual frequency sweeps. The signal processing device may further be configured to transform the individual range bins into Doppler bins via a second Fourier transform, for example a fast Fourier transform, whereby the second Fourier transform uses, for a given range bin, all signals for that specific range bin from all pulsed sweeps.

The first antenna signal may span a first frequency band and the second antenna signal may span a second frequency band, wherein the first and second frequency band may be different from each other, for example separate from each other. The first and second antenna signal may have a frequency gap in between them. The frequency gap may amount to at least a tenth, at least a fifth, at least a third or at least one half of the frequency span of the first and/or second frequency band. The frequency gap may amount to at most a tenth, at most a fifth, at most a third or at most one half of the frequency span of the first and/or second frequency band. Alternatively, the first frequency band may directly adjoin the second frequency band so that the first and second antenna signal exhibit no frequency gap in between them. The first antenna signal may exhibit a first frequency modulation and the second antenna signal may exhibit a second frequency modulation.

The signal processing device may comprise a ranging module that is configured to jointly process the first and second antenna signal to determine the distance to a target object irradiated by the antenna device. By jointly processing the first and second antenna signal, the signal processing device may evaluate both the first and second frequency modulation to determine the distance to the target object. In general, each set of antenna signals transceived by the radar circuit may exhibit an individual signal modulation. The signal processing device may be configured to jointly process a subset of the antenna signals or all antenna signals to determine the distance to the target object. Thereby, the signal processing device may evaluate a subset of the individual signal modulations or all individual signal modulations to determine the distance to the target object.

The first antenna signal may exhibit a first signal modulation and the second antenna signal may exhibit a second signal modulation. By jointly processing the first and second antenna signal, the signal processing device may evaluate both the first and second signal modulation to determine the distance to the target object. In general, each set of antenna signals transceived by the radar circuit may exhibit an individual signal modulation. The signal processing device may be configured to jointly process a subset of the antenna signals or all antenna signals to determine the distance to the target object. Thereby, the signal processing device may evaluate a subset of the individual signal modulations or all individual signal modulations to determine the distance to the target object.

A propagation delay of the antenna signals between the radar device and the target object and thus the distance to the target object may be determined from a modulation difference, such as a frequency or phase difference, between the antenna signals reflected by the target object and a reference signal provided within the radar device. The reference signal may be, for example, the antenna signals that are being transmitted during reception of the reflected antenna signals. To obtain the modulation difference, the signal processing device may be configured to mix the reflected antenna signals with the corresponding reference signals.

If the signal modulation constitutes a frequency modulation, the first antenna signal may exhibit a first frequency modulation that spans the first frequency band and the second antenna signal may exhibit a second frequency modulation that spans the second frequency band, so that the bandwidth of the first frequency modulation equals the first frequency band and the bandwidth of the second frequency modulation equals the second frequency band. The bandwidth of a combined antenna signal that is obtained by jointly processing the first and second antenna signal with the ranging device then spans both the first frequency band and the second frequency band. The second frequency modulation of the second antenna signal may be a frequency shifted version of the first frequency modulation of the first antenna signal so that the instantaneous frequency of the second antenna signal is given by adding the instantaneous frequency of the first antenna signal and a constant frequency shift.

The individual frequency modulations may be cyclically repeated. The radar circuit may be configured to first generate the first antenna signal and to then generate the second antenna signal and the antenna device may be configured to first transduce the first antenna signal and to then transduce the second antenna signal. When cyclically repeating the first and second frequency modulation, the first antenna signal and the second antenna signal may be alternately generated by the radar circuit and subsequently transduced by the antenna device.

The signal processing device may be configured to jointly process the first antenna signal spanning first frequency band and the second antenna signal spanning the second frequency band by generating a combined antenna signal that spans both the first and second frequency band and comprises the first and second antenna signal. The combined antenna signal may be generated by concatenating the first and second antenna signal. In general, the signal processing device may be configured to jointly process a multitude of antenna signals, for example more than two antenna signals, each antenna signal spanning a different frequency band.

For example, the radar circuit may be configured to transceive a third antenna signal occupying a third frequency band that is different from the first frequency band of the first antenna signal and the second frequency band of the second antenna signal, wherein the ranging module is configured to jointly process the first, second and third antenna signal to determine the distance to the target object irradiated by the first, second and third antenna signal. The third antenna signal may be transduced via at least one of the first and second antenna coupled to the common signal port.

With this embodiment, at least one of the first antenna or the second antenna transduces when sweeping the radar signal routed via the common signal port over a combined frequency band spanning the first frequency band, the third frequency band and the second frequency band. Therefore, target objects that are located in the radiation field of both the first and second antenna are irradiated over the complete combined frequency band and the complete combined frequency band may be used to determine target properties of those target objects, like, for example, their distance and/or velocity. As the resolution for determining target properties, for example distance, is typically proportional to the bandwidth of the radiation used by the radar device, the target properties of target objects that are irradiated over the full combined frequency band may be determined with higher resolution than target properties of target objects that are only irradiated with radiation within the first or second frequency band.

The third frequency band may lie between the first and second frequency band. The third frequency band may, for example, cover the entire frequency range between the first and second frequency band. This maximizes the bandwidth of the combined antenna signal used to determine the distance to the target object and therefore the resolution with which the distance to the target object may be resolved. Alternatively, third frequency band may also be separated by a first frequency gap from the first frequency band and/or by a second frequency gap from the second frequency band.

The antenna device may be configured to transduce the third antenna signal via both the first antenna and the second antenna. This enhances the signal strength of the combined antenna signal and therefore the accuracy of the distance determination.

Additionally to jointly process the first and second antenna signal, the signal processing device may be configured to separately process the first and second antenna signal to obtain target information that is only accessible to one of the first and second antennas and not to the other one. The accessibility of such target information may, for example, result from different antenna parameters and/or different antenna fields of the first and second antenna transducing the first and second antenna signal, respectively, such as different antenna gains and/or different signal-to-noise ratios of the received antenna signals and/or different antenna fields of view and/or different angular resolutions in azimuthal and/or elevation direction and/or different polarizations or the like. In general, the signal processing device may be configured to separately process the individual antenna signals of a multitude of antenna signals to obtain target information that is only accessible to one of the antenna signals and not the others.

The individual antenna signals are oscillating electromagnetic signals, such as microwave signals. The radar frequencies of the antenna signals may be at least 1 GHz, at least 30 GHz, at least 60 GHz or at least 70 GHz. They may be at most 200 GHz, at most 100 GHz, at most 85 GHz, at most 60 GHz or at most 40 GHz. The radar frequencies of the antenna signals may lie, for example between 31 GHz and 37 GHz or between 75 GHz and 85 GHz, or between 76 GHz and 81 GHz. The first frequency band of the first antenna signal may lie between 75 GHz and 78 GHz, for example between 75.5 GHz and 77.5 GHz, and the second frequency band of the second antenna signal may lie between 79 GHz and 82 GHz, for example between 79.5 GHz and 81.5 GHz. Alternatively, the first and second antenna signal may also span the same frequency band and may be alternately routed, for example by a switching device, to a first antenna transducing with the first phase center and a second antenna transducing with the second phase center.

The radar device may be used in automotive applications to detect and locate target objects such as other vehicles, obstacles or lane boundaries. Such target objects may be placed at the front, at the rear or at the sides of a vehicle The radar device may be mounted to a vehicle. The radar device may be configured as an interior radar device that captures target reflection from a passenger compartment of the vehicle or as an exterior radar device that captures target reflections from the outer environment of the vehicle, for example as a front radar or a side radar or a rear radar. The radar device may be part of a vehicle control system and may be connected to a control device of the vehicle control system. The control device may be configured to perform advanced driver's assist functions, such as adaptive cruise control, emergency brake assist, lane change assist or autonomous driving, based on the data signals received from the radar device. The control device and/or the signal processing device of the radar device may be configured as programmable logic devices, such as programmable logic controllers, FPGAs, ASICs or microprocessors.

The signal processing device is configured to separately process the first and second antenna signal to detect from the first antenna signal target reflections via a first propagation channel and to detect from the second antenna signal target reflections via a second propagation channel. By separately processing the first and second antenna signal, the target information obtained by the radar device may be enhanced.

The first and second propagation channel exhibit different antenna positons that are given by the first and second phase center, respectively. The signal processing device processes the data from the individual propagation channels to construct the at least one virtual antenna array. Additionally, the first and second propagation channel may have different further propagation channel properties like polarization and/or field of view, for example in elevation direction and/or in azimuthal direction, and/or radiation direction, and/or detection range, and/or signal gain, and/or the like.

The antenna device may be configured to transduce the first antenna signal with a first polarization and to transduce the second antenna signal with a second polarization, wherein the second polarization is different from, for example orthogonal to, the first polarization. Consequently, the first radiation field has the first polarization and the second radiation field has the second polarization.

For example, the first polarization and the second polarization may be linear polarizations, and one of the first and second antenna signals may be transduced with horizontal linear polarization and the other one of the first and second antenna signals may be transduced with vertical linear polarization. The first polarization and the second polarization may also be circular polarizations, and one of the first and second antenna signals may be transduced with left-handed circular polarization and the other one of the first and second antenna signals may be transduced with right-handed circular polarization.

Transducing the first antenna signal and the second antenna signal with different polarizations improves the isolation between the first propagation channel constructed from the first antenna signal and the second propagation channel constructed from the second antenna signal when forming the virtual antenna array. If the antenna device comprises a first set of antennas including the first antenna transducing the first antenna signal and a second set of antennas including the second antenna transducing the second antenna signal, all antennas of the first set may transduce with the first polarization and all antennas of the second set may transduce with the second polarization. Therefore, all first propagation channels constructed from the first set the antennas may operate at the first polarization and all second propagation channels constructed from the second set may operate at the second polarization.

When evaluating the data signals generated from the received antenna signals in the signal processing device, the different polarizations of the first and second antenna signal may be used, for example, for classification of the detected target objects. In this way, polarimetric properties of the target objects may be detected and used during object classification by the signal processing device. This object classification may be performed, for example, by machine-learned algorithms that have been trained on data signals representing the polarimetric properties of different training target objects.

A first antenna transducing the first antenna signal may have a first field of view, the first field of view having a first extent along a lateral direction, and a second antenna transducing the second antenna signal may have a second field of view, the second field of view having a second extent along the lateral direction, wherein the first extent is larger than the second extent.

This allows the radar device to perform different radar functions that necessitate different fields of view. For example, the data signals from the second antenna may be used by the signal processing device for long-range radar (LRR) functions and/or adaptive cruise control and/or emergency brake assist, and the data signals from the first antenna may be used for mid-range radar (MRR) or short-range radar (SRR) functions and/or lane change assist, and/or cross traffic detection, and/or parking assist.

If the antenna device has a first set of antennas comprising a first antenna transducing the first antenna signal and a second set of antennas comprising a second antenna transducing the second antenna signal, all antennas of the first set may have the first field of view and/or all antennas of the second set may have the second field of view along the lateral direction. First propagation channels constructed from the antennas of the first set then comprise first propagation paths that are located within the first field of view and second propagation channels constructed from the antennas of the second set then comprise second propagation paths that are located within the second field of view. Besides the different propagation paths, the first and second propagation channels may additionally differ by the polarization of the first radar signal and the second radar signal.

To realize a small field of view, the second antenna may comprise a multitude of antenna elements that are placed next to each other along the lateral direction and form a phased array that narrows the beam solid angle of the second antenna in the lateral direction. The first antenna may comprise a multitude of antenna elements that form a larger beam solid angle than the antenna elements of the second antenna, for example, due to the first antenna having a smaller number of antenna elements than the second antenna.

The antenna device may be configured to capture target reflections of the first antenna signal from target positions within a first range and to capture target reflections of the second antenna signal from target positions within a second range, wherein the first range is smaller than the second range. By evaluating the first or second antenna signal, the radar device may therefore use antenna configurations having different target ranges.

If the antenna device has a first set of antennas comprising a first antenna transducing the first antenna signal and a second set of antennas comprising a second antenna transducing the second antenna signal, all antennas of the first set of antennas may be configured to capture target reflections within the first range and all antennas of the second set of antennas may be configured to capture target reflections within the second range.

The second antenna transducing the second antenna signal may comprise antenna elements of the first antenna transducing the first antenna signal. The second antenna may comprise only a part of the antenna elements of the first antenna or it may comprise all antenna elements of the first antenna. Besides the antenna elements of the first antenna, the second antenna may comprise additional antenna elements that do not form part of the first antenna. Transducing the second antenna signal via a second antenna that comprises at least parts of the antenna elements of the first antenna and additional antenna elements allows to transduce the second antenna signal within a different, for example narrower, solid angle than the first antenna signal. Therefore, the field of view of the antenna device may be different, for example narrower, when transducing the second antenna signal than when transducing the first antenna signal. The additional antenna elements may be positioned symmetrically on both sides of the antenna elements of the first antenna.

Alternatively, the antenna device may be configured to transduce the second antenna signal only via additional antenna elements and not via antenna elements also transducing the first antenna signal. The first and second antenna signal are then transduced from separate and dedicated antennas that are both coupled to the common signal port.

In general, a multitude of antennas that include the first and second antenna may be coupled to the common signal port of the radar circuit. The radar signal generated by the radar circuit and routed via the common signal port may then comprise as individual signal portions a multitude of antenna signals, for example one antenna signal for every antenna connected to the common signal port. In particular, more than two antennas may be coupled to the common signal port and the radar signal may comprise more than two antenna signals. The individual antenna signals may each occupy a separate frequency band. The antenna device may be configured to transduce each antenna signal via a separate associated antenna of the antenna device.

In total, several or all ports of the radar circuit may be configured as common signal ports and may be simultaneously coupled to an associated first antenna transducing a first antenna signal and to an associated second antenna transducing a second antenna signal. Each individual radar signal that is generated by the radar circuit and that is fed to a common signal port shared by two or more antennas may then comprise one of first antenna signals and one of the second antenna signals, both antenna signals being routed via the common signal port.

For example, all signal ports of the radar circuit may be configured as common ports and the radar circuit may generate all radar signals with a first antenna signal and a second antenna signal. Alternatively, at least one, but not all signal ports of the radar circuit may be configured as common signal ports and at least one radar signal may comprise both a first and a second antenna signal, but at least one other of the radar signals may comprise a first antenna signal only and/or at least one other of the radar signals may comprise a second antenna signal only. The individual first signals may all occupy a first frequency band and the individual second signals may all occupy a second frequency band so that the first and second antenna signals of the radar signals share the bandwidth of their common signal port and transmit or receive chain.

The signal processing device may be configured to separate the first antenna signal and the second antenna signal from each radar signal received via a common signal port, for example by filtering out the first frequency band to obtain the first antenna signal and by filtering out the second frequency band to obtain the second antenna signal. Filtering may be performed by analog filtering prior to sampling and/or by digital filtering after sampling.

According to an embodiment, the antenna device comprises a first antenna element that is part of a first antenna and a second antenna element that is part of a second antenna, and the first and second antenna element are both coupled to the common signal port. The antenna device routes the first antenna signal between the common signal port and the first antenna element, but not between the common signal port and the second antenna element, and the second antenna signal between the common signal port and at least the second antenna element.

The first antenna then has the first phase center and the second antenna then has the second phase center. By only transducing the first antenna signal via the first antenna element and not via the second antenna element, the first phase center may be shifted with respect to the second phase center towards the first antenna element.

According to an embodiment, the first antenna signal occupies a first frequency band and the second antenna signal occupies a second frequency band that is different from the first frequency band, wherein the antenna device is configured as a frequency selective antenna device that transduces the first antenna signal occupying the first frequency band via the first antenna element, but not via the second antenna element and that transduces the second antenna signal occupying the second frequency band at least via the second antenna element.

The radar circuit may then be configured to activate dedicated antennas, such as the first antenna transducing the first antenna signal or the second antenna transducing the second antenna signal, by varying or switching its operating frequency band. Therefore, the full bandwidth of the radar circuit that is routed via the common signal port may be shared among two or more antennas.

Frequency selectivity of the antenna device may, for example, be realized by employing a frequency selective first antenna and a frequency selective second antenna that are directly and simultaneously coupled to the common signal port. It may also be realized by coupling the first and second antenna to the common signal port via a signal routing device such as a frequency selective multiplexer or a switching device that selectively couples the first antenna or the second antenna to the common signal port. Frequency selectivity may also be realized by coupling the first antenna via a first filter and/or the second antenna via a second filter to the common signal port, wherein the first filter passes the first frequency band and blocks the second frequency band and wherein the second filter passes at least the second frequency band.

The first antenna may be configured to only transduce the first antenna signal and not the second antenna signal by suppressing transduction of the second antenna signal compared to the first antenna signal by at least 10 dB, at least 20 dB, at least 30 dB, at least 40 dB, or at least 50 dB. Likewise, the second antenna may be configured to only transduce the second antenna signal and not the first antenna signal by suppressing transduction of the first antenna signal compared to the second antenna signal by at least 10 dB, at least 20 dB, at least 30 dB, at least 40 dB, or at least 50 dB In general, the antenna device may comprise multiple sets of antennas, wherein all antennas of the individual sets transduce antenna signals occupying the same frequency band and wherein the frequency bands of the individual sets mutually differ from each other. For example, the antenna device may comprise a first set of antennas transducing in the first frequency band, wherein the first set includes the first antenna, and a second set of second antennas transducing in the second frequency band, wherein the second set includes the second antenna.

The antennas within each individual set of antennas may then transduce individual sets of antenna signals, each antenna signal spanning the frequency band of the corresponding set of antennas. For example, the antenna signals transduced by the antennas of the first set of antennas may constitute a first set of first antenna signals and the antenna signals transduced by the antennas of the second set of antennas may constitute a second set of second antenna signals.

The individual antenna signals occupying the same frequency band may exhibit mutually independent, for example mutually orthogonal, separability parameters that distinguish them from each other. For example, the individual first antenna signals may exhibit individual first separability parameters that distinguish them from each other and the individual second antenna signals may exhibit individual second separability parameters that distinguish them from each other. As all first antenna signals are distinguishable from all second antenna signals by their frequency band, the same values of separability parameters may be used for one of the first antenna signals and one of the second antenna signals.

If the antenna device comprises multiple sets of antennas transducing in individual frequency bands, for example a first set of antennas transducing in the first frequency band and the second set of antennas transducing in the second frequency band, the signal processing device may separately process the individual sets of antenna signals to construct separate virtual antenna arrays.

According to an embodiment, the second antenna signal is routed to the second antenna element via at least one frequency filter that is coupled between the first and second antenna element. The filter may block the first antenna signal and only transduce the second antenna signal. The first antenna element may then be configured to only transduce the first antenna signal or it may be configured to transduce both the first and second antenna signal.

According to an embodiment, the first and second antenna element are coupled to the common signal port via a switching device that selectively couples or decouples one of the first antenna element and the second antenna element to or from the common signal port. The switching device may be configured to selectively couple either the first antenna element or the second antenna element to the common signal port. Switching device may be configured to route the entire bandwidth of the radar signal routed via the common signal port and the first and second antenna signal may both span this entire bandwidth. The switching device may be configured as a microwave switch.

According to an embodiment, constructing the at least one angle resolving virtual antenna array comprises constructing, using the first antenna position, a first angle resolving antenna array that resolves targets along a first direction and constructing, using the second antenna position, a second angle resolving antenna array that resolves targets along a second direction.

This allows operating two different angle resolving antenna arrays via the common signal port. The first direction may be an azimuthal direction or an elevation direction with respect to a ground surface navigated by a vehicle comprising the radar device. Likewise, the second direction may be the azimuthal direction or the elevation direction.

The first virtual array of antennas may be constructed from the first set of antennas that include the first antenna transducing the first antenna signal and the second virtual array of antennas may constructed from the second set of antennas that include the second antenna transducing the second antenna signal. The individual antennas of the first set are displaced with respect to each other along the first direction and the individual antennas of the second set are displaced with respect to each other along the second direction. The virtual arrays of antennas may be constructed from the target reflections received via the individual propagation channels established by the antennas of the first or second set of antennas.

The first virtual array of antennas may be used to resolve individual targets irradiated by the radar device along the first direction and the second virtual array of antennas may be used to resolve the individual targets along the second direction. The first and the second array may have, for example, the same angle resolution. The first and the second array may also have mutually different angle resolutions. The first array may comprise a different number of antennas than the second array and/or the antennas of the first array may be arranged with different spacing than the antennas of the second array. For example, the first array may have a higher number of antennas than the second array and/or the antennas of the first array may be arranged with a smaller spacing than the antennas of the second array and the angle resolution along the first direction may be larger than the angle resolution along the second direction.

The virtual antennas of the first virtual antenna array may have even first distances in between them. For example, the first distances may amount to half the wavelength of a selected frequency of the first antenna signal, for example of a frequency within the first frequency band of the first antenna signal, such as the center frequency of the first frequency band. Analogously, the virtual antennas of the second virtual antenna array may have even second distances in between them. For example, the second distances may amount to half the wavelength of a selected frequency of the second antenna signal, for example of a frequency within the second frequency band, such as the center frequency of the second frequency band. Alternatively, the first distance may equal the second distance. For example, the first and second distance may amount to the wavelength at a selected frequency that is in between the first and second frequency band, for example, at the center between a minimum frequency of the first frequency band and a maximum frequency of the second frequency band or at the center between a maximum frequency of the first frequency band and a minimum frequency of the second frequency band.

According to an embodiment, the first direction is parallel to the second direction. In this case, the first and second direction both may be the azimuthal direction or they both may be the elevation direction. According to an alternative embodiment, the first direction is different from, for example orthogonal to, the second direction.

With this embodiment, the first direction may be the azimuthal direction with respect to the ground surface navigated by the vehicle comprising the radar device, and the second direction may be the elevation direction with respect to the ground surface.

According to an embodiment, the first antenna array is constructed from the first antenna position and at least one additional first antenna position, and the second antenna array is constructed from the second antenna position and at least one additional second antenna position, wherein the additional first antenna position is defined by an additional first phase center of an additional first radiation pattern and the additional second antenna position is defined by an additional second phase center of an additional second radiation pattern. The additional second phase center is positioned at a different location on the antenna device than the additional first phase center and the antenna device transduces between an additional first antenna signal and the additional first radiation pattern and between an additional second antenna signal and the additional second radiation pattern. Thereby, the additional first antenna signal and the additional second antenna signal are both routed via an additional common signal port between the radar circuit and the antenna device.

The additional first radiation field is transduced by an additional first antenna and the additional second radiation field is transduced by an additional second antenna. The first antenna transducing the first radiation field and the additional first antenna may be part of the first set of antennas from which the first virtual antenna array is constructed and the second antenna transducing the second radiation field and the additional second antenna may be part of the second set of antennas from which the second virtual antenna arrays constructed. All antennas of the first set may transduce within the same first frequency band and all antennas of the second set may transduce in the same second frequency band. To each port of the radar circuit, one of the first antennas and one of the second antennas may be coupled.

According to an embodiment, the first phase center and the second phase center are shifted with respect to each other along the second direction, and the additional first phase center and the additional second phase center are shifted with respect to each other along the second direction. Furthermore, the first phase center and the additional first phase center are located at the same position along the second direction and are shifted with respect to each other along the first direction.

This allows to realize to separate virtual antenna arrays, wherein the first antenna array is constructed from the first phase centers and allows determining the angular position of the target object along the first direction and wherein the second antenna arrays constructed from the second phase centers and allows determining the angular position of the target object along the second direction.

According to an embodiment, the second phase center is shifted from the first phase center along the second direction in the opposite sense than the additional second phase center is shifted from the additional first phase center. This realizes a large distance between the second phase centers.

In another aspect, the present disclosure is directed at an angle resolving radar device for automotive applications comprising a radar circuit for transceiving antenna signals and an antenna device, wherein the radar circuit and the antenna device are connected via a common signal port of the radar circuit and configured to route at least a first antenna signal and a second antenna signal between the radar circuit and the antenna device. Thereby, the first and second antenna signal are routed between the radar circuit and the antenna device via the common signal port. The antenna device is configured to transduce between the first antenna signal and a first radiation field, the first radiation field having a first phase center, and the antenna device is configured to transduce between the second antenna signal and a second radiation field, the second radiation field having a second phase center, wherein a location of the second phase center is shifted with respect to a location of the first phase center. A signal processing unit of the radar circuit is configured to construct at least one angle resolving virtual antenna array using the location of the first phase center of the first radiation field as a first antenna position and the location of the second phase center of the second radiation pattern as a second antenna position.

The radar device may perform the method according to the present disclosure. Therefore, all embodiments and effects disclosed in relation to the method also pertain to the radar device and vice versa.

In another aspect, the present disclosure is directed at a vehicle with a radar device according to the present disclosure. The radar device may be a front radar of the vehicle. All embodiments and effects that are disclosed in connection with the radar device also apply to the vehicle of the present disclosure and vice versa.

DETAILED DESCRIPTION

Figure 1:
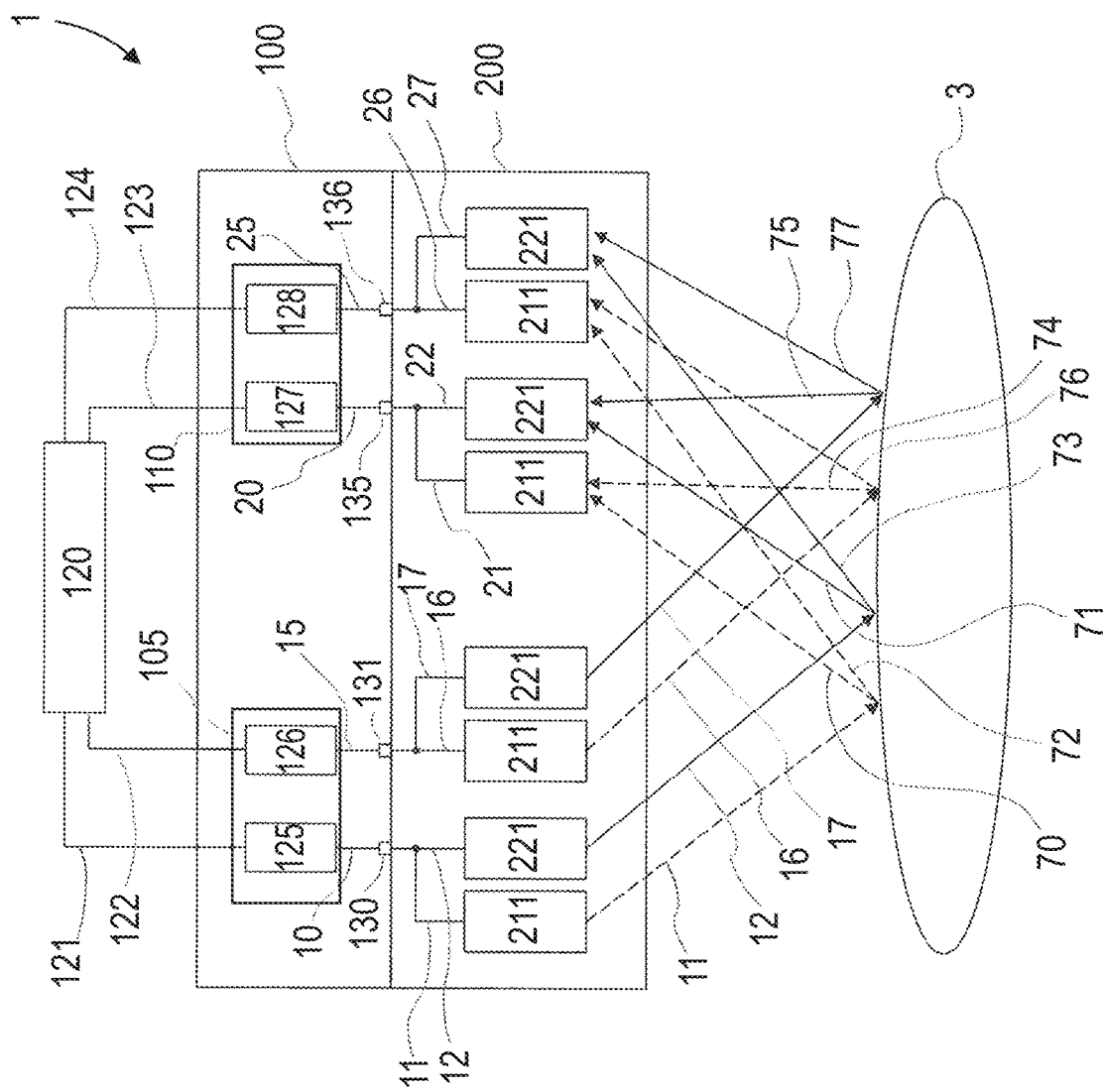
FIG. 1 a first embodiment of a radar device according to the present disclosure.

FIG. 1 depicts a radar device 1 having a radar circuit 100, an antenna device 200 and a signal processing device 120. The radar circuit 100 comprises a signal generator 105 having a first transmit chain 125 and a second transmit chain 126. The first transmit chain 125 is coupled to a first common transmit signal port 130 and the second transmit chain 126 is coupled to a second common transmit signal port 131.

Each common transmit signal port 130, 131 is coupled to a first antenna 211 and a second antenna 221 of the antenna device 200, the first antennas 211 and the second antennas 221 each being placed at different locations on the antenna device 200. The first transmit chain 125 is connected to the signal processing device 120 to receive a first control signal 121 and the second transmit chain 126 is connected to the signal processing device 120 to receive a second control signal 122.

Based on the first control signal 121, the first transmit chain 125 generates a first transmit radar signal 10 comprising a first signal portion 11 occupying a first frequency band and a second signal portion 12 occupying a second frequency band. The first transmit radar signal 10 is routed via the first common transmit signal port 130 to the antenna device 200 and the antenna device 200 is configured to selectively transduce the first signal portion 11 of the first transmit radar signal 10 via the first antenna 211 coupled to the first common transmit signal port 130 and to selectively transduce the second signal portion 12 of the first transmit radar signal 10 via the second antenna 221 coupled to the first common transmit signal port 130.

Based on the second control signal 122, the second transmit chain 126 generates a second transmit radar signal 15 comprising a first signal portion 16 occupying the first frequency band and a second signal portion 17 occupying the second frequency band. The second transmit radar signal 15 is routed via the second common transmit signal port 131 to the antenna device 200 and the antenna device 200 is configured to selectively transduce the first signal portion 16 of the second transmit radar signal 15 via the first antenna 211 coupled to the second common transmit signal port 131 and to selectively transduce the second signal portion 17 of the second transmit radar signal 15 via the second antenna 221 coupled to the second common transmit signal port 131.

The individual first signal portions 11, 16 of the first and second transmit radar signal 10, 15 are radiated by the individual first antennas 211 towards a target object 3 and the individual second signal portions 12, 17 of the first and second transmit radar signal 10, 15 are radiated by the individual second antennas 221 towards the target object 3. The target object 3 reflects the signal portions 11, 12, 16, 17 of the first and second transmit radar signal 10, 15 at least partly back to the antenna device 200.

At the antenna device 200, the first signal portions 11, 16, which occupy the first frequency band, are transduced by two separated first antennas 211 and the second signal portions 12, 17, which occupy the second frequency band, are transduced by two separated second antennas 221. The first antennas 211 are resonant in the first frequency band of the first signal portions 11, 16 and they are off-resonant in the second frequency band of the second signal portions 12, 17. Analogously, the second antennas 221 are resonant in the second frequency band of the second signal portions 12, 17 and they are off-resonant in the first frequency band of the first signal portions 11, 16.

One of the first antennas 211 and one of the second antennas 221 are coupled via a first common receive signal port 135 to a first receive chain 127 of a signal receiver 110 of the radar circuit 100. Likewise, the other one of the first antennas 211 and the other one of the second antennas 221 are coupled via a second common receive signal port 136 to a second receive chain 128 of the signal receiver 110.

The antenna device 200 routes a first signal portion 21 of a first receive radar signal 20 from the first antenna 211 that is coupled to the first common receive signal port 135 and a second signal portion 22 of the first receive radar signal 20 from the second antenna 221 that is coupled to the first common receive signal port 135 via the first common receive signal port 135 to the first receive chain 127. The antenna device 200 further routes a first signal portion 26 of a second receive radar signal 25 from the first antenna 211 that is coupled to the second common receive signal port 136 and a second signal portion 27 of the second receive radar signal 25 from the second antenna 221 that is coupled to the second common receive signal port 136 via the second common receive signal port 136 to the second receive chain 128.

The first signal portion 21 of the first receive radar signal 20 comprises the fractions of the first signal portions 11, 16 of the first and second transmit radar signals 10, 15 that are received by the first antenna 211 coupled to the first common receive signal port 135. The second signal portion 22 of the first receive radar signal 20 comprises the fractions of the second signal portions 12, 17 of the first and second transmit radar signals 10, 15 that are received by the second antenna 221 coupled to the first common receive signal port 135.

Likewise, the first signal portion 26 of the second receive radar signal 25 comprises the fractions of the first signal portions 11, 16 of the first and second transmit radar signals 10, 15 that are received by the first antenna 211 coupled to the second common receive signal port 136. The second signal portion 27 of the second receive radar signal 25 comprises the fractions of the second signal portions 12, 17 of the first and second transmit radar signals 10, 15 that are received by the second antenna 221 coupled to the second common receive signal port 136.

The first receive chain 127 generates a first radar data signal 123 that represents the first radar signal 20 received from the first common receive signal port 135 and the second receive chain 128 generates a second radar data signal 124 that represents the second radar signal 25 received from the second common receive signal port 136. The signal receiver 110 is connected to the signal processing device 120 and the first and second radar data signal 123, 124 are transferred from the signal receiver 110 to the signal processing device 120.

The first transmit chain 125 and the second transmit chain 126 generate the respective first portions 11, 16 of the first transmit radar signal 10 and the second transmit radar signal 15 having different values of a first separability parameter and they generate the respective second portions 12, 17 of the first transmit radar signal 10 and the second transmit radar signal 15 having different values of a second separability parameter. Using the first separability parameter, the signal processing device 120 is able to separate the parts of the first signal portions 21, 26 of the first and second receive radar signal 20, 25 that originate from the first portion 11 of the first transmit radar signal 10 from the parts of the first signal portions 21, 26 of the first and second receive radar signal 20, 25 that originate from the first portion 16 of the second transmit radar signal 15. Likewise, the signal processing device 120 uses the second separability parameter to separate the parts of the second signal portions 22, 27 of the first and second receive radar signal 20, 25 that originate from the second portion 12 of the first transmit radar signal 10 from the parts of the second signal portions 22, 27 that originate from the second portion 17 of the second transmit radar signal 15.

Additionally, the signal processing device 120 separates the first signal portion 21 and the second signal portion 22 of the first receive radar signal 20 using the separate frequency bands of the first and second signal portions 21, 22 received via the first common receive signal port 135 and the signal processing device 120 separates the first signal portion 26 and the second signal portion 27 of the second receive radar signal 25 using the separate frequency bands of the first and second signal portions 25, 26 received via the second common receive signal port 136.

The first antennas 211 transduce electromagnetic radiation with a first polarization and the second antennas 221 transduce electromagnetic radiation with a second polarization that is orthogonal to the first polarization. For example, the first antennas 211 may transduce electromagnetic radiation with horizontal linear polarization and the second antennas 221 may transduce electromagnetic radiation with vertical linear polarization, or vice versa.

The radar device 1 establishes a total of eight different propagation channels from the antenna device 200 to the target object 3 and back to the antenna device 200 and the signal processing device 120 is configured to separately detect the target reflections propagating via the individual propagation channels, for example for establishing a virtual array in a MIMO configuration. Among the eight different propagation channels, a first set of four propagation channels is operating in the first frequency band and a second set of four propagation channels is operating in the second frequency band.

The radar device 1 establishes a first propagation channel 70 from the first antenna 211 coupled to the first common transmit signal port 130 to the first antenna 211 coupled to the first common receive signal port 135, a second propagation channel 71 from the second antenna 221 coupled to the first common transmit signal port 130 to the second antenna 221 coupled to the first common receive signal port 135, a third propagation channel 72 from the first antenna 211 coupled to the first common transmit signal port 130 to the first antenna 211 coupled to the second common receive signal port 136, and a fourth propagation 73 channel from the second antenna 221 coupled to the first common transmit signal port 130 to the second antenna 221 coupled to the second common receive signal port 136.

The radar device 1 further establishes a fifth propagation channel 74 from the first antenna 211 coupled to the second common transmit signal port 131 to the first antenna 211 coupled to the first common receive signal port 135, a sixth propagation channel 75 from the second antenna 221 coupled to the second common transmit signal port 131 to the second antenna 221 coupled to the first common receive signal port 135, a seventh propagation channel 76 from the first antenna 211 coupled to the second common transmit signal port 131 to the first antenna 211 coupled to the second common receive signal port 136, and an eight propagation channel 77 from the second antenna 221 coupled to the second common transmit signal port 131 to the second antenna 221 coupled to the second common receive signal port 136.

The first set of propagation channels is established by the first signal portions transduced via the first antennas 211. It comprises the first propagation channel 70, the third propagation channel 72, the fifth propagation channel 74 and the seventh propagation channel 76. The second set of propagation channels is established by the second signal portions transduced via the second antennas 221. It comprises the second propagation channel 71, the fourth propagation channel 73, the sixth propagation channel 75 and the eighth propagation channel 77.

With the radar device 1 shown in FIG. 1, the individual antennas 211, 221 may each comprise a single antenna element or several antenna elements. The antenna elements forming a single antenna 211, 221 are then all connected to a single common signal port 130, 131, 135, 136 of the radar circuit 100. Each common signal port 130, 131, 135, 136 is connected to at least a first antenna element that is part of one of the first antennas 211 and a second antenna element that is part of one of the second antennas 221.

Each antenna 211, 221 is connected via a single signal port 130, 131, 135, 136 to the radar circuit 100. The individual signal portions 11, 12, 16, 17, 21, 22, 26, 27 of the radar signals 10, 15, 20, 25 then constitute individual antenna signals, each antenna signal being transduced by a separate antenna 211, 221.

Alternative embodiments of the radar device 1 shown in FIG. 1 may comprise more than two transmit chains 125, 126 and common transmit signal ports 130, 131, for example three transmit chains and three associated transmit signal ports, as well as more than two receive chains 127, 128 and common receive signal ports 135, 136, for example four receive chains and four associated receive signal ports. To each signal port, a first antenna and a second antenna may be coupled and the individual radar signals routed via the individual signal ports may each comprise a first signal portion occupying the first frequency band and a second frequency portion occupying the second frequency band. The antenna device may then be configured to transduce the individual first signal portions as first antenna signals via the first antennas and the individual second signal portions as second antenna signals via the second antennas. The individual first signal portions may differ among each other at least in a first separability parameter and the individual second signal portions may differ among each other at least in the second separability parameter.

Figure 2:
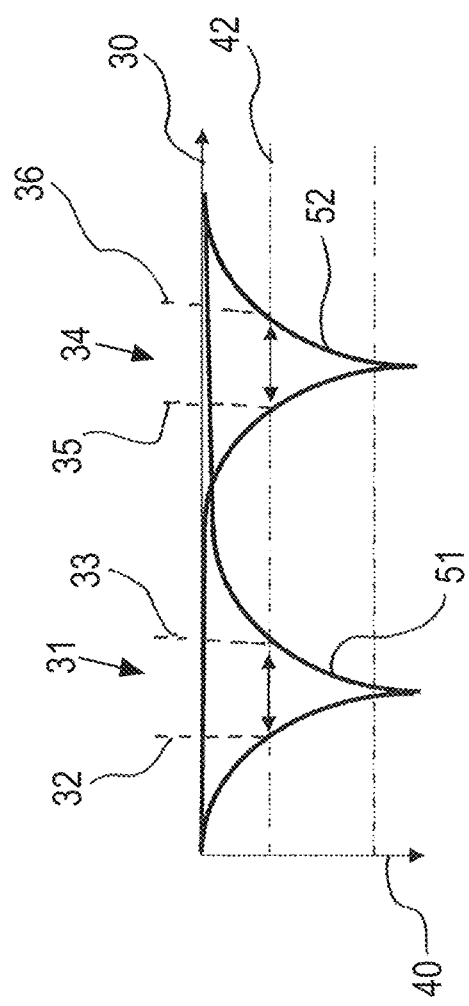
FIG. 2 a transmission of first and second antennas of radar devices according to the present disclosure.

FIG. 2 shows a first transmission 51 of the first antennas 211 versus frequency 30 and a second transmission 52 of the second antennas 221 versus frequency 30. The first transmission 51 exceeds a minimum transmission 42 in the first frequency band 31 between a first minimum frequency 32 and a first maximum frequency 33 and the second transmission 52 exceeds the minimum transmission 42 in the second frequency band 34 between a second minimum frequency 35 and a second maximum frequency 36.

The first minimum frequency 32 may amount to 75.5 GHz and the second maximum frequency 36 may amount to 81.5 GHz. The first maximum frequency 33 may amount to 77.5 GHz and the second minimum frequency 35 may amount to 79.5 GHz.

As can be seen from FIG. 2, the first frequency band 31 and the second frequency band 34 are separated from each other and do not overlap. The first signal portions 11, 16, 21, 26 of the radar signals 10, 15, 20, 25 processed by the radar circuit 100 of the radar device 1 shown in FIG. 1 occupy the first frequency band 31 and the second signal portions 12, 17, 22, 27 of the radar signals 10, 15, 20, 25 occupy the second frequency band 34. In alternative embodiments of the radar device 1, the frequency bands 31, 34 may alternatively be defined by two separate minimum transmissions that differ from each other.

Figure 3:
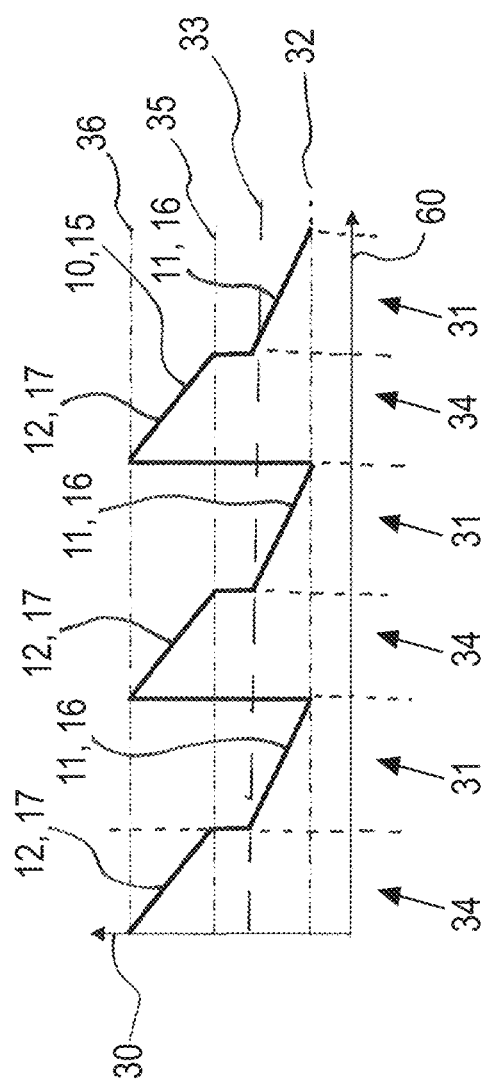
FIG. 3 a time dependence of frequencies of radar signals generated by the radar devices according to the present disclosure.

FIG. 3 shows the frequency 30 of the first radar signal 10 and the second radar signal 15 generated by the signal generator 105 of the radar device 1 shown in FIG. 1 over time 60. The frequency 30 of the radar signals 10, 15 is repeatedly cycled through the second frequency band 34 and the first frequency band 31. In the exemplary embodiment shown in FIG. 3, the frequency 30 of the radar signals 10, 15 is first linearly swept in the second frequency band 34 from the second maximum frequency 36 to the second minimum frequency 35 and is then linearly swept in the first frequency band 31 from the first maximum frequency 33 to the first minimum frequency 32. Subsequently, this cycle or burst is repeated. The frequency 30 of the first and second radar signals 20, 25 measured by the signal receiver 110 has the same time-dependence as the radar signals 10, 15 shown in FIG. 3. Between the second frequency band 34 of the first signal portions 11, 16, 21, 26 and the first frequency band 31 of the second signal portions 12, 17, 22, 27, a frequency gap is located that spans the frequencies between the second minimum frequency 35 and the first maximum frequency 33.

In alternative embodiments, a different frequency sweep may be employed within the first frequency band 31 and/or within the second frequency band 34. For example, the frequency 30 may be swept from lower frequencies to higher frequencies. The frequency sweep may also start with a sweep over the first frequency band 31 instead of starting with the sweep over the second frequency band 34.

Figure 4:
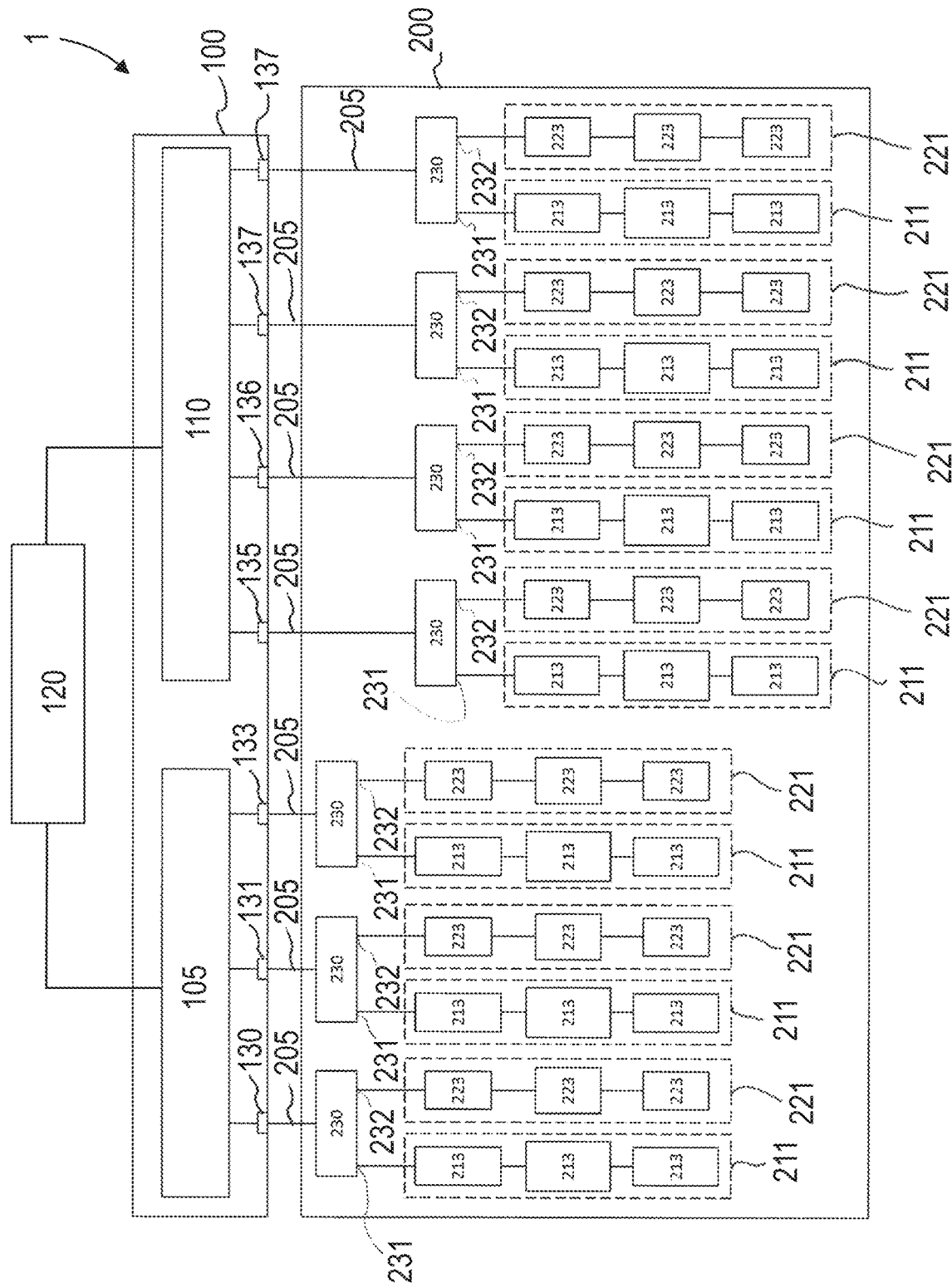
FIG. 4 a second embodiment of a radar device according to the present disclosure.

FIG. 4 shows a second embodiment of the radar device 1 according to the present disclosure. As far as no differences are apparent from the description and the drawings, the radar device 1 of the second embodiment is configured as it is described and shown in connection with the radar device 1 according to the first embodiment shown in FIG. 1 and vice versa.

Besides the first common transmit signal port 130 and the second common transmit signal port 131 shown in FIG. 1, the radar circuit 100 may comprise further common transmit signal ports, for example one further common transmit signal port 133, as shown in FIG. 4. Analogously, the radar circuit 100 may comprise further common receive signal ports, for example two further common receive signal ports 137, as shown in FIG. 4.

Each common signal port 130, 131, 133, 135, 136, 137 is coupled via a common signal line 205 to an individual signal routing device 230. Each signal routing device 230 has a first port 231 and a second port 232. Each first port 231 is coupled to an individual first antenna 211 transducing in the first frequency band 31 and each second port 232 is coupled to an individual second antenna 221 transducing in the second frequency band 34. The first antennas 211 each comprise a set of serially coupled first antenna elements 213 and the second antennas 221 each comprise a set of serially coupled second antenna elements 223.

The signal generator 105 is controlled to generate individual radar signals for every common transmit signal port 130, 131, 133, each radar signal having a first signal portion occupying the first frequency band 31 and a second signal portion occupying the second frequency band 34. The individual first signal portions constitute first antenna signals and differ in a first separability parameter and the individual second signal portions constitute second antenna signals and all differ in a second separability parameter.

The signal processing device 120 of the radar device 1 shown in FIG. 4 is configured to evaluate a total of twenty-four propagation channels comprising a first set of twelve propagation channels operating in the first frequency band 31 and a second set of twelve propagation channels operating in the second frequency band 34. The propagation channels of the first set comprise all pairs of one of the first antennas 211 coupled to the common transmit signal ports 130, 131, 133 and one of the first antennas 211 coupled to the common receive signal ports 135, 136, 137. The propagation channels of the second set comprise all pairs of one of the second antennas 221 coupled to the common transmit signal ports 130, 131, 133 and one of the second antennas 221 coupled to the common receive signal ports 135, 136, 137. The signal processing device 120 establishes from the first set of propagation channels a first virtual antenna array in MIMO configuration and from the second set of propagation channels a second virtual antenna array in MIMO configuration.

Figure 5:
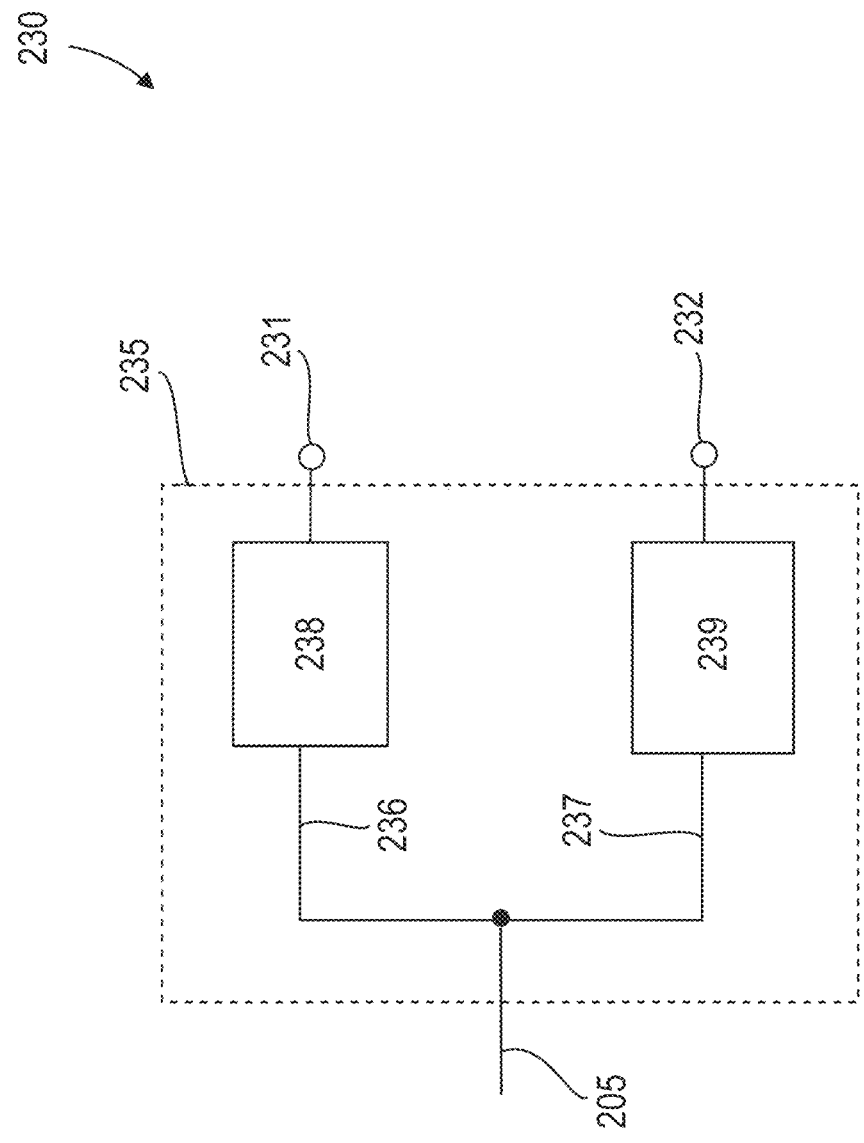
FIG. 5 a signal routing device of the radar device according to the second embodiment.

The signal routing device 230 may be configured as a frequency selective device. FIG. 5 shows an exemplary embodiment of such a frequency selective signal routing device 230. The common signal line 205 is directly and in parallel coupled to a first transmission line segment 236 and a second transmission line segment 237 of a frequency selective section 235 of the signal routing device 230. The first line segment 236 is coupled via a first filter 238 of the frequency selective section 235 to the first port 231 and the second line segment 237 is coupled via a second filter 239 of the frequency selective section 235 to the second port 232.

The first line segment 236 has an electric length of 0° and the second line segment 237 has an electric length of 170°, both at a center frequency that is located between the first minimum frequency 32 and the second maximum frequency 36. The first filter 238 and the second filter 239 are configured as bandpass filters, the first filter 238 having a center frequency that corresponds to the center frequency of the first frequency band 31 and the second filter 239 having a center frequency that corresponds to the center frequency of the second frequency band 34.

Figure 6:
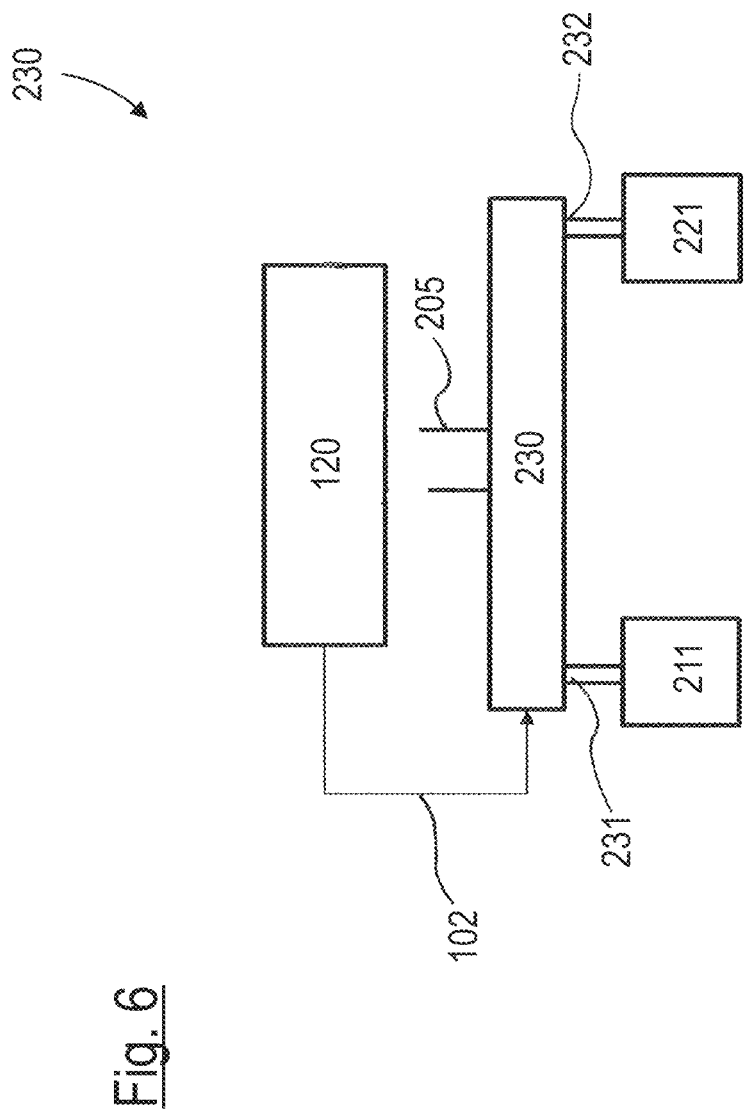
FIG. 6 an alternative embodiment of the signal routing device.

The signal routing device 230 may also be configured as a switching device like it is shown in an exemplary embodiment in FIG. 6. The switching device 23 is connected via a control line 102 to the signal processing device 120 and receives a switch control signal from the signal processing device 120 via the control line 102. Depending on the state of the switch control signal, the signal switching device 230 conductively couples the first signal port 231 or the second signal port 232 to the common signal line 205. The signal processing device 120 is configured to change the state of the switch control signal simultaneously with the control signals 121, 122 determining the frequency of the transmit radar signals 10, 15 generated by the signal generator 105 of the radar circuit 100 so that the first port 231 is conductively coupled to the common signal line 205 when the first portions 11, 16 of the transmit radar signals 10, 15 are routed between the antenna device 200 and the radar circuit 100 and that the second port 232 is conductively coupled to the common signal line 205 when the second portions 12, 17 of the transmit radar signals 10, 15 are routed between the antenna device 200 and the radar circuit 100.

In alternative embodiment, the switching device 23 may be configured to route signals from both the first and second frequency band 31, 34 via both first and second port 231, 232. In this case, the first and second signal portions 11, 12, 16, 17, 21, 22, 26, 27 of the radar signals 10, 15, 20, 25 may span both frequency bands 31, 34. The antenna device 200 may then alternately transduce either the first signal portions 11, 16, 21, 26 or the second signal portions 12, 17, 22, 27 in a time multiplexed manner.

Figure 7:
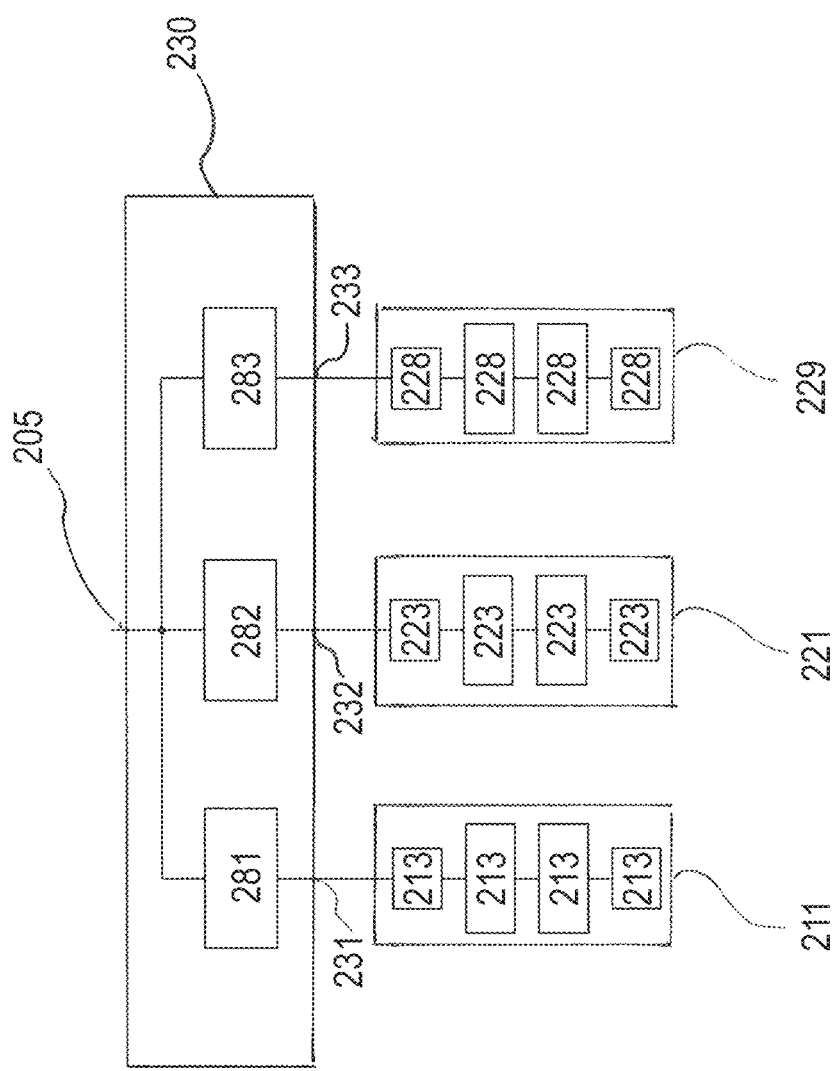
FIG. 7 another alternative embodiment of the signal routing device.

FIG. 7 shows another embodiment of the signal routing device 230. According to this embodiment, the signal routing device 230 comprises a plurality of filters that are directly coupled between the common signal line 205 and the individual antennas coupled to the common signal line 205. The plurality of filters comprises a first filter 281 and a second filter 282. The first filter 281 is coupled between the first signal port 231 leading to antenna elements 213 of the first antenna 211 and the common signal line 205 and the second filter is coupled between the second signal port 232 leading to antenna elements 223 of the second antenna 221 and the common signal line 205.

The first filter 281 configured to pass the first signal portion 11, 16, 21, 26 and to block the second signal portion 12, 17, 22, 27 of the radar signal 10, 15, 20, 25. The second filter 282 is configured to pass at least the second signal portion 12, 17, 22, 27. It may additionally be configured to block the first signal portion 11, 16, 21, 26.

As can be seen from FIG. 7, the signal routing device 230 according to the present disclosure may generally comprise additional signal ports that couple additional antennas or antenna elements of additional antennas to the common signal line and to the common signal port 130, 131, 135, 136 of the radar circuit 100. The signal routing device 213 may then comprise additional filters that only pass one of the additional signal portions of the radar signal and block all other signal portions of the radar signal. For example, the signal routing device 230 may comprise a third port 233 that is coupled to antenna elements 228 of a third antenna 229. The third port 233 is coupled via a third filter 283 to the common signal line 205. The third filter 283 is configured to pass a third signal portion of the radar signal 10, 15, 20, 25 that occupies a third frequency band and to block the first signal portion 11, 16, 21, 26 and/or the second signal portion 12, 17, 22, 27 of the radar signal. Likewise, the antenna elements of the third antenna 229 are configured to transduce the third signal portion.

Analogously to the signal routing device 230 shown in FIG. 7, also the signal routing devices 230 shown in FIGS. 5 and 6 may be coupled between more than two antennas or antenna elements of more than two antennas and the common signal line 205. These signal routing devices 230 may route individual signal portions occupying separate frequency bands to the individual antennas coupled to their signal ports. In general, signal routing devices 230 having separate filters coupled between individual antennas or antenna elements of individual antennas and the common signal line 205 may be used instead of the multiplexers or diplexers described in the present disclosure.

Figure 8:
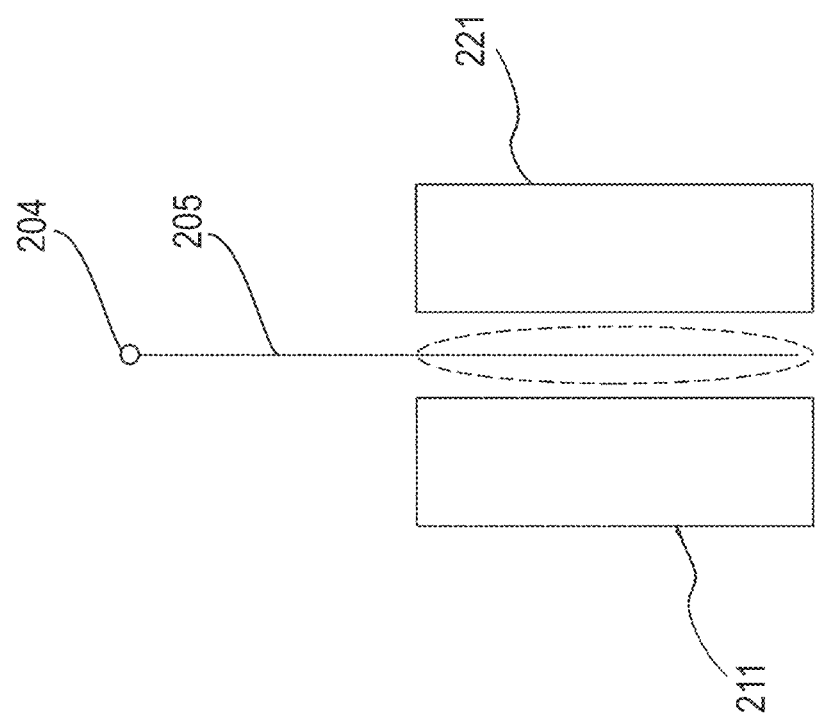
FIG. 8 a first antenna and a second antenna inductively coupled to a common signal port.

FIG. 8 shows a first antenna 211 and a second antenna 221 that are both inductively coupled to a common signal line 205 and a common signal port 204 and that may be used with the antenna devices 200 according to the present disclosure. Inductive coupling between the antennas 211, 221 and the common signal line 205 is achieved by placing the antennas 211, 221 or individual antenna elements of the antennas 211, 221 in the proximity of the common signal line 205 so that the electromagnetic field generated by the signal line 205 couples to the antennas 211, 221. In alternative embodiments, one of the first and second antennas 211, 221 may be conductively coupled to the common signal line 205 and the other one of the antennas 211, 221 may be inductively coupled to the signal line 205 or to the antenna 211, 221 that is conductively coupled to the signal line 205.

Figure 9:
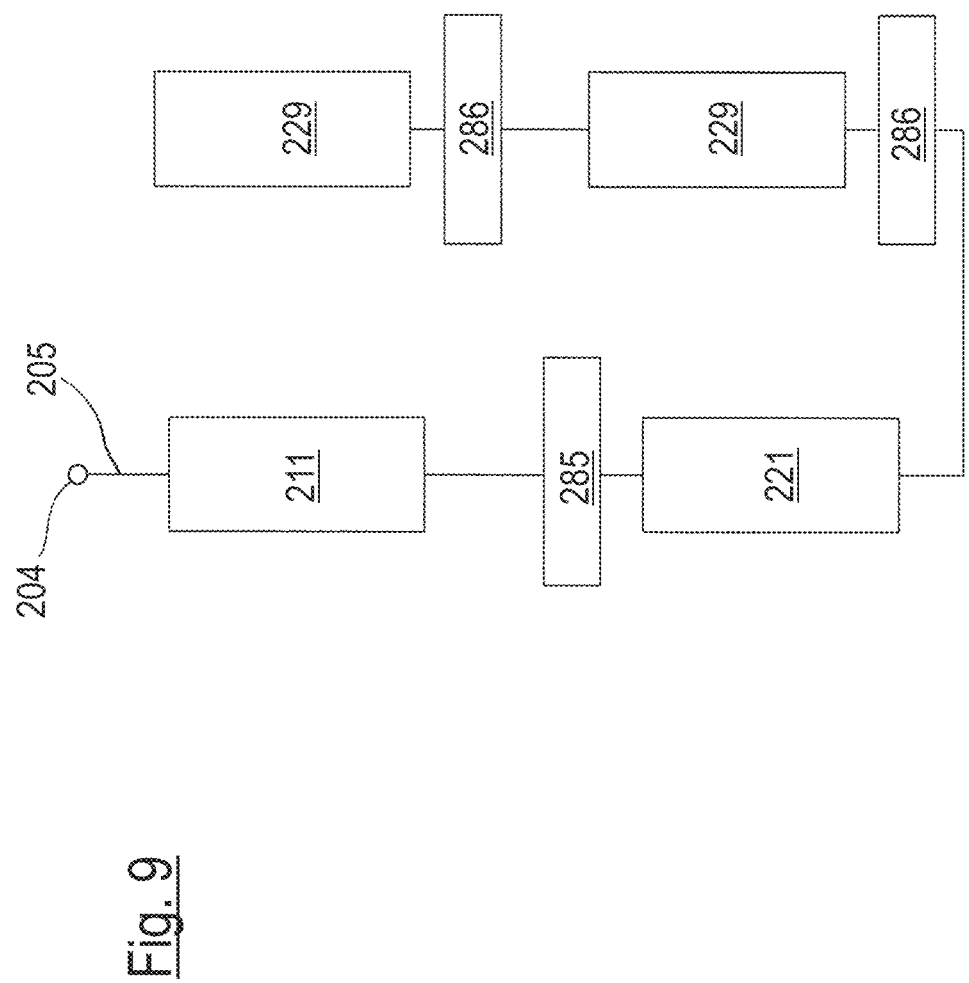
FIG. 9 a first antenna, a second antenna and a further antenna serially coupled via filter elements.

FIG. 9 shows an alternative embodiment of a first antenna 211 and a second antenna 221 that are coupled via a common signal line 205 to a common signal port 204 and that may be used with the antenna devices 200 according to the present disclosure. In this embodiment, the first antenna 211 and the second antenna 221 are serially coupled to the common signal line 205 and a filter element 285 is placed between the first antenna 211 and the second antenna 221. The filter element 285 is configured to block the first signal portion of the radar signal transduced via the common signal port 204 and to pass the second signal portion of the radar signal to the second antenna 221.

As it is shown in FIG. 9, further antennas 229 may be coupled to the common signal line 205 behind the second antenna 221. The individual further antennas 229 may each transduce a separate signal portion of the radar signal. In this case, the filter element 285 passes all signal portions but the first signal portion radiated by the first antenna 211. Additionally, each further antenna 229 is coupled via a further filter element 286 to the preceding antennas 211, 221, 229. The individual further filter elements 286 each pass all signal portions radiated by the further antennas 229 that are coupled to the common signal line 205 behind the respective further filter element 286 and block all signal portions of the radar signal that are radiated by the antennas 211, 221, 229 coupled to the common signal line 205 in front of the respective further filter element 286. Each antenna shown in FIG. 9 may comprise several antenna elements coupled to each other.

Figure 10:
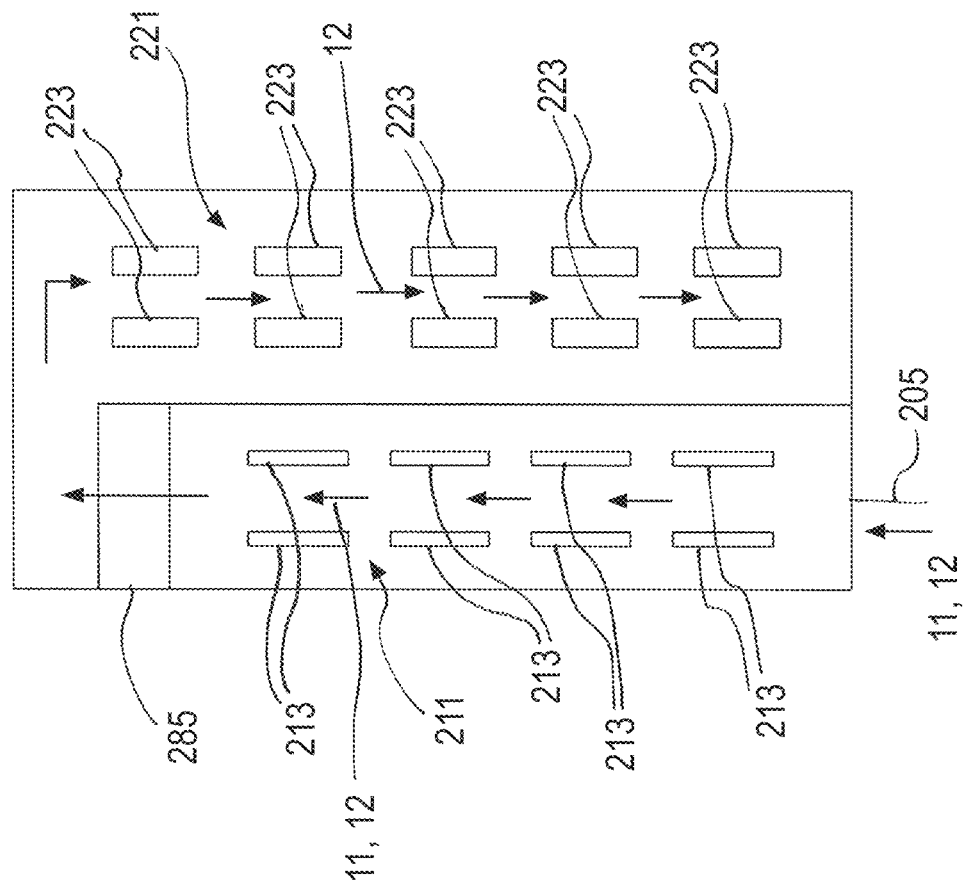
FIG. 10 a first antenna and a second antenna configured as waveguide antennas and serially coupled via a filter element.

FIG. 10 shows an implementation of the serial coupling of the first antenna 211 and the second antenna 221 shown in FIG. 9 using array antennas that are configured as slotted waveguide antennas. The radar signal 10 propagates from the common signal line 205 via the waveguide of the first antenna 211 to the filter element 285, where the first signal portion 11 of the radar signal 10 is blocked and the second signal portion 12 is passed into the waveguide of the second antenna 221. With the antenna device shown in FIG. 10, the first antenna 211 may be configured to only transduce the first signal portion 11 and the second antenna 221 may be configured to only transduce the second signal portion 12.

Figure 11:
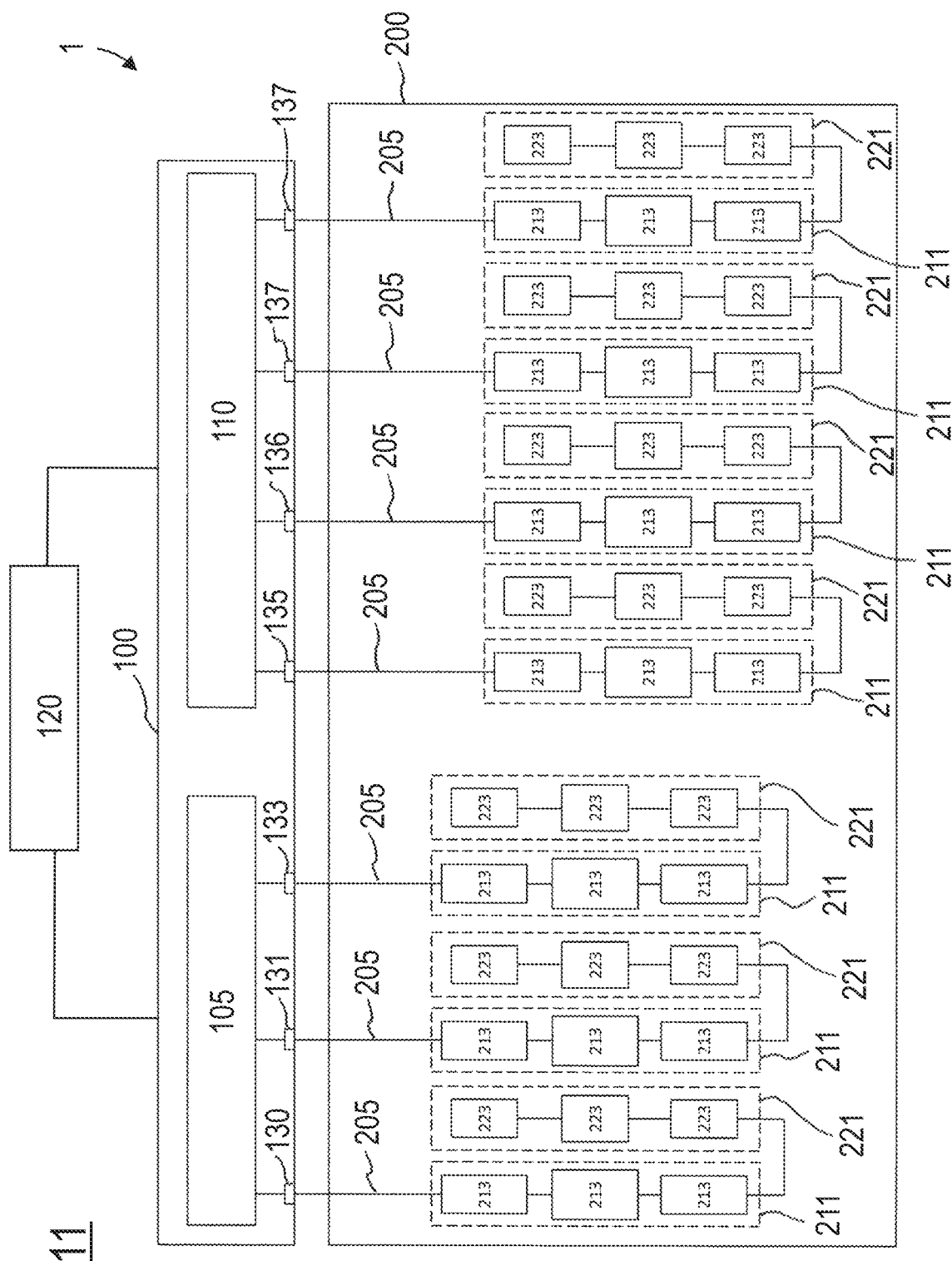
FIG. 11 a third embodiment of the radar device according of present disclosure.

FIG. 11 shows a third embodiment of the radar device 1. As long as no differences are apparent from the description or the figures, the third embodiment of the radar device 1 is configured as it is described for the second embodiment and vice versa.

The third embodiment of the radar device 1 does not comprise the signal routing devices 230 of the second embodiment. Instead, the first antennas 211 and the second antennas 221 are serially coupled to the common signal lines 205. The first antennas 211 are only resonant within the first frequency band 31 and therefore only transduce the first signal portions of the radar signals and the second antennas 221 are only resonant within the second frequency band 34 and therefore only transduce the second signal portions of the radar signals. The first antennas 211 are configured as array antennas that comprise leaky traveling waveguide antenna elements and the second antennas 221 are configured as array antennas that comprise series-fed antenna elements.

Figure 12:
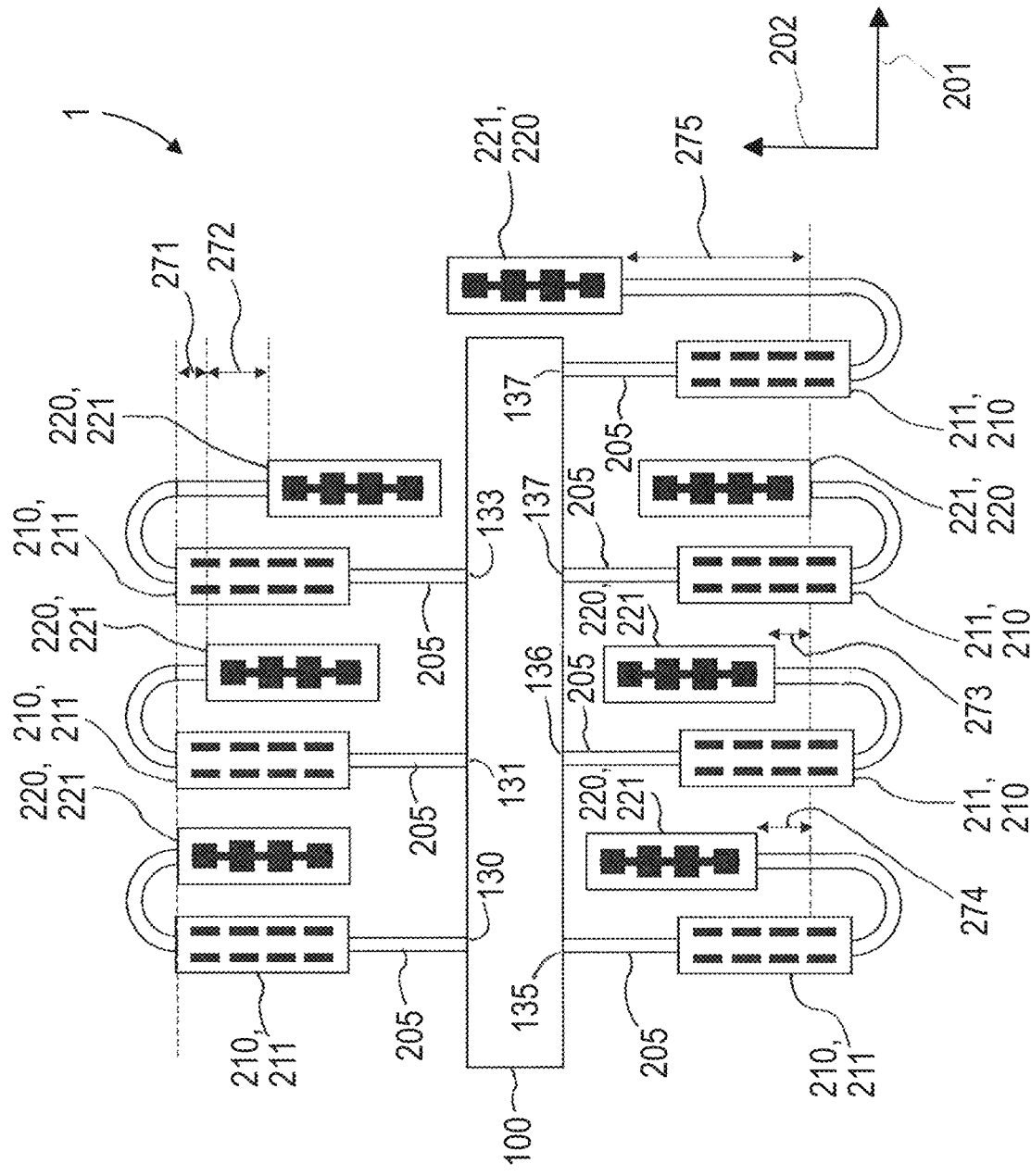
FIG. 12 a placement of antennas of the third embodiment of the radar device.
Figure 13:
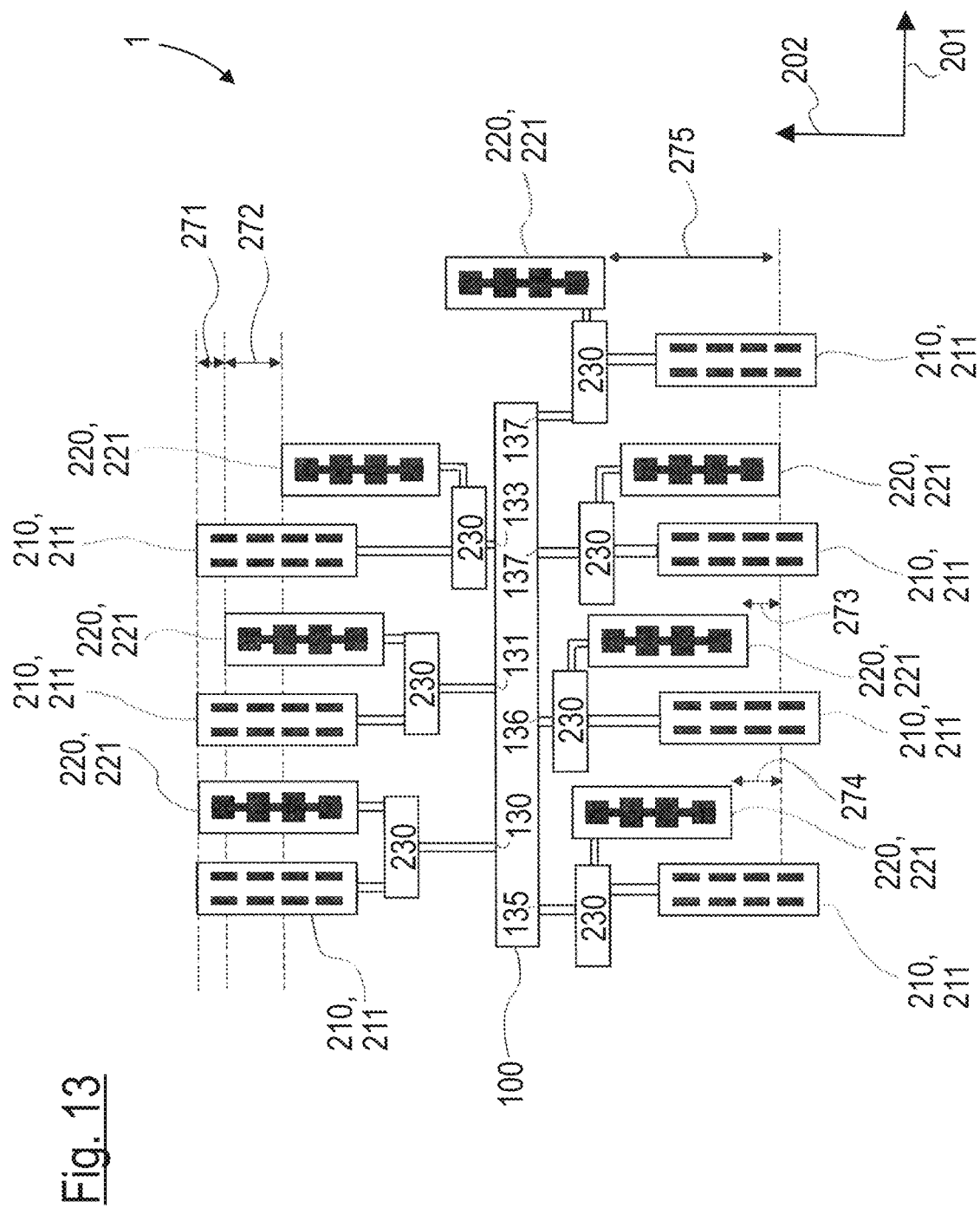
FIG. 13 a placement of antennas of the second embodiment of the radar device.

FIG. 12 shows an exemplary placement of the antennas 211, 221 of the third embodiment of the radar device 1 on a front surface of the antenna device 200. The antennas 211, 221 of the second embodiment of the radar device 1 may be placed in an analogous way, as it is shown in FIG. 13.

The first antennas 211 form a first set 210 of antennas that are arranged in a first antenna array along a first direction 201 and the second antennas 221 form a second set 220 of antennas that are arranged in a second antenna array along a second direction 202 that is perpendicular to the first direction 201. The second antennas 221 are displaced with respect to each other along the second direction 202. Although not shown in FIGS. 12 and 13, the first antennas 211 are displaced with respect to each other along the first direction 201 analogously to the displacement of the second antennas 221 along the second direction 202.

The second transmit antennas 221 that are coupled to the common transmit ports 130, 131, 133 have a first transmit distance 271 between a first one and a second one of the second receive antennas 221 and a second transmit distance 272 between the second one and a third one of the second transmit antennas 221. The first transmit distance 271 may, for example, amount to half a wavelength at a selected frequency and the second transmit distance 272 may amount to the wavelength at the selected frequency. The selected frequency may lie within the second frequency band 34 and may amount to the center frequency of the second frequency band 34, for example.

The second receive antennas 221 that are coupled to the common receive ports 135, 136, 137 have a first receive distance 273 between a first one and a second one of the second receive antennas 221, a second receive distance 274 between the second one and a third one of the second receive antennas 221, and a third receive distance 275 between the third one and a fourth one of the second receive antennas 221. The first receive distance 273 may amount to 0.7-times the wavelength at the selected frequency, the second receive distance 274 to 1.5-times times the wavelength at the selected frequency and the third receive distance 275 to 3.5-times the wavelength at the selected frequency.

The signal processing device 120 of the radar device 1 is configured to construct from the first antenna signals transduced via the first antennas 211 a first virtual antenna array that extends along the first direction 201 and that resolves targets along the first direction 201 and to construct from the second antenna signals transduced via the second antennas 221 a second virtual antenna array that extends along the second direction 202 and resolves targets along the second direction 202. The first and second antenna array each are configured as MIMO arrays.

Although shown in connection with the third embodiment of the radar device 1, the antenna arrangement of FIG. 12 that forms a first virtual array along the first direction 201 and a second virtual array along the second direction 202 may also be realized with the second embodiment of the radar device 1 that employs the signal routing devices 230 and is shown schematically in FIG. 4. The corresponding arrangement of the antennas 211, 221 of the second embodiment of the radar device 1 is shown in FIG. 13. As far as no differences are apparent from the description and the drawings, the antenna placement shown in FIG. 13 is configured as it is described and shown in connection with the antenna placement shown in FIG. 12 and vice versa.

With the antenna devices 200 of the preceding Figures, the first antennas 211 and the second antennas 221 that are coupled to a common signal port 130, 131, 133, 135, 136, 137 of the radar circuit 100 are configured as separate antennas that are positioned at different locations of the antenna device 200 and consequently transduce radiation fields that have phase centers that are shifted with respect to each other. In alternative embodiments, first antennas 211 and second antennas 221 that are coupled to a common signal port 130, 131, 133, 135, 136, 137 may also coincide and be located at the same position on the antenna device 200, as it is exemplarily shown in FIG. 14 in connection with a fourth embodiment of the radar device 1 according to the present disclosure.

As far as no differences are apparent from the description and the drawings, the radar device 1 of the fourth embodiment is configured as it is described and shown in connection with the radar device 1 according to the third embodiment shown in FIG. 11 and vice versa.

In the fourth embodiment of the radar device, 1, the individual first and second antennas 211, 221 that are together coupled to a common signal port 130, 131, 133, 135, 136, 137, 137 are colocated and the corresponding first and second antenna elements 213, 223 coincide. The resulting common antennas 218 are configured as dual-polarized antennas that transduce radiation in the first frequency band 31 with a first polarization and that transduce radiation in the second frequency band 34 with a second polarization. The second polarization may be orthogonal to the first polarization. The first polarization may be linear polarization along a first polarization direction 206 and the second polarization may be linear polarization along a second polarization direction 207 that is perpendicular to the first polarization direction 206.

Figure 14:
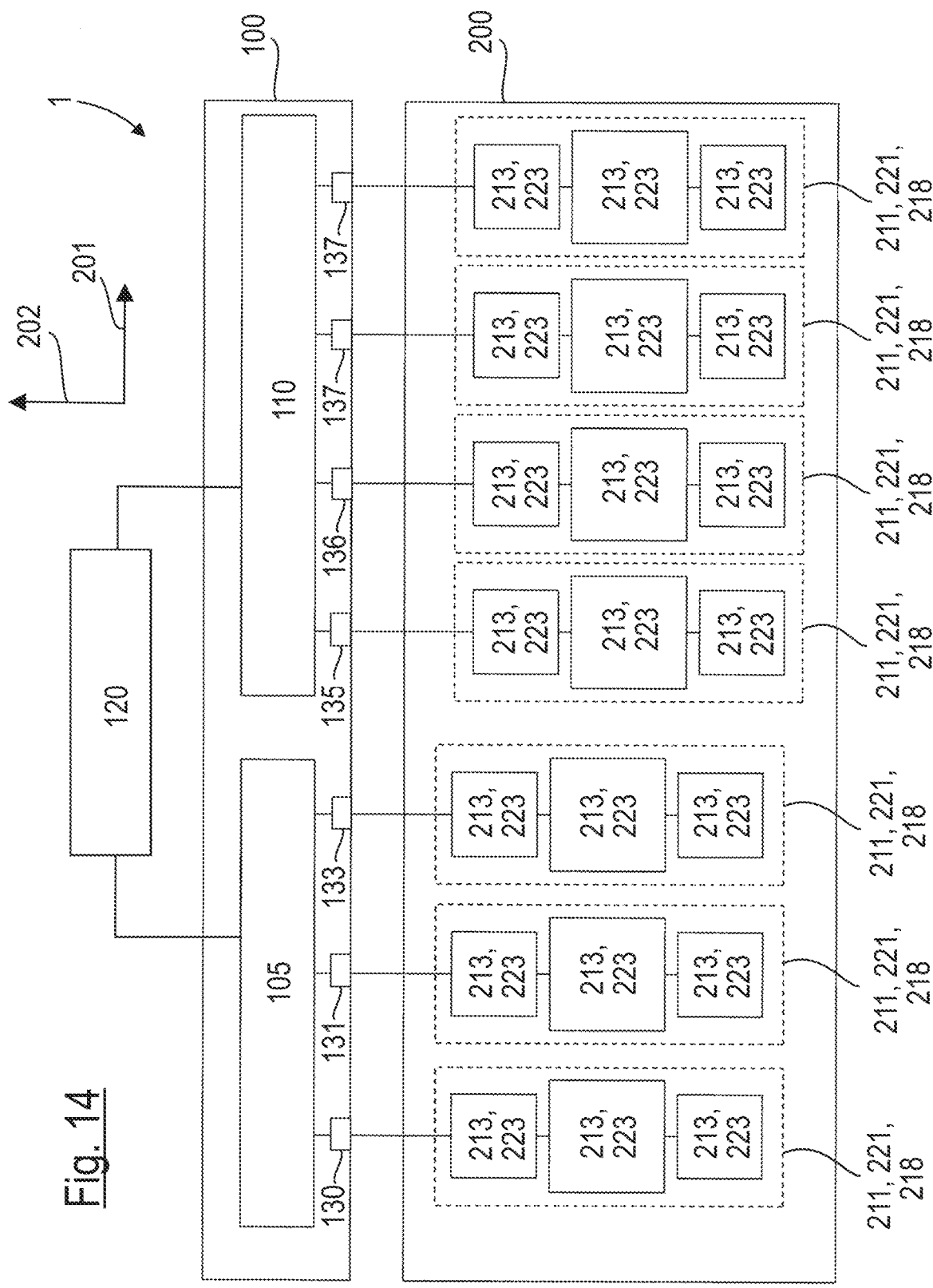
FIG. 14 a fourth embodiment of the radar device of the present disclosure.

With the common antennas 218 shown in FIG. 14, separate phase centers of the first and second antennas 211, 221 coupled to a common signal port 130, 131, 133, 135, 136, 137 are realized by generating the corresponding first and second antenna signals having different frequencies and by configuring the common antennas 218 as series fed array antennas. The different frequencies of the first and second antenna signals then result in the individual antenna elements 213, 223 of the series fed array antennas 218 transducing first and second antenna signal with different amplitudes and phases. This, in turn also results in the first and second antennas 211, 221 of the common antennas 218 having shifted phase centers with respect to each other.

Figure 15:
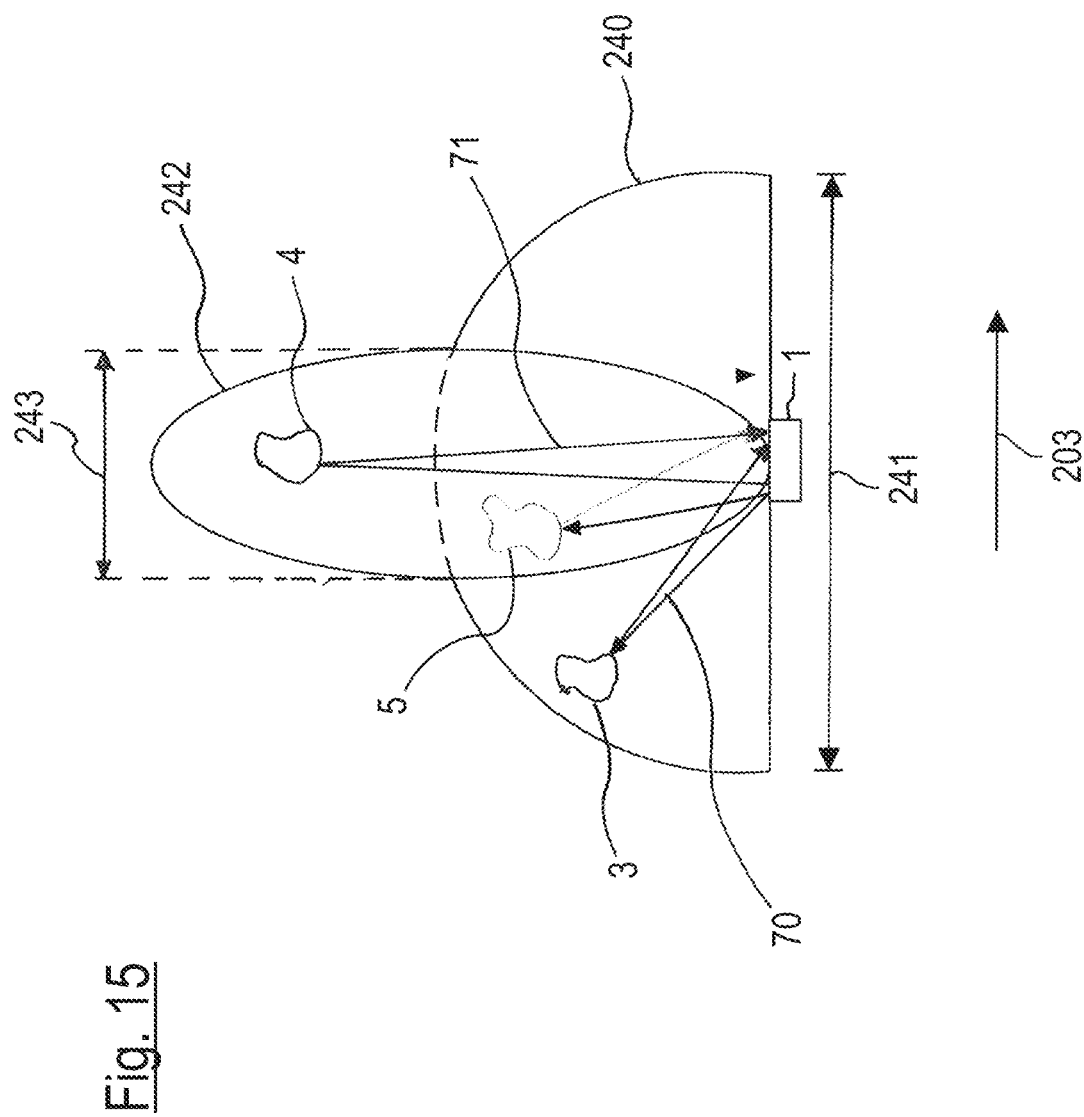
FIG. 15 differing fields of view of first and second antennas of an antenna device according to the present disclosure.

In other alternative embodiments of the radar devices 1 of the present disclosure, the first antennas 211 and the second antennas 221 may be shaped and/or positioned to have fields of view with different extends along a lateral direction. As it is shown in FIG. 15, the first antennas 211 may be positioned to have a first field of view 240 and the second antennas 221 may be positioned to have a second field of view 242. The first field of view 240 has a first extent 241 along the lateral direction 203, which is larger than a second extent 243 of the second field of view 242 along the lateral direction 203. The lateral direction 203 may be, for example, the first direction 201 or the second direction 202 shown in FIGS. 12 to 14.

A first propagation channel 70 between the radar device 1 and a target object 3 that is located inside the first field of view 240 and outside the second field of view 242 comprises a signal path that is established by the first antennas 211 of the radar device 1. Likewise, a second propagation channel 71 between the radar device 1 and a further target object 4 that is located inside the second field of view 242 and outside the first field of view 240 comprises a signal path that is established by the second antennas 221 of the radar device 1. The signal processing device 120 is configured to detect reflections from the target object 3 that are received via the first propagation channel 70 using and analyzing the first signal portions 11, 16, 21, 26 and to detect reflections from the further target object 4 that are received via the second propagation channel 71 by using and analyzing the second signal portions 12, 17, 22, 27. An additional target object 5 that is located inside the first and second field of view 240, 242 is irradiated by both the first antennas 211 and the second antennas 221.

Figure 16:
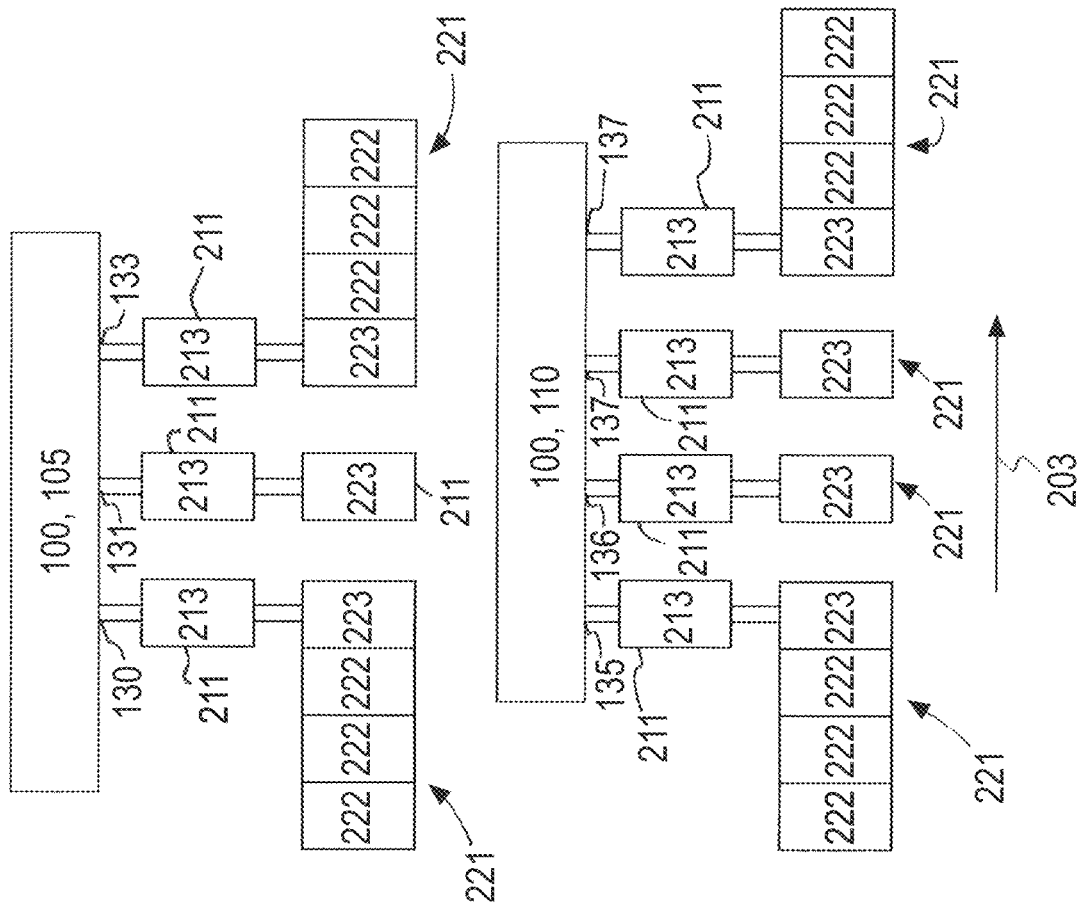
FIG. 16 a placement of the first and second antennas generating differing fields of view.

FIG. 16 shows an exemplary placement of antenna elements 213, 222, 223 of the first and second antennas 211, 221 that realizes the fields of view 240, 242 shown in FIG. 15. The first transmit antennas 211 coupled to the common transmit signal ports 130, 131, 133 and the first receive antennas 211 coupled to the common receive signal ports 135, 136, 137 each comprise first antenna elements 213 only. At least some of the second transmit antennas 221 coupled to the common transmit signal ports 130, 131, 133 and at least some of the second receive antennas 221 coupled to the common receive signal ports 135, 136, 137, namely the second transmit antennas 211 and second receive antennas 221 positioned at the outer sides of the arrangements of second antenna elements 223 in the lateral direction 203, comprise second antenna elements 223 as well as additional antenna elements 222. The additional antenna elements 222 are placed at the outer sides of the second antenna elements 223 in the lateral direction 203.

The additional antenna elements 222 may be passive elements that have no conductive coupling to the common signal ports 130, 131, 133, 135, 136, 137 of the radar circuit 100. Alternatively, they may be active elements that actively transduce radar signals that are routed via the common signal ports 130, 131, 133, 135, 136, 137. For example, the additional antenna elements 222 may be serially coupled to the second antennas 221 located at the outer positions of the second antennas 221 and may transduce in the second frequency band 34 only. Alternative embodiments of the first and second antennas 211, 221 shown in FIG. 16 may feature additional antenna elements 222 positioned at the sides of all second antennas 223.

In all embodiments of the radar device 1 according to the present disclosure, further antennas may be coupled to the individual common signal ports 130, 131, 133, 135, 135, 136, 137 besides the first antennas 211 and the second antennas 221. The antenna device 200 may then transduce electromagnetic radiation via the individual antennas in mutually separate frequency bands so that mutually separate signal portions of the radar signals routed via the common signal ports 130, 131, 133, 135, 135, 136, 137 may each be transduced via a specific individual antenna coupled to the respective signal port 130, 131, 133, 135, 135, 136, 137. For example, the signal routing devices 230 shown in FIGS. 4, 5, 6, 7 and 13 and 17 all may have an additional port for each further antenna coupled to the respective common signal port 130, 131, 133, 135, 135, 136, 137. Also, more than two antennas 211, 221 may be proximity coupled to the common signal line 205 shown in FIG. 8 and more than two antennas 211, 221 may be serially coupled to the common signal lines 205 shown in FIGS. 10, 11, 12 and 16.

The radar devices 1 described in connection with the previous Figures are configured as distance sensing radar devices that employ frequency modulated continuous wave radar signals, for example the frequency modulated radar signals 10, 15 shown in FIGS. 2 and 3. The signal processing devices 120 of the radar devices 1 are configured to jointly process the first and second radar signals 10, 15, 20, 25 and to use both the first and second frequency band 31, 34 to determine the distance to target objects that are located within a common field of view 240, 242 of both the first and second antennas 211, 221, such as the additional target object 5 shown in FIG. 15.

Figure 17:
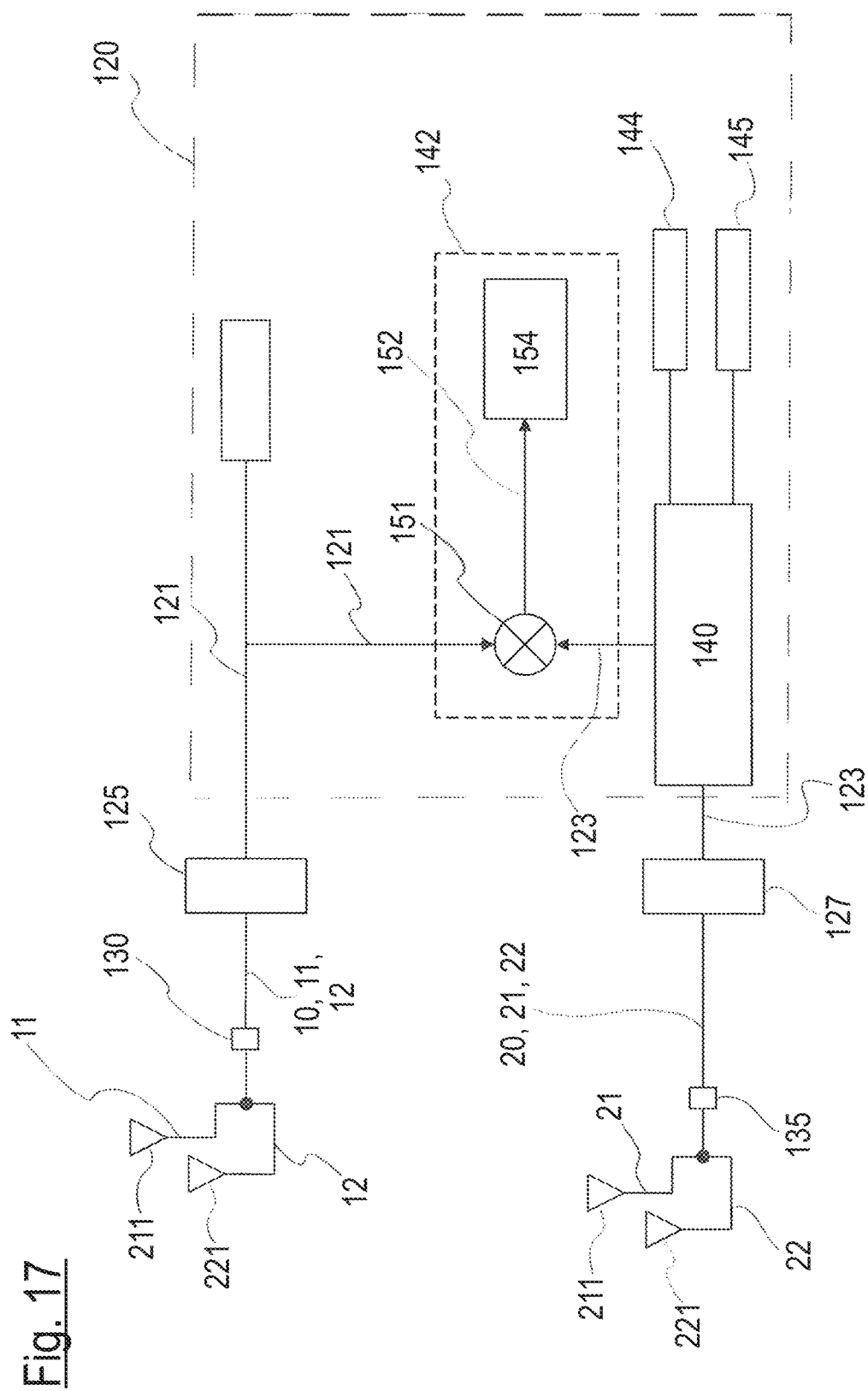
FIG. 17 a signal processing device for the radar devices according to the present disclosure.

FIG. 17 schematically shows a signal processing device 120 that may be used with the radar devices 1 of the present disclosure and the radar signals 10, 20 shown in FIG. 3. The signal processing device 120 is configured to jointly process the signal portions 11, 12 of the first transmit radar signal 10 that are transduced via transmit antennas 211, 221 coupled to a first common transmit signal port 130 together with the signal portions 21, 22 of the first receive radar signal 20 that are transduced via receive antennas 211, 221 coupled to a first common receive signal port 135. After receiving the first receive radar signal 20 containing the first signal portion 21 and the second signal portion 22 via the first common receive signal port 135, a first receive chain 127 generates a first radar data signal 123 representing the first and second signal portion 21, 22.

The first radar data signal 123 is received by a splitting module 140 that is configured to separate the portion of the first radar data signal 123 that represents the first signal portion 21 from the portion that represents the second signal portion 22. The data representing the first signal portion 21 is evaluated by a first evaluation module 144 to evaluate reflection via a first propagation channel 70 shown in FIG. 1 and the data representing the second signal portion 22 is evaluated by a second evaluation module 145 that evaluates reflection via the third propagation channel 72 shown in FIG. 1. Additionally, the splitting model 140 routes all data corresponding to the first and second signal portions 21, 22 received from the receive chain 127 to a ranging module 142. The ranging module 142 is configured to jointly process the data from the first and second signal portions 21, 22 to determine the distance to the target object 5 irradiated by the antenna device 200.

For determining the distance to the target object 5 from the signal portions 21, 22 of the receive radar signal 20, the ranging module 142 is configured to determine a phase shift of the receive radar signal 20 that is transduced via the receive antennas 211, 221 with respect to the transmit radar signal 10 that is transduced via the transmit antennas 211, 221. To this end, the ranging module 142 comprises a mixing module 151 that mixes the transmit radar signal 10 containing the first and second signal portion 11, 12 with the receive radar signal 20 containing the first and second signal portions 21, 22 to generate an intermediate signal 152 at an intermediate frequency that equals the instantaneous frequency difference between the first receive radar signal 20 and the first transmit radar signal 10. The radar circuit may employ the linear frequency sweeps shown in FIG. 3, in which case the intermediate frequency is constant over time.

The frequency of the intermediate signal 152 is a measure for the phase shift that the first radar signal acquires upon reflection at the target object. To determine the distance of the target object, the ranging module 142 comprises a measurement module 154 that measures the intermediate frequency and determines the target distance from the measured intermediate frequency. For measuring the target distance, the measurement module 154 may perform a Fourier transform, for example a fast Fourier transform (FFT), on the intermediate signal 152. Since the minimum resolvable frequency difference is given by the bandwidth of the intermediate signal 152 and thus the bandwidth of the signals used to generate the intermediate signal 152, jointly processing the first and second signal portions 21, 22 increases the resolution of the ranging module 142 compared to a single evaluation of only the first or second signal portion 21, 22.

With the signal processing device 120 shown in FIG. 17, the splitting module 140, the evaluation modules 144, 145, the ranging module 142, the mixing module 151 and/or the measurement module 154 may be realized by software modules or software functions implemented on one or several logic units of the signal processing device 120. The individual modules then process the data signals 121, 123 representing the radar signals 10, 20. Alternatively, the splitting module 140, the mixing module 151, the evaluation modules 144, 145, the ranging module 142 and/or the measurement module 154 may be integrated in the receive chain 127. These modules may then be configured to directly process all signal portions 21, 22 of the radar signal 20 at the radar frequencies.

With all radar devices 1 of the present disclosure, the first antennas 211 may have the first transmission 51 and the second antennas 221 have the second transmission 52 shown in FIG. 2. The radar signals routed via the common signal ports 130, 131, 133, 135, 136, 37 may then vary in frequency 30 over time 60 as shown in FIG. 3. However, since the frequency sweep within the first and second frequency bands 31, 34 does not cover the entire bandwidth between the first minimum frequency 32 and the second maximum frequency 36, the radar devices 1 cannot use the entire bandwidth between the first minimum frequency 32 and the second maximum frequency 36 for distance sensing applications.

Figure 18:
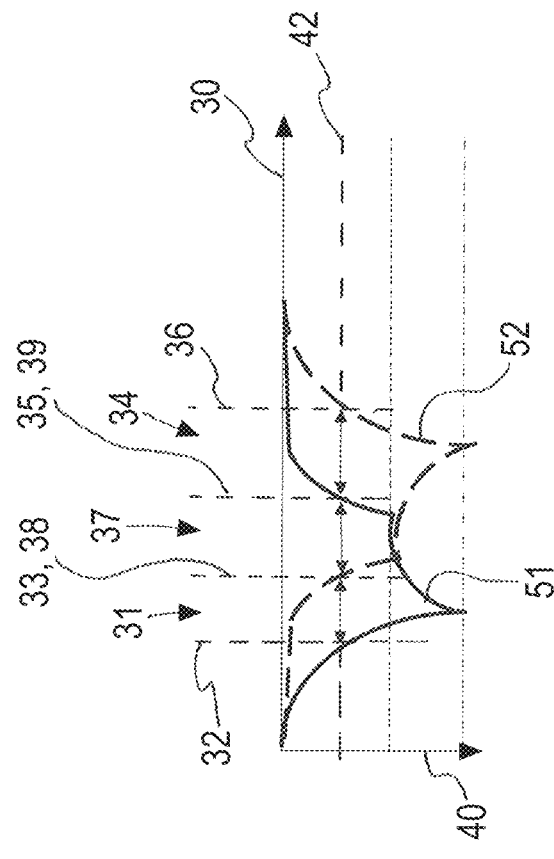
FIG. 18 an alternative transmission of first and second antennas for radar devices according to the present disclosure.

In alternative embodiments of the radar devices 1 according to the present disclosure, the first transmission 51 of the first antennas 211 and the second transmission 52 of the second antennas 221 are configured as shown in FIG. 18. In the first frequency band 31, only the first transmission 51 is larger than the minimum transmission 42, while in the second frequency band 34, only the second transmission 52 is larger than the minimum transmission 42. In a third frequency band 37, which is located in between the first frequency band 31 and the second frequency band 34, both the first transmission 51 and the second transmission 52 are larger than the minimum transmission 42.

Therefore, only the first antennas 211 and not the second antennas 221 transduce in the first frequency band 31, while in the second frequency band 34 only the second antennas 221 and not the first antennas 211 transduce. In the third frequency band 37, the first transmissions 51 of the first antennas 211 and the second transmissions 52 of the second antennas 221 overlap and both the first antennas 211 and the second antennas 221 transduce in the third frequency band 37.

The first, second and third frequency bands 31, 34, 37 directly join with each other so that the first maximum frequency 33 equals a third minimum frequency 38 of the third frequency band 37 and the second minimum frequency 35 equals a third maximum frequency 39 of the third frequency band 37. With the transmissions 51, 52 shown in FIG. 18, the antenna device 1 continuously transduces over the combined frequency band between the first minimum frequency 32 of the first frequency band 31 and the second maximum frequency 34 of the second frequency band 34.

Figure 19:
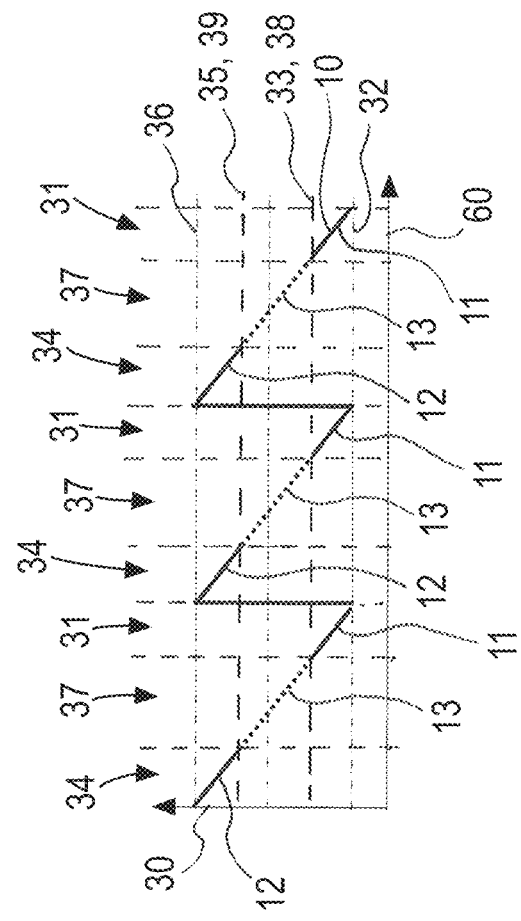
FIG. 19 bursts of a radar signal that may be used with antennas having the transmissions shown in FIG. 18.

FIG. 19 shows individual bursts of a radar signal 10 routed via the common signal port to or from the first and second antennas 211, 221 having the transmissions 51, 52 shown in FIG. 18. The radar signal 10 comprises continuous linear frequency sweeps from the second maximum frequency 34 down to the first minimum frequency 32. These frequency sweeps span the first signal portion 11 occupying the first frequency band 31, a third signal portion 13 occupying the third frequency band 37 and the second signal portion 12 occupying the second frequency band 34. The frequency sweeps all have the same slope within the individual frequency bands 31, 34, 37. Target objects that are located in the common field of view 240, 242 of the first antennas 211 and the second antennas 221 are irradiated with electromagnetic radiation spanning the complete frequency band between the first minimum frequency 32 and the second maximum frequency 34.

With the bursts shown in FIG. 19, the signal processing device 120 may use the first, second and third frequency bands 31, 34, 37 for determining the distance to the target object. Additionally, it may only use the first signal portions 11, 16, 21, 26 of the radar signals 10, 15, 20, 25 that occupy the first frequency band 31 to detect reflections via the first propagation channels and it may only use the second signal portions 12, 17, 22, 27 of the radar signal 10, 15, 20, 25 that occupy the second frequency band 34 to detect reflections via the second propagation channels.

With the radar devices 1 of the previous Figures, the individual antennas 211, 221 are each coupled to a single signal port 130, 131, 133, 135, 136, 137. The first and second signal portions 11, 12, 16, 17, 21, 22, 26, 27 of the individual radar signals 10, 15, 20, 25 then constitute separate antenna signals representing the radiation fields of the individual antennas 211, 221. The antenna signals are entirely routed as the separate signal portions 11, 12, 16, 17, 21, 22, 26, 27 over a single port 130, 131, 133, 135, 136, 137 of the radar circuit 100.

The first and second antennas 211, 221 shown in FIGS. 1, 4, 7 to 13 and 16 are each placed at separate locations on the antenna device 200 and therefore have phase centers located at different positions. Consequently, these antennas 211, 221 radiate the first signal portion 11, 16, 21, 26 and the second signal portion 12, 17, 22, 27 from different physical locations on the antenna device 200. Likewise the first and second antennas 211, 221 shown in FIG. 14 have separated phase centers when being fed by antenna signals having different frequencies.

The signal processing device 120 of these radar devices 120 uses the separate phase centers to establish different propagation channels and to form at least one virtual antenna array, such as a MIMO array, from the individual propagation channels. For example, the processing unit of these radar devices 1 may use the location of first phase centers of the first antennas 211 as first antenna positions and the location of second phase centers of the second antennas 221 as second antenna positions. The locations of the corresponding phase centers thereby correspond to the phase centers of the radiation patterns associated with the antennas 211, 221. The angular position of a target object may then be determined by evaluating the phase shifts that the individual radar signals acquire when propagating via the different propagation channels established by the spatially separated antennas.

Figure 20:
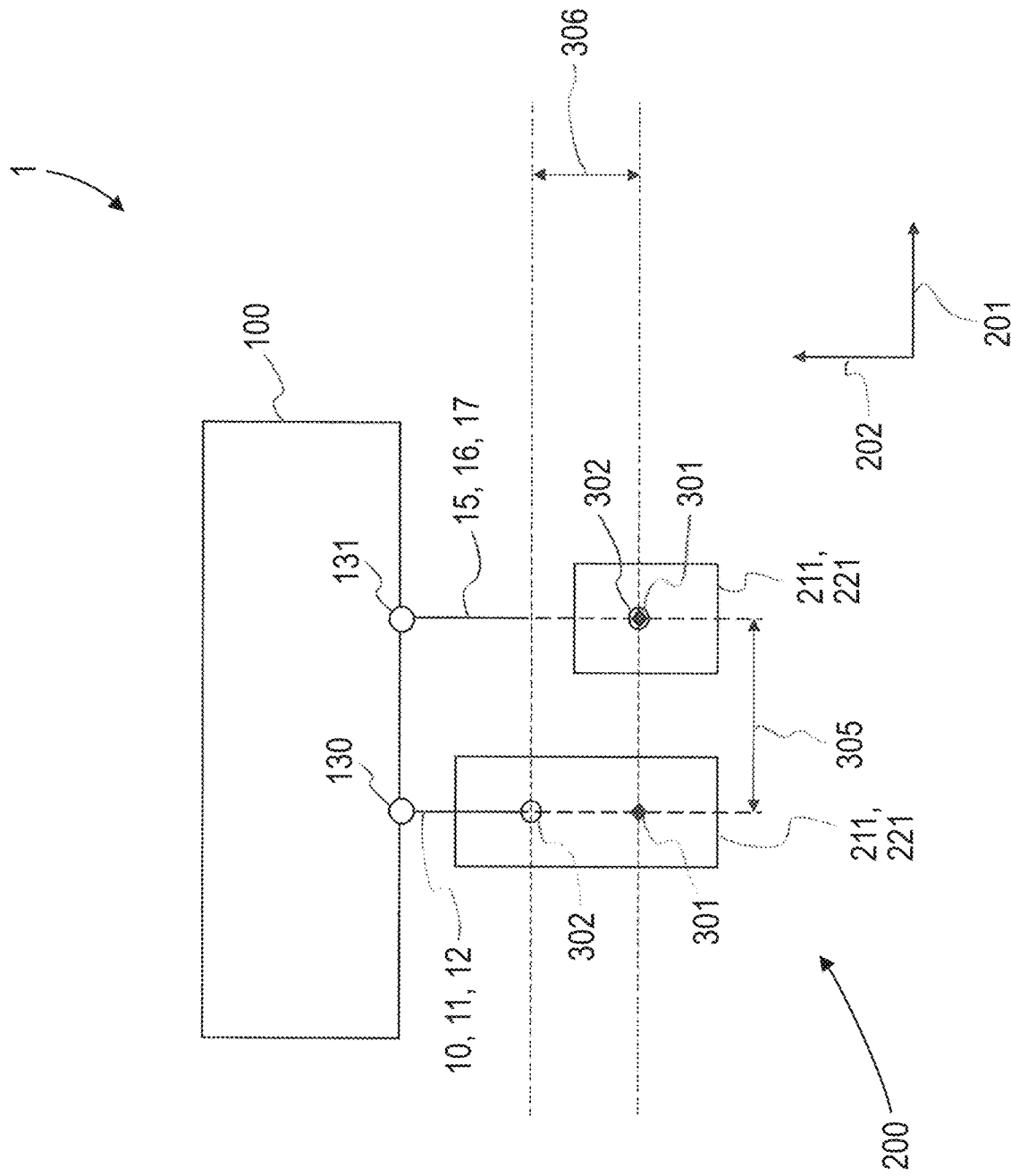
FIG. 20 a further embodiment of a radar device according to the present disclosure.

FIG. 20 illustrates a further embodiment of a radar device 1 according to the present disclosure that routes two antenna signals via a common signal port and transduces the antenna signals routed via the common signal port with separate phase centers. As far as no differences are described or apparent from the Figures, the radar device 1 is configured as it is disclosed in connection with the radar devices 1 shown in FIGS. 1, 4, 7 to 13 and 16.

A radar circuit 100 of the radar device 1 has a first signal port 130 and a second signal port 131. The first and second signal port 130, 131 are each configured as common signal ports to each of which a first antenna 211 transducing electromagnetic radiation with a first phase center 301 and a second antenna 221 transducing electromagnetic radiation with a second phase center 302 are connected. The first antennas 211 each transduce a first antenna signal occupying a first frequency band and the second antennas 221 each transduce a second antenna signal occupying a second frequency band.

The first phase centers 301 of the first antennas 211 connected to the first and second common signal port 130, 131 are shifted with respect to each other by a first distance 305 along a first direction 201 and are positioned at the same location in a second direction 202 that is perpendicular to the first direction 201. Consequently, from the first antenna signals transduced via the first antennas 211, a virtual antenna array may be constructed that resolves the angular position of a target object along the first direction 201. The second phase centers 302 of the second antennas 221 connected to the first and second common signal port 130, 131 are shifted with respect to each other by a second distance 306 along the second direction 202 and are positioned at the same location in the first direction 201. From the second antenna signals transduced via the second antennas 221, a virtual antenna array may be constructed that resolves the angular position of the target object along the second direction 202.

As can also be seen from FIG. 20, the phase centers 301, 302 of the first and second antenna 211, 221 connected to the first common signal port 130 are located at the same position in the first direction 201 and are shifted with respect to each other by the second distance 306 along the second direction 202. Furthermore, the phase centers 301, 302 of the first and second antenna 211, 221 connected to the second common signal port 131 coincide both in the first and in the second direction 201, 202.

The first antennas 211 frequency selectively transduce in a first frequency band and the second antennas 221 frequency selectively transduce in a second frequency band that is separate from the first frequency band. The first common signal port 130 routes a first radar signal 10 that comprises the first antenna signal as a first signal portion 11 and the second antenna signal as a second signal portion 12. Likewise, the second common signal port 131 routes a second radar signal 15 that comprises the first antenna signal as a first signal portion and the second antenna signal as a second signal portion 17. The first signal portions 11, 16 and first antenna signals each occupy the first frequency band and the second signal portions 12, 17 and second antenna signals each occupy the second frequency band.

Figure 21:
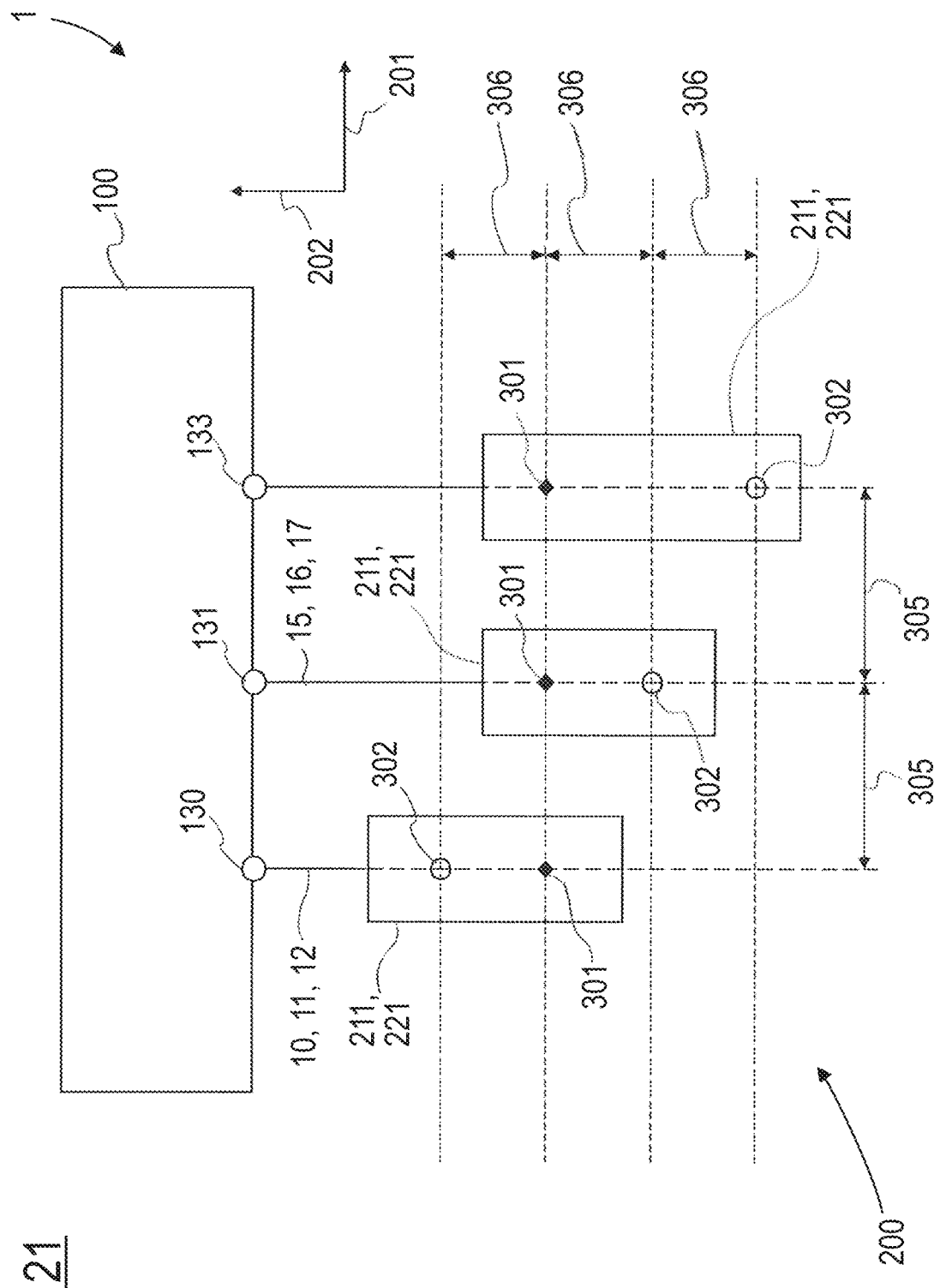
FIG. 21 a further embodiment of a radar device according to the present disclosure.

FIG. 21 shows a further embodiment of a radar device 1. As far as no differences are described or apparent from the Figures, the radar device 1 shown in FIG. 21 is configured as it is disclosed in connection with the radar device 1 of FIG. 20. The radar circuit 100 of the radar device shown in FIG. 21 comprises a further common signal port 133 to which the additional first and second antennas 211, 221 are connected. The first antenna 211 connected to the further common signal port 133 has a first phase center 301 and the second antenna 221 connected to the further common signal port 133 has a second phase center 302. Both the first and second antenna signal are routed as individual signal portions of a radar signal via the further common signal port 133.

Like the first and second antennas 211, 221 connected to the first and second common signal 130, 131, the first antenna 211 connected to the further common signal port 133 frequency selectively transduces a first antenna signal occupying the first frequency band and the second antenna 221 connected to the further common signal port 133 frequency selectively transduces a second antenna signal occupying the second frequency band.

With the radar device of FIG. 21, the first and second phase center 301, 302 of the antennas 211, 221 connected to the second common signal port 131 are separated from each other by the second distance 306 along the second direction 202 and the first and second phase centers 301, 302 of the antennas 211, 221 connected to the further common signal port 133 are aligned with each other in the first direction 201 and separated from each other along the second direction 202 by twice the second distance 306.

The individual first phase centers 301 of the first antennas 211 connected to the individual common signal ports 130, 131, 133 are aligned with each other in the second direction 202 and separated from each other in the first direction 201 by the first distance 305. The second phase centers 302 of the second antennas 221 connected to the first and second common signal port 130, 131 are separated from each other along the second direction 202 by twice the second distance 306 and the phase center 302 of the second antenna 221 connected to the further common signal port 133 is separated from the second phase center 302 of the second antenna 221 connected to the second common signal port 131 by the second distance 306.

Figure 22:
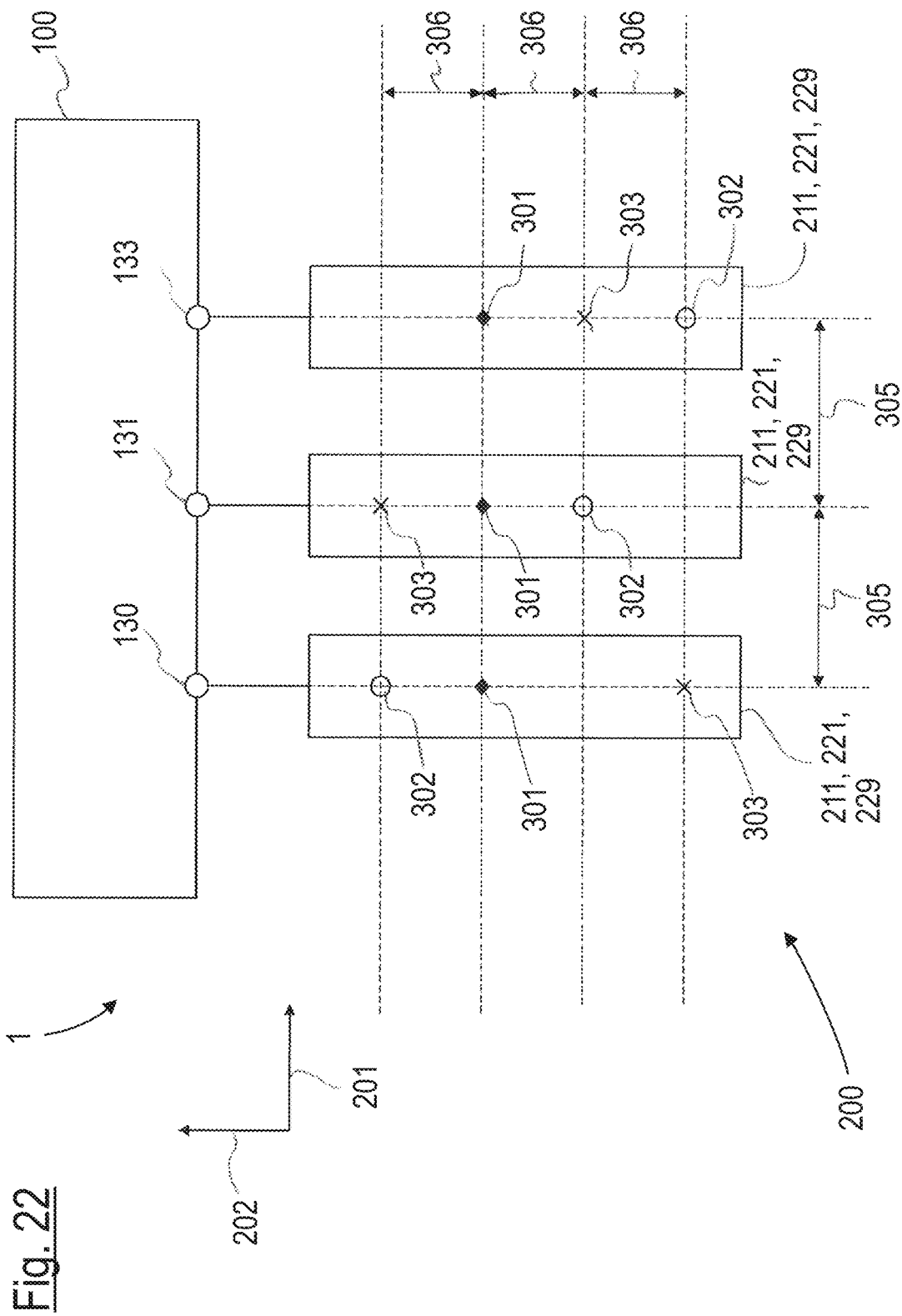
FIG. 22 an alternative embodiment of the radar device of FIG. 21.

FIG. 22 shows an alternative embodiment of the radar device 1 of FIG. 21. To each of the common signal ports 130, 131, 133 three individual antennas 211, 221, 229 are connected, whereby each individual antenna 211, 221, 229 transduces via a separate phase center. Therefore, each common signal port 130, 131, 133 routes a first antenna signal that is transduced via a first phase center 301 of the first antenna 211, a second antenna signal that is transduced with a second phase center 302 of the second antenna 221 and a third antenna signal that is transduced with a third phase center 303 of the third antenna 229. The individual antenna signals each occupy different frequency bands.

The individual third phase centers 303 are aligned with the first and second phase centers 301, 302 of the antennas 211, 221, 229 connected to the same signal port 130, 131, 133 in the first direction 201. In the second direction 202, the third phase center 303 of the antenna 229 connected to the first common signal port 130 is positioned at the same location as the second phase center 302 of the antenna 223 connected to the third common signal port 133, the third phase center 303 of the antenna 229 connected to the second common signal port 131 is positioned at the same location as the second phase center 302 of the antenna 223 connected to the first common signal port 131 and the third phase center 303 of the antenna 229 connected to the third common signal port 133 is positioned at the same location as the second phase center 302 of the antenna 223 connected to the second common signal port 132.

The antennas 229 having the third phase centers 303 realize an additional antenna array for resolving the angular position of the target object in the second direction 202. The antennas 223 having the second phase center 302 may differ from the antennas 229 having the third phase center 303 in at least one antenna parameter like gain, field of view, polarization or the like.

Transducing antenna signals occupying separate frequency bands with separate phase centers is, for example, accomplished by the antenna devices 200 shown in FIGS. 1, 4, 7 to 13 and 16. All these antenna devices 200 feature individual antennas 211, 221, 229 that consist of separate sets of radiating elements 213, 223, 228. Alternatively, frequency selective transducement of antenna signals with separate phase centers may also be realized with antennas that share common sets of radiating elements, such as the antennas shown in the following FIGS. 23 to 27.

Figure 23:
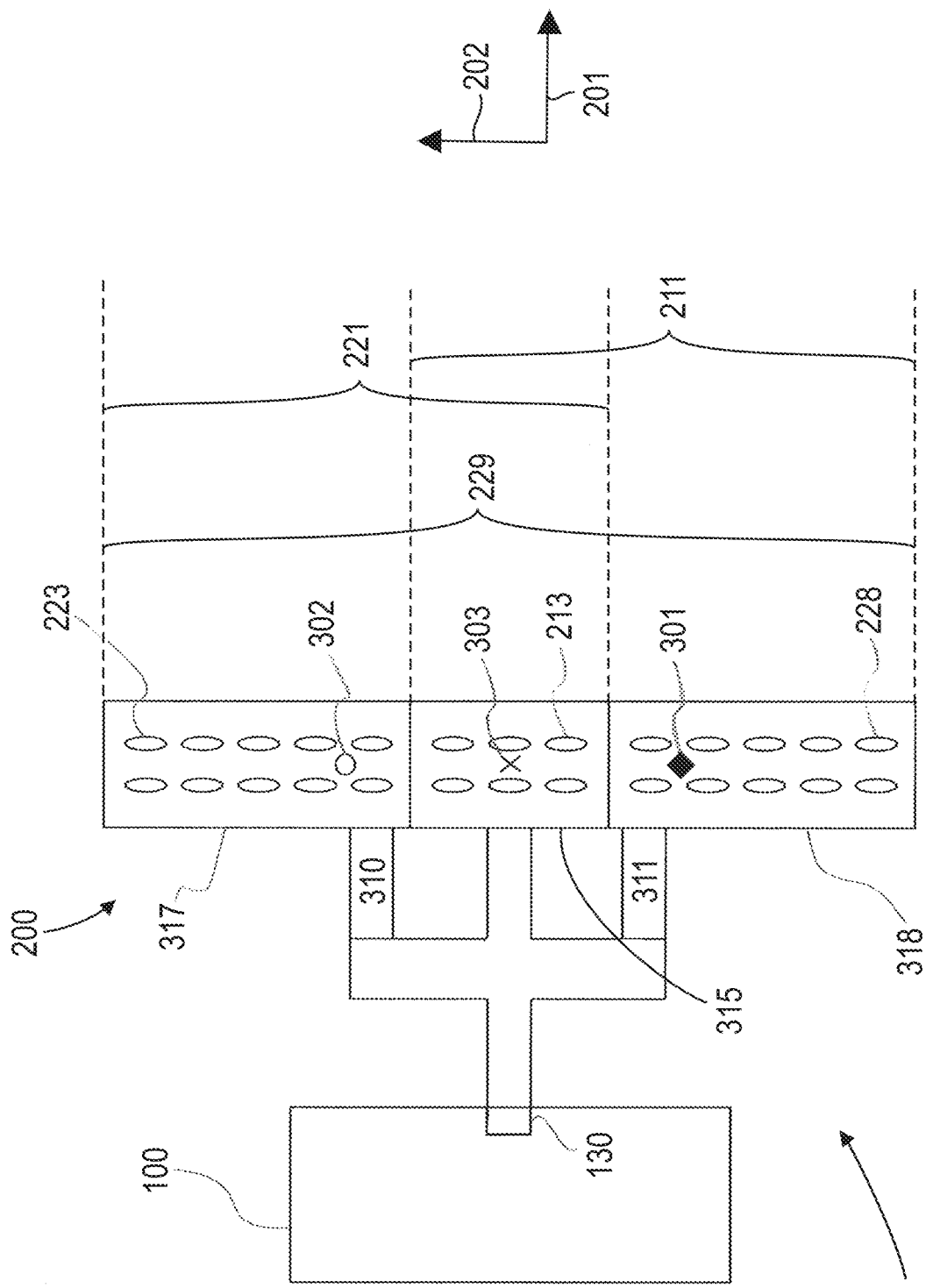
FIG. 23 an antenna device for the radar devices of the present disclosure.

FIG. 23 shows an antenna device 200 that may be used with the radar devices 1 according to the present disclosure. It has a first antenna 211, a second antenna 221 and a third antenna 229 coupled to a common signal port 130 of a radar circuit 100. The first antenna 211 transduces in a first frequency band, the second antenna 221 transduces in a second frequency band and the third antenna 229 transduces in a third frequency band. The first, second and third frequency band are separated from each other and the second frequency band is located at higher frequencies than the first frequency band and the third frequency band is located in between the first and second frequency band. For example, the first frequency band may lie between 76 GHz and 77 GHz, the second frequency band may lie between 78 GHz and 79 GHz and the third frequency band may lie between 80 GHz and 81 GHz.

The antenna device 200 comprises a first set 315 of first antenna elements 213, a second set 317 of second antenna elements 223 and a third set 318 of third antenna elements 228. In the second direction 202, the second and third sets 317, 318 of antenna elements 223, 228 are arranged on opposite sides of the first antenna elements 213 of the first set 315. The antenna elements 213, 223, 228 are configured as individual radiating slots provided in a waveguide, for example a surface integrated waveguide. The first antenna 211 consists of the first antenna elements 213 and the third antenna elements 228, the second antenna 221 consists of the first antenna elements 213 and the second antenna elements 223 and the third antenna consists of the first, second and third antenna elements 221, 223, 229.

The first antenna elements 213 of the first set 315 are directly coupled to the common signal port 130 and transduce in the first, second and third frequency band. The second antenna elements 223 of the second set 317 transduce in the second and third frequency band and the third antenna elements 228 of the third set 318 transduce in the first and third frequency band. To this end, the second antenna elements 223 of the second set 317 are coupled to the common signal port 130 by a first filter 310 that is configured as a high path filter that blocks the first frequency band and passes the second and third frequency band, whereas the third antenna elements 228 of the third set 318 are coupled to the common signal port 130 by a second filter 311 that is configured as a low pass filter that blocks the second frequency band and passes the first and third frequency band. The filters 310, 311 and the common signal line connecting the antennas 211, 221, 229 to the common signal port 130 may be configured as surface integrated waveguide devices.

The first antenna 211 has a first phase center 301, the second antenna 221 has a second phase center 302 and the third antenna 229 has a third phase center 303. The phase centers 301, 302, 303 are positioned at the same location in the first direction 201 and are separated from each other along the second direction 202. Thereby, the third phase center 303 is located in between the first phase center 301 and the second phase center 302. The antenna elements 213, 223, 228 are distributed above each other in two rows along the second direction 202 to form array antennas 211, 221, 229 that have a small field of view along the second direction 202, which may be the elevation direction with respect to a ground surface on which a vehicle comprising the radar device 1 travels.

With the radar device shown in FIG. 23, the first filter 310 is located directly between the second antenna elements 223 of the second set 317 and the common signal port 130 and the second filter 311 is located directly between the third antenna elements 228 of the third set 318 and the common signal port 130.

Figure 24:
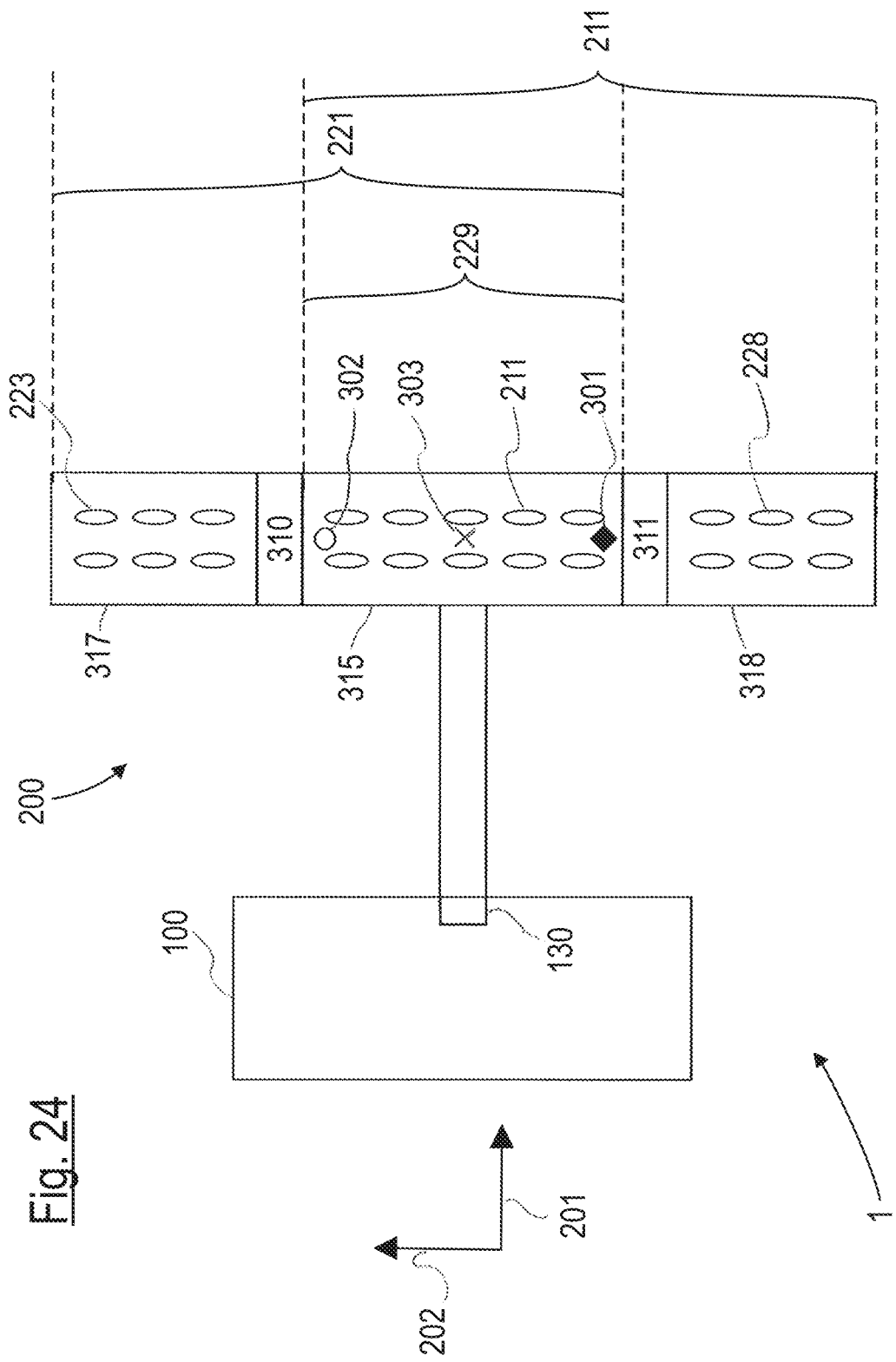
FIG. 24 an alternative embodiment of the antenna device of FIG. 23.

FIG. 24 depicts an alternative embodiment of the antenna device 200 shown in FIG. 23. With this embodiment, the first filter 310 is located in between the first antenna elements 213 of the first set 315 and the second antenna elements 223 of the second set 317, so that the second antenna elements 223 are connected to the common signal port 130 via the first filter 310 and the first set 315 of first antenna elements 213. Likewise, the second filter 311 is located in between the first antenna elements 213 of the first set 315 and the third antenna elements 228 of the third set 318, so that the third antenna elements 228 are connected to the common signal port 130 via the second filter 311 and the first set 315 of first antenna elements 213.

The first filter 310 is configured as a high pass filter that only transduces the second frequency band and the second filter 311 is configured as a low pass filter that only transduces the first frequency band. Consequently, the first antenna 211 transducing in the first frequency band comprises the first set 315 of first antenna elements 213 and the third set 318 of third antenna elements 228, while the second antenna 221 transducing in the second frequency band comprises the first set 315 and the second set 317 of antenna elements 213, 223 and the third antenna 229 transducing in the third frequency band only comprises the first set 315 of antenna elements 213. In alternative embodiments, the first filter 310 may be configured as a high pass filter that blocks the first frequency band and passes the second and third frequency band and the second filter 311 may be configured as a low pass filter that blocks the second frequency band and passes the first and third frequency band. With these embodiments, the third antenna comprises all sets 315, 317, 318 of antenna elements 213, 223, 228.

Figure 25:
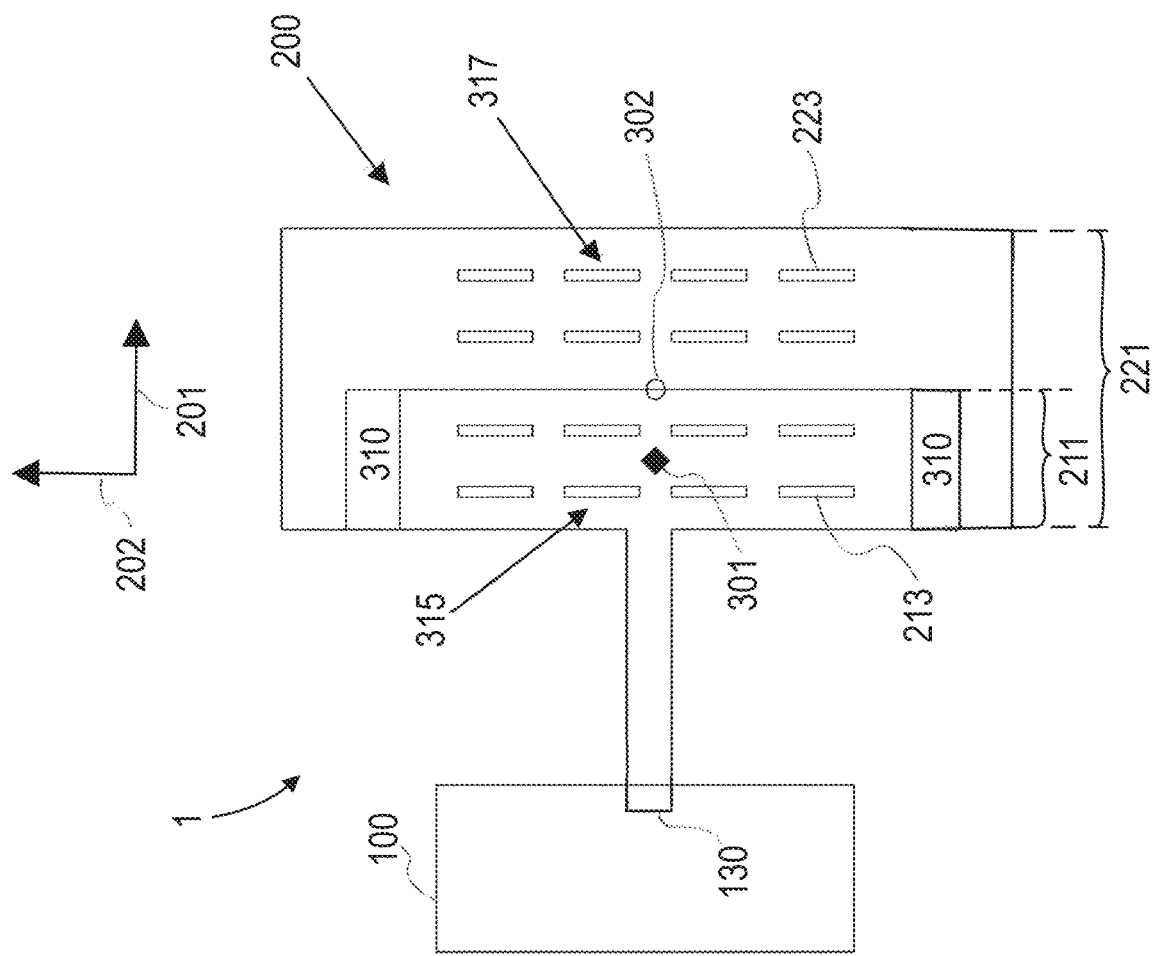
FIG. 25 an alternative embodiment of an antenna device for the radar devices of the present disclosure.

FIG. 25 shows another embodiment of an antenna device 200 for the radar devices 1 according to the present disclosure. The antenna device 200 has two antennas 211, 221 that are coupled to a common signal port 130 of a radar circuit 130 and transduce via separate phase centers 301, 302. As far as no differences are described or apparent from the figures, the antenna device 200 shown in FIG. 25 is configured as disclosed in connection with the antenna device 200 shown in FIG. 23 and vice versa.

With the antenna device 200 of FIG. 25, the first set 315 of first antenna elements 213 and the second set 317 of second antenna elements 223 are positioned next to each other along the first direction 201, which is the azimuth direction. The first antenna elements 213 and the second antennas 223 are each distributed along two rows extending in the second direction 202, which is the elevation direction. The antenna elements 213, 223 are configured as individual radiating slots provided in a waveguide, for example a surface integrated waveguide, whereby the waveguide serially connects the second antenna elements 223 via the first antenna elements 213 to the common signal common signal port 130 of the radar circuit 100.

In between the section of the waveguide containing the first set 315 of antenna elements 213 and the section of the waveguide containing the second set 317 of antenna elements 223, the waveguide has two filters 310 that are configured as low pass filters that block the first frequency band. Consequently, the first antenna 211 transducing in the first frequency band comprises the first antenna elements 213 only and the second antenna 221 transducing in the second frequency band comprises both the first and second antenna elements 213, 223. The filters 310 are located in the second direction 202 at both ends of the waveguide section that comprises the first antenna elements 213.

The first antenna 211 then has a first phase center 301 that is located in the middle of the first set 315 of first antenna elements 213 and the second antenna 221 has a phase center that is located in between the first and second set 315, 317 of antenna elements 213, 223, in the center of the antenna structure combining the first and second antennas 211, 221. The second phase center 302 is shifted with respect to the first phase center 301 along the first direction 201.

Figure 26:
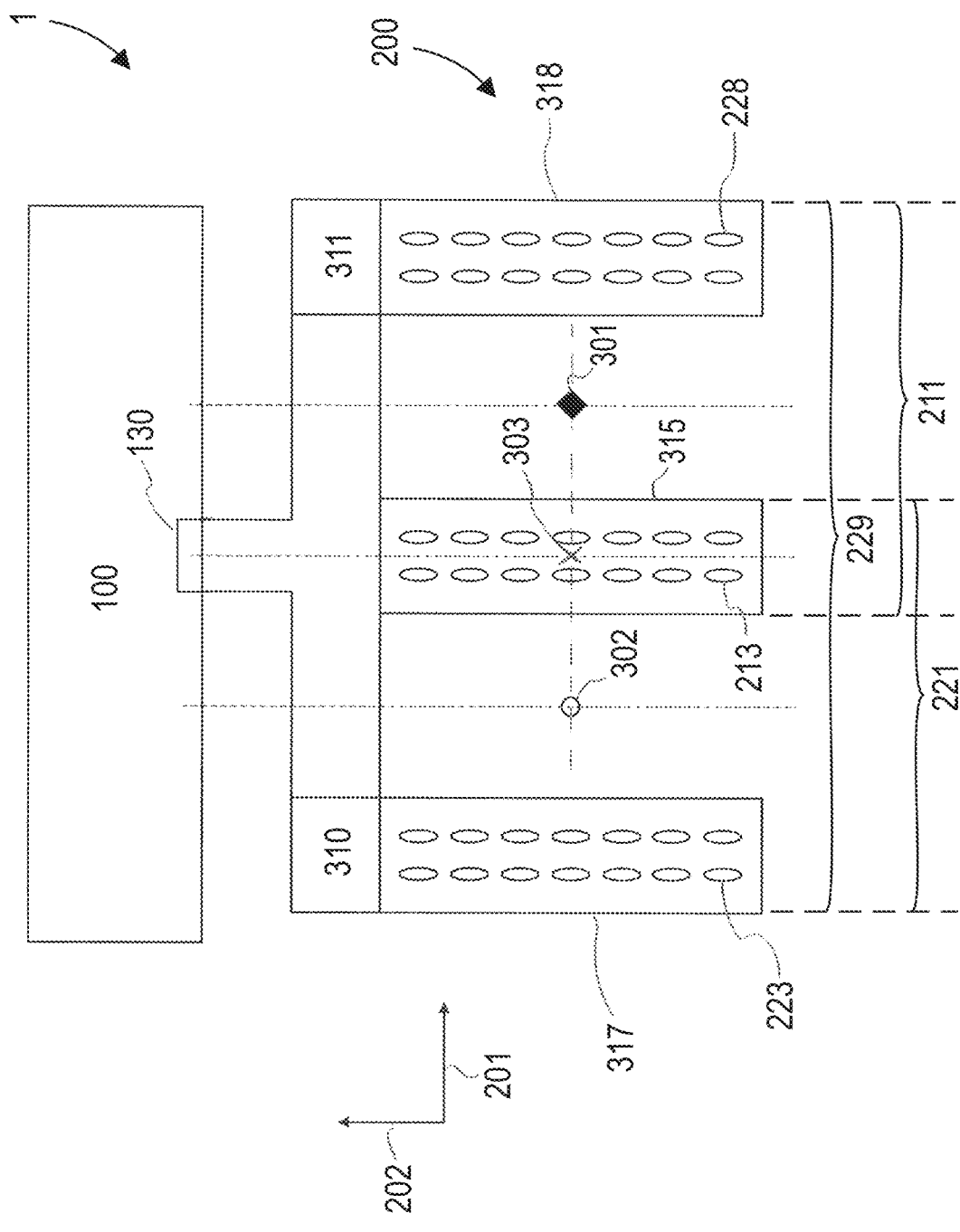
FIG. 26 an alternative embodiment of an antenna device for the radar devices of the present disclosure.

FIG. 26 shows another alternative embodiment of an antenna device 200 for the radar devices 1 according to the present disclosure, which has a first, second and third antenna 211, 221, 229 coupled to a common signal port 130. As far as no differences are described or apparent from the Figures, the embodiment shown in FIG. 26 is configured as it is disclosed for the embodiment shown in FIG. 23.

With the embodiment shown in FIG. 26, the first set 315 of first antenna elements 213, the second set 317 of second antenna elements 223 and the third set 318 of third antenna elements 228 are spaced apart from each other along the first direction 201. Thereby, the first set 315 is located in between the second set 317 and the third set 318. The antenna elements 213, 223, 228 of the individual sets 315, 317, 318 are each aligned in two rows along the second direction 202 so that the individual sets 315, 317, 318 of antenna elements 213, 223, 228 form arrays with a narrow field of view along the second direction 202, which is the elevation direction.

The first phase center 301 of the first antenna 211 comprising the first and third set 315, 318 of antenna elements 213, 228 is located along the first direction 201 in between the first and third set 315, 318 of antenna elements 213, 228 and the second phase center 302 of the second antenna 221 comprising the first and second set 315, 317 of antenna elements 213, 228 is located along the first direction 201 in between the first and second set 315, 317 of antenna elements 213, 223.

With the radar devices 1 described in connection with the previous Figures, the antenna signals occupying separate frequency bands are routed between the radar circuit 100 and the antenna device 200 via common signal ports 130, 131, 133, 135, 136, 137 of the radar circuit 100.

Figure 27:
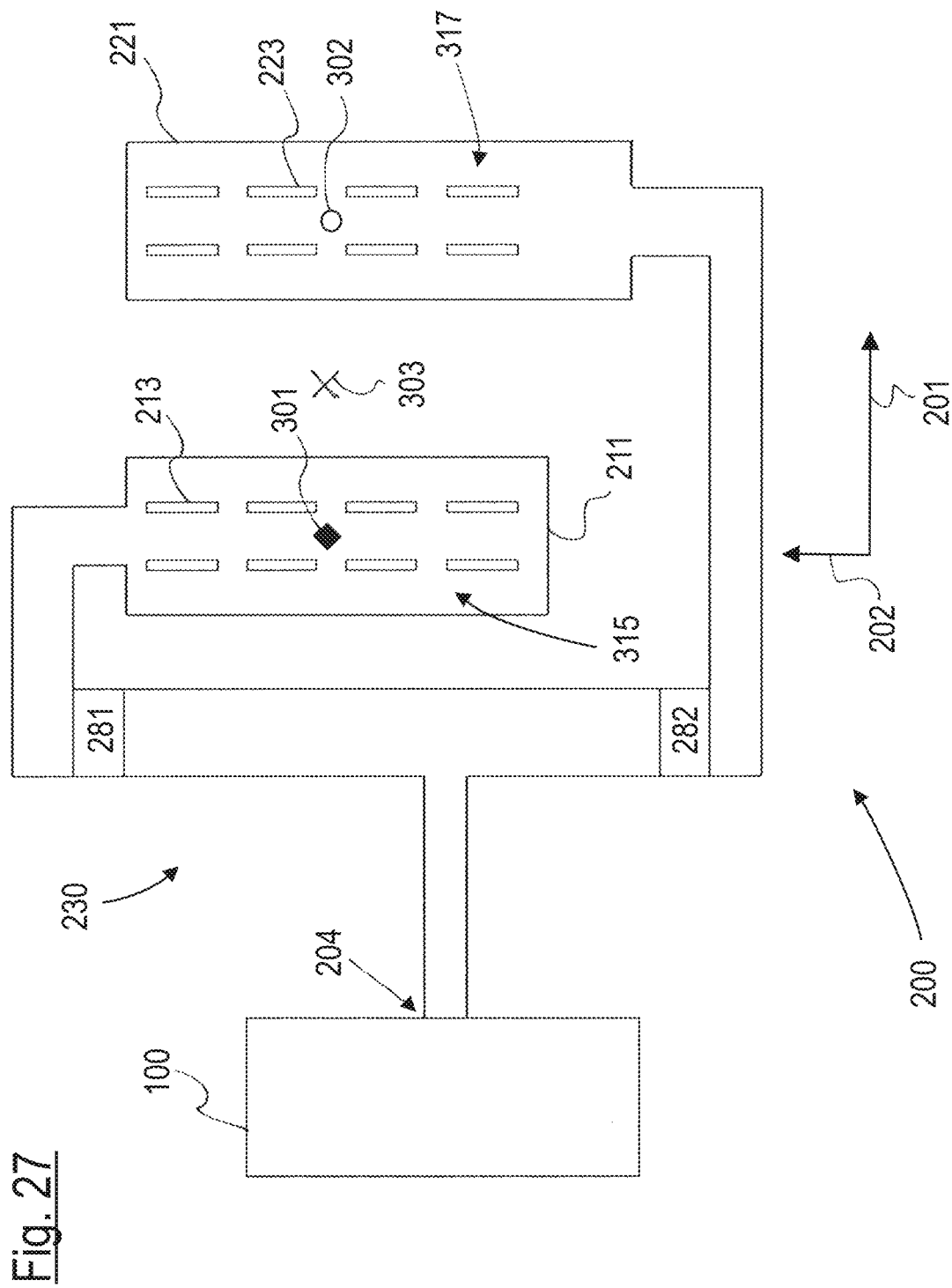
FIG. 27 another alternative embodiment of a first and second antenna coupled to a common signal port for an antenna device of the present disclosure.

FIG. 27 shows an alternative embodiment of a first and second antenna 211, 221 of an antenna device 200 according to the present disclosure. As far as no differences are described or apparent from the Figures, the embodiment shown in FIG. 27 is configured as it is disclosed in connection with the embodiment shown in FIG. 7 and vice versa.

The first antenna 211 and the second antenna 221 are both coupled via a signal routing device 230 to a common signal port 204 of a radar circuit 100. The radar circuit 100 is configured to route the radar signal shown in FIG. 19 over the common signal port 204, which radar signal has the first signal portion 11 occupying the first frequency band 31, the second signal portion 12 occupying the second frequency band 34 and the third signal portion 13 occupying the third frequency band 37.

The first antenna 211 is configured to transduce the first and third signal portions 11, 13, but not the second signal portion 12 and the second antenna 221 is configured to transduce the second and third signal portion 12, 13, but not the first signal portion 11. To this end, the first antenna 211 is coupled via a first filter 281 of the signal routing device 230 to the common signal port 204 and the second antenna 221 is coupled via a second filter 282 of the signal routing device 230 to the common signal port 204. The first filter 281 is configured to pass the first and third signal portion 11, 13 and to block the second signal portion 12, while the second filter 282 is configured to pass the second and third signal portion 12, 13 and to block the first signal portion 11.

The first antenna 211 comprises a first set 315 of first antenna elements 213 and the second antenna 221 comprises a second set 317 of second antenna elements 223. The first set 315 and the second set 317 are spaced apart from each other along a first direction 201. This results in a first phase center 301 of the first antenna 211 being centered at the first set 315 of first antenna elements 213 and a second phase center 302 of the second antenna 221 being centered at the second set 317 of second antenna elements 223. The first and second phase center 301, 302 are therefore spaced apart from each other along the first direction 201.

Since the third signal component 13 is transduced via both the first set 315 of first antenna elements 213 and the second set 317 of second antenna elements 223, the third signal component 13 is transduced via a third phase center 303 that is located in between the first and second phase center 301, 302 along the first direction 201.

Additionally, the first antenna 211 is configured to transduce the first and third signal portions 11, 13 having a first linear polarization, which is parallel to the first direction 201, and the second antenna 221 is configured to transduce the second and third signal portions 12, 13 having a second linear polarization, which is parallel to a second direction 202 that is perpendicular to the first direction 201. This results in the third signal portion 13 being transduced with a third polarization that is a linear superposition of the first and second polarization. The third polarization may be a linear polarization at an intermediate direction between the first direction 201 and the second direction 202, for example at a direction that has an angle of +/−45° with the first and second direction 201, 202. Alternatively, the third polarization may be an elliptical polarization.

Figure 28:
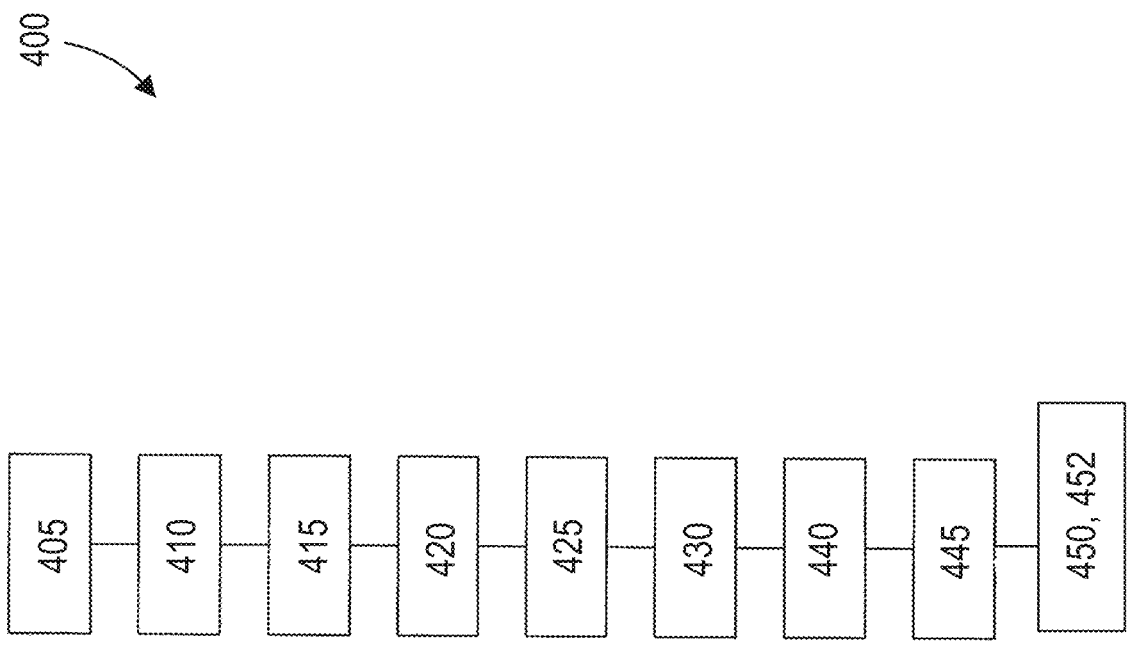
FIG. 28 a method according to the present disclosure.

FIG. 28 shows a method 400 performed by the radar devices 1 according to the present disclosure. The method comprises transceiving antenna signals by generating 405 the first antenna signals occupying the first frequency band and the second antenna signals occupying the second frequency band with the transmit chains 125, 126 of the signal generator 105 of the radar circuit 100. The method then comprises routing 410 the antenna signals via signal ports 130, 131, 133 to the antenna device 200. The method 400 further comprises transducing the first and second antenna signals with the antenna device 200 by radiating 415 the first antenna signals via the first transmit antennas 211 and the second antenna signals via the second transmit antennas 221.

The method 400 then comprises transducing the first antenna signals by receiving 420 the first antenna signals via the first receive antennas 211 and the second antenna signals via the second receive antennas 221 of the antenna device 200, respectively. The method further comprises routing 425 the antenna signals from the antenna device 200 via the receive signal ports 135, 136, 137 to the radar circuit 100. The method further comprises measuring the received antenna signals by generating 430 the data signals 123, 124 representing the received antenna signals with the receive chains 127, 128. The method further comprises evaluating the radar signals 20, 25 by jointly processing 445 the first and second antenna signals to determine the distance to the target object and by differentiating 440 individual propagation channels using the separability parameter of the antenna signals. Furthermore, the method 400 comprises constructing 450 from the propagation channels established by the first antennas 211 a first angle resolving virtual antenna array using the first antenna signals and constructing 452 from the propagation channels established by the second antennas 221 a second angle resolving virtual antenna array using the second antenna signals.

Figure 29:
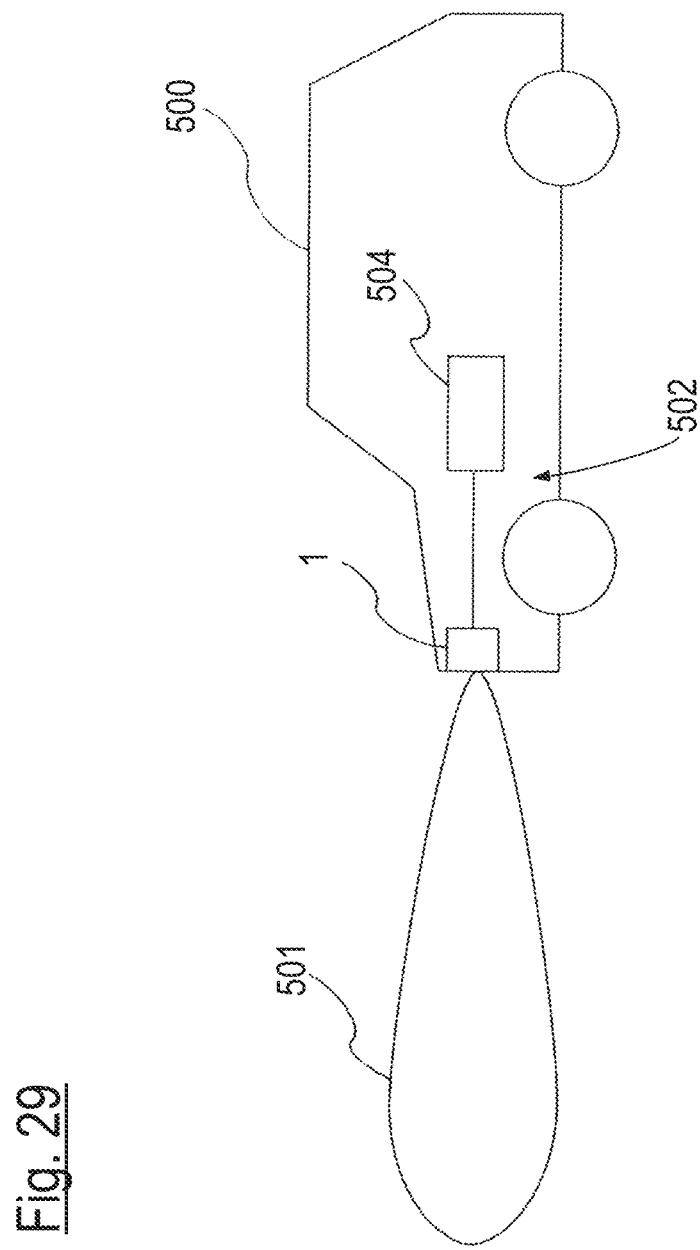
FIG. 29 a vehicle equipped with a radar device according to the present disclosure.

FIG. 29 depicts a vehicle 500 that is equipped with a radar device 1 according to the present disclosure. In the embodiment shown in FIG. 29, the radar device 1 is configured as a front radar of the vehicle 1 and a radiation field 501 of an antenna device of the radar device 1 is directed in the forward direction of the vehicle 500. The radar device 1 is part of a vehicle control system 502 of the vehicle 500 and is connected to a control device 504 of the vehicle control system 502. The control device 504 is configured to perform advanced driver's assist functions, such as adaptive cruise control, emergency brake assist, lane change assist or autonomous driving, based on data signals received from the radar device 1. These data signals represent the positions of target objects in front of the radar device 1 mounted to the vehicle 500. The control device 504 is configured to at least partly control the motion of the vehicle 500 based on the data signals received from the radar device 1. For controlling the motion of the vehicle, the control device 504 may be configured to brake and/or accelerate and/or steer the vehicle 500.

What is claimed is:

1. A method for operating an angle-resolving radar device, the method comprising:
transmitting, with a first antenna of the radar device, a first antenna signal into a first radiation field, the first radiation field having a first phase center, the first antenna comprising a first set of antenna elements and one or more common antenna elements;
transmitting, with a second antenna of the radar device, a second antenna signal into a second radiation field, the second radiation field having a second phase center that is shifted with respect to the first phase center, the second antenna comprising a second set of antenna elements and the one or more common antenna elements;
transmitting, with a third antenna of the radar device, a third antenna signal into a third radiation field, the third radiation field having a third phase center that is shifted with respect to the first phase center and the second phase center, the third antenna comprising the one or more common antenna elements; and
constructing, with a signal processing device of the radar device, at least one angle resolving virtual antenna array using the first phase center as a first antenna position, the second phase center as a second antenna position, and the third phase center as a third antenna position.

2. The method of claim 1, wherein the first phase center, the second phase center, and the third phase center are positioned at a same location in a first direction and at separate locations in a second direction that is perpendicular to the first direction.

3. The method of claim 2, wherein the first set of antenna elements, the second set of antenna elements, and the one or more common antenna elements comprise two rows of antenna elements along the second direction to form the first antenna, the second antenna, and the third antenna.

4. The method of claim 1, wherein:
the first antenna transmits in a first frequency band;
the second antenna transmits in a second frequency band that is different from the first frequency band; and
the third antenna transmits in a third frequency band that is different from the first frequency band and the second frequency band.

5. The method of claim 4, wherein:
the second frequency band is located at higher frequencies than the first frequency band; and
the third frequency band is located at frequencies in between the first frequency band and the second frequency band.

6. The method of claim 5, wherein the first antenna signal, the second antenna signal, and the third antenna signal are routed between a radar circuit and a respective antenna of the radar device via a common signal port of the radar circuit.

7. The method of claim 6, wherein:
a first filter is located in between the first set of antenna elements and the one or more common antenna elements so that the first set of antenna elements are operatively connected to the common signal port via the first filter and the one or more common antenna elements, the first filter being configured as a low pass filter that only transduces the first frequency band; and
a second filter is located in between the second set of antenna elements and the one or more common antenna elements so that the second set of antenna elements are operatively connected to the common signal port via the second filter and the one or more common antenna elements, the second filter being configured as a high pass filter that only transduces the second frequency band.

8. The method of claim 6, wherein the third antenna further comprises the first set of antenna elements and the second set of antenna elements.

9. The method of claim 8, wherein:
the first set of antenna elements are coupled to the common signal port by a first filter that is configured as a low pass filter that blocks the second frequency band and passes the first frequency band and the third frequency band; and the second set of antenna elements are coupled to the common signal port by a second filter that is configured as a high pass filter that blocks the first frequency band and passes the second frequency band and the third frequency band.

10. The method of claim 8, wherein the first set of antenna elements and the second set of antenna elements are coupled to the common signal port via a switching device that selectively couples or decouples one of the first set of antenna elements and the second set of antenna elements to or from the common signal port.

11. An angle-resolving radar device comprising:
a radar circuit for transceiving antenna signals;
an antenna device connected to the radar circuit via a common signal port of the radar circuit, the radar circuit and the antenna device being configured to:
transmit, with a first antenna of the radar device, a first antenna signal into a first radiation field, the first radiation field having a first phase center, the first antenna comprising a first set of antenna elements and one or more common antenna elements;
transmit, with a second antenna of the radar device, a second antenna signal into a second radiation field, the second radiation field having a second phase center that is shifted with respect to the first phase center, the second antenna comprising a second set of antenna elements and the one or more common antenna elements; and
transmit, with a third antenna of the radar device, a third antenna signal into a third radiation field, the third radiation field having a third phase center that is shifted with respect to the first phase center and the second phase center, the third antenna comprising the one or more common antenna elements; and
a signal processor configured to construct at least one angle resolving virtual antenna array using the first phase center as a first antenna position, the second phase center as a second antenna position, and the third phase center as a third antenna position.

12. The angle-resolving radar device of claim 11, wherein the first phase center, the second phase center, and the third phase center are positioned at a same location in a first direction and at separate locations in a second direction that is perpendicular to the first direction.

13. The angle-resolving radar device of claim 12, wherein the first set of antenna elements, the second set of antenna elements, and the one or more common antenna elements comprise two rows of antenna elements along the second direction to form the first antenna, the second antenna, and the third antenna.

14. The angle-resolving radar device of claim 11, wherein:
the first antenna is configured to transmit in a first frequency band;
the second antenna is configured to transmit in a second frequency band that is different from the first frequency band; and
the third antenna is configured to transmit in a third frequency band that is different from the first frequency band and the second frequency band.

15. The angle-resolving radar device of claim 14, wherein:
the second frequency band is located at higher frequencies than the first frequency band; and
the third frequency band is located at frequencies in between the first frequency band and the second frequency band.

16. The angle-resolving radar device of claim 15, wherein the first antenna signal, the second antenna signal, and the third antenna signal are routed between a radar circuit and a respective antenna of the radar device via a common signal port of the radar circuit.

17. The angle-resolving radar device of claim 16, wherein:
a first filter is located in between the first set of antenna elements and the one or more common antenna elements so that the first set of antenna elements are operatively connected to the common signal port via the first filter and the one or more common antenna elements, the first filter being configured as a low pass filter that only transduces the first frequency band; and
a second filter is located in between the second set of antenna elements and the one or more common antenna elements so that the second set of antenna elements are operatively connected to the common signal port via the second filter and the one or more common antenna elements, the second filter being configured as a high pass filter that only transduces the second frequency band.

18. The angle-resolving radar device of claim 16, wherein the third antenna further comprises the first set of antenna elements and the second set of antenna elements.

19. The angle-resolving radar device of claim 18, wherein:
the first set of antenna elements are coupled to the common signal port by a first filter that is configured as a low pass filter that blocks the second frequency band and passes the first frequency band and the third frequency band; and
the second set of antenna elements are coupled to the common signal port by a second filter that is configured as a high pass filter that blocks the first frequency band and passes the second frequency band and the third frequency band.

20. The angle-resolving radar device of claim 18, wherein the first set of antenna elements and the second set of antenna elements are coupled to the common signal port via a switching device that selectively couples or decouples one of the first set of antenna elements and the second set of antenna elements to or from the common signal port.

* * * * *